US009483166B2

(12) United States Patent
Dziuk et al.

(10) Patent No.: US 9,483,166 B2
(45) Date of Patent: Nov. 1, 2016

(54) SYSTEM AND METHOD FOR PLAYBACK OF MEDIA CONTENT WITH SUPPORT FOR AUDIO TOUCH CACHING

(71) Applicant: SPOTIFY AB, Stockholm (SE)

(72) Inventors: Dariusz Dziuk, Stockholm (SE); Babar Zafar, Gothenburg (SE); Niklas Gustavsson, Gothenburg (SE); Anton Kiland, Jonkoping (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 14/879,743

(22) Filed: Oct. 9, 2015

(65) Prior Publication Data

US 2016/0103595 A1    Apr. 14, 2016

Related U.S. Application Data

(60) Provisional application No. 62/062,580, filed on Oct. 10, 2014, provisional application No. 62/062,573, filed on Oct. 10, 2014, provisional application No. 62/062,582, filed on Oct. 10, 2014, provisional application No. 62/217,767, filed on Sep. 11, 2015.

(51) Int. Cl.
*G06F 3/00* (2006.01)
*G06F 3/0484* (2013.01)
*G06F 3/041* (2006.01)
*G06F 3/0488* (2013.01)
*G06F 3/0482* (2013.01)
*G06F 3/16* (2006.01)

(52) U.S. Cl.
CPC .......... *G06F 3/04842* (2013.01); *G06F 3/0412* (2013.01); *G06F 3/0414* (2013.01); *G06F 3/0482* (2013.01); *G06F 3/04847* (2013.01); *G06F 3/04883* (2013.01); *G06F 3/04886* (2013.01); *G06F 3/165* (2013.01); *G06F 3/167* (2013.01)

(58) Field of Classification Search
CPC .................... G06F 3/0482; G06F 17/30038
See application file for complete search history.

(56) References Cited

U.S. PATENT DOCUMENTS

| | | | |
|---|---|---|---|
| 6,005,563 | A | 12/1999 | White et al. |
| 6,654,367 | B1 | 11/2003 | Kaufman |
| 7,571,014 | B1 | 8/2009 | Lambourne et al. |

(Continued)

OTHER PUBLICATIONS

Summons to attend oral proceedings pursuant to Rule 115(1) EPC issued on European patent application No. 14162386.8, dated Nov. 25, 2015, 12 pages.

(Continued)

*Primary Examiner* — Omar Abdul-Ali
(74) *Attorney, Agent, or Firm* — Tucker Ellis LLP

(57) ABSTRACT

A system and method for playback of media content, for example music, video, or other media content. A media device having a media playback application and including a touch-sensitive user interface can be adapted to display a visual array of media options, for example as a grid or list of card elements. Each media option can be associated with one or more media content items that can be streamed to and/or played on the device. The system can determine a selected card element, or media options that are proximate to a selected point or region of the visual array, and play or crossfade media content as appropriate. In accordance with various embodiments, additional features can be provided that improve user interaction, for example the use of audible notifications, media caching, or touch menus.

15 Claims, 41 Drawing Sheets

(56) References Cited

U.S. PATENT DOCUMENTS

| | | |
|---|---|---|
| 2001/0030660 A1 | 10/2001 | Zainoulline |
| 2002/0103919 A1 | 8/2002 | Hannaway |
| 2002/0120752 A1 | 8/2002 | Logan et al. |
| 2004/0056885 A1 | 3/2004 | Azami et al. |
| 2004/0268413 A1 | 12/2004 | Reid |
| 2006/0259877 A1 | 11/2006 | Kaminagayoshi |
| 2006/0265349 A1 | 11/2006 | Hicken |
| 2007/0130159 A1 | 6/2007 | Gulli et al. |
| 2007/0192739 A1 | 8/2007 | Hunleth et al. |
| 2008/0086687 A1* | 4/2008 | Sakai ............ G06F 3/04812 715/716 |
| 2009/0046545 A1 | 2/2009 | Blinnikka |
| 2009/0193465 A1 | 7/2009 | Yi |
| 2010/0262938 A1 | 10/2010 | Woods |
| 2011/0035705 A1 | 2/2011 | Faenger et al. |
| 2011/0234480 A1 | 9/2011 | Fino et al. |
| 2012/0042007 A1 | 2/2012 | Weel |
| 2012/0078398 A1 | 3/2012 | Xu et al. |
| 2012/0173981 A1 | 7/2012 | Day |
| 2012/0311444 A1 | 12/2012 | Chaudhri |
| 2013/0047084 A1* | 2/2013 | Sanders ........... G06F 17/30053 715/716 |
| 2013/0067328 A1 | 3/2013 | Salyards et al. |
| 2013/0113737 A1* | 5/2013 | Shiba ................ G06F 3/041 345/173 |
| 2013/0178962 A1 | 7/2013 | DiMaria et al. |
| 2014/0035831 A1 | 2/2014 | Fino |
| 2014/0122589 A1 | 5/2014 | Fyke et al. |
| 2014/0123006 A1 | 5/2014 | Chen et al. |
| 2014/0181199 A1 | 6/2014 | Kumar et al. |
| 2014/0181656 A1 | 6/2014 | Kumar et al. |
| 2014/0223303 A1* | 8/2014 | Cox ................. H04L 65/60 715/716 |
| 2014/0304756 A1* | 10/2014 | Fletcher ........... H04N 21/2387 725/115 |
| 2014/0306976 A1 | 10/2014 | Sugiura et al. |
| 2014/0325357 A1 | 10/2014 | Sant et al. |
| 2014/0331133 A1* | 11/2014 | Coburn, IV ......... G11B 27/00 715/716 |
| 2015/0334204 A1* | 11/2015 | Bilinski ............. H04L 67/2857 715/748 |
| 2016/0103589 A1 | 4/2016 | Dziuk et al. |

OTHER PUBLICATIONS

Office Action from the United States Patent and Trademark Office for U.S. Appl. No. 14/231,203, mailed Sep. 17, 2015, 16 pages.
European Patent Office, Extended Search Report for European Patent Application No. EP14162386.8, dated Aug. 25, 2014, 7 pages.
Office Action from the United States Patent and Trademark Office for U.S. Appl. No. 14/053,443, mailed Apr. 27, 2015, 11 pages.
Office Action from the United States Patent and Trademark Office for U.S. Appl. No. 14/231,203, mailed Jun. 18, 2014, 12 pages.
Office Action from the United States Patent and Trademark Office for U.S. Appl. No. 14/231,203, mailed Oct. 28, 2014, 15 pages.
Office Action from the United States Patent and Trademark Office for U.S. Appl. No. 14/231,203, mailed May 13, 2015, 16 pages.
Office Action from the United States Patent and Trademark Office for U.S. Appl. No. 14/060,495, mailed Jul. 27, 2015, 18 pages.
International Preliminary Report on Patentability issued on international application No. PCT/IB2013/002808 on Apr. 14, 2015, 16 pages.
Office Action from the United States Patent and Trademark Office for U.S. Appl. No. 14/231,170, mailed Jun. 26, 2014, 22 pages.
Office Action from the United States Patent and Trademark Office for U.S. Appl. No. 14/231,170, mailed Oct. 28, 2014, 28 pages.
Office Action from the United States Patent and Trademark Office for U.S. Appl. No. 14/231,170, mailed May 1, 2015, 29 pages.
Office Action from the United States Patent and Trademark Office for U.S. Appl. No. 14/879,774, dated Feb. 8, 2016, 11 pages.
Notice of Allowance from the United States Patent and Trademark Office for U.S. Appl. No. 14/879,737, dated Apr. 12, 2016, 9 pages.
Office Action from the United States Patent and Trademark Office for U.S. Appl. No. 14/228,605, dated Apr. 26, 2016, 10 pages.
Notice of Allowance from the United States Patent and Trademark Office for U.S. Appl. No. 14/879,774, dated Jul. 6, 2016, 7 pages.
European Patent Office, Extended Search Report for European Patent Application No. EP16161961.4, dated Jun. 15, 2016, 10 pages.

* cited by examiner

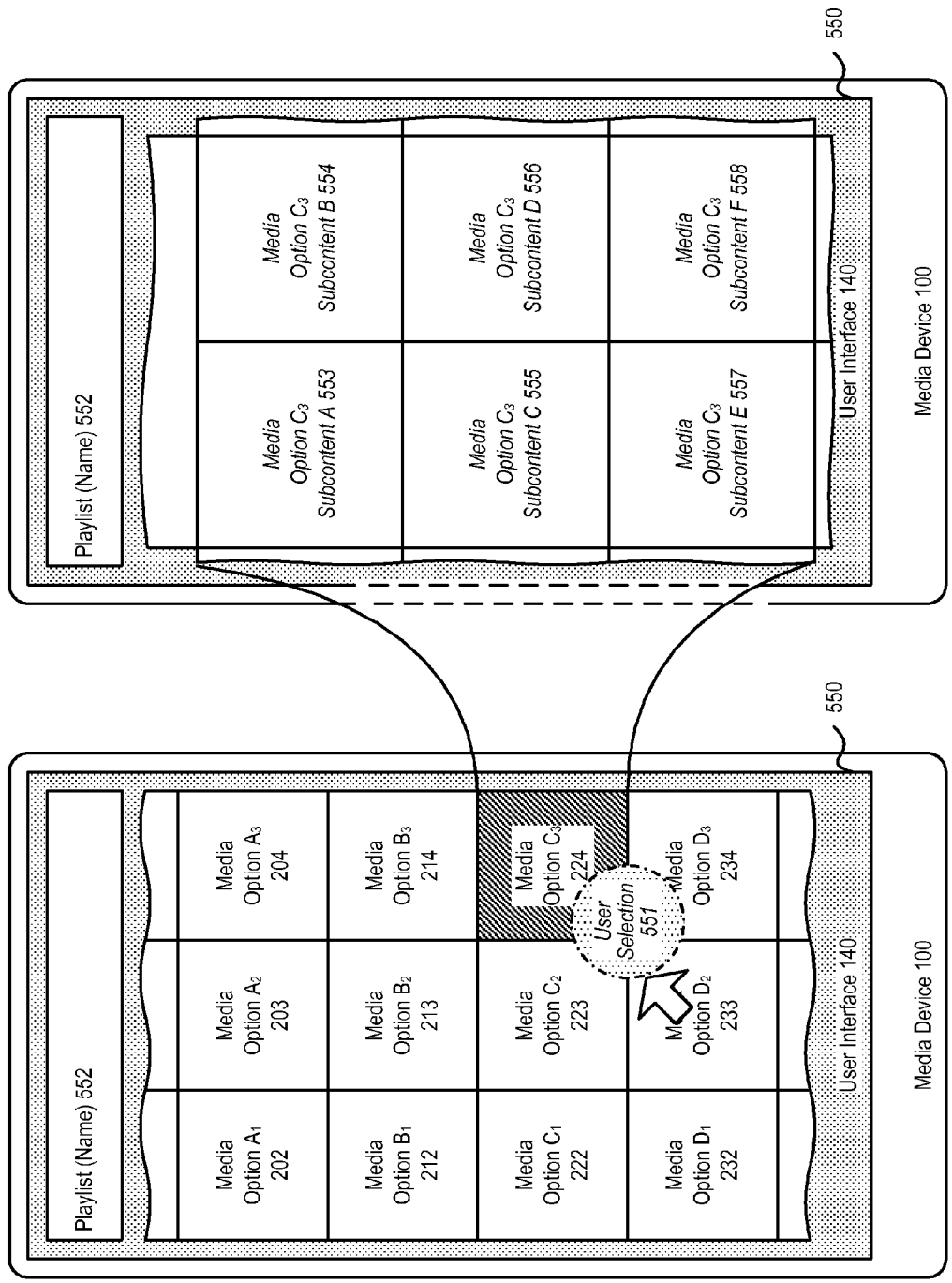

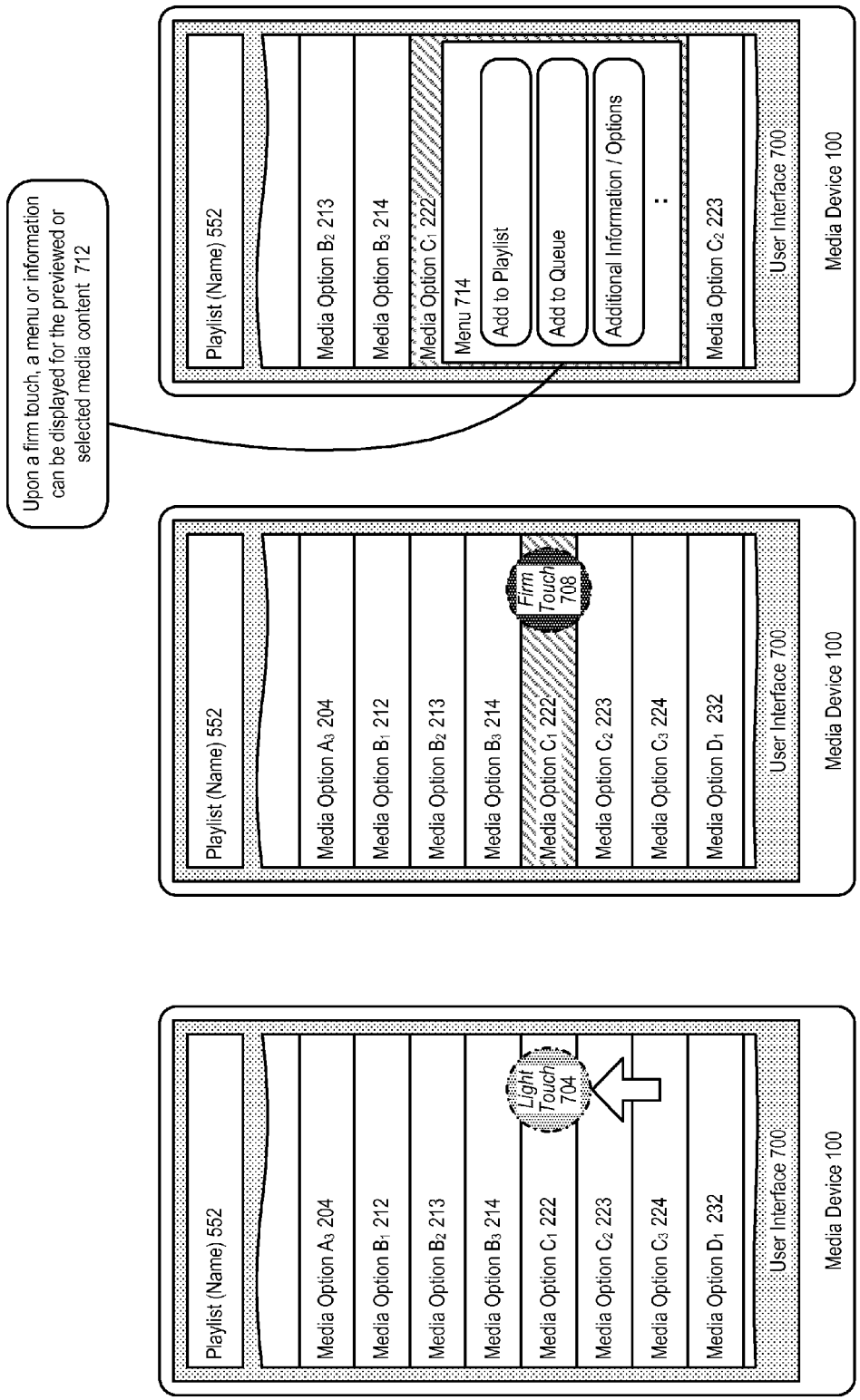

SYSTEM AND METHOD FOR PLAYBACK OF MEDIA CONTENT WITH SUPPORT FOR AUDIO TOUCH CACHING

CLAIM OF PRIORITY

This application claims the benefit of priority to U.S. Provisional Applications "SYSTEM AND METHOD FOR PLAYBACK OF MEDIA CONTENT WITH AUDIO SPINNER FUNCTIONALITY", Application No. 62/062,573, filed Oct. 10, 2014; "SYSTEM AND METHOD FOR PLAYBACK OF MEDIA CONTENT WITH SUPPORT FOR AUDIO TOUCH CACHING", Application No. 62/062,580, filed Oct. 10, 2014; "SYSTEM AND METHOD FOR PLAYBACK OF MEDIA CONTENT WITH AUDIO TOUCH MENU FUNCTIONALITY", Application No. 62/062,582, filed Oct. 10, 2014; and "SYSTEM AND METHOD FOR PLAYBACK OF MEDIA CONTENT WITH SUPPORT FOR FORCE-SENSITIVE TOUCH INPUT", Application No. 62/217,767, filed Sep. 11, 2015; each of which above applications are herein incorporated by reference.

CROSS-REFERENCE TO RELATED APPLICATIONS

This application is related to U.S. patent application titled "SYSTEM AND METHOD FOR MULTI-TRACK PLAYBACK OF MEDIA CONTENT", application Ser. No. 14/228,605, filed Mar. 28, 2014, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to means for providing music, video, or other media content, and are particularly related to features for improving user interaction, such as use of audible notifications, media caching, and touch menus.

BACKGROUND

The digital media industry has evolved greatly within the past several years. Today's consumers enjoy the ability to access a tremendous amount of media content, such as music and videos, at any location or time of day, using a wide variety of computing systems, handheld entertainment devices, smartphones, or other types of media device. With the availability of reliable high-speed Internet connectivity, and advances in digital rights management, many users can now stream media content, on demand, from peer devices or remote servers.

However, with the increase in the amount of media content available, there exists the challenge of how to best provide access to that content. Much interest has been directed to techniques that enable users to interact with media content libraries in a user-friendly and intuitive manner which does not interfere with their enjoyment of the content. These are generally the types of environment in which embodiments of the invention can be used.

SUMMARY

In accordance with an embodiment, described herein is a system and method for playback of media content, for example music, video, or other media content. A media device having a media playback application and including a touch-sensitive user interface can be adapted to display a visual array of media options, for example as a grid or list of card elements. Each media option can be associated with one or more media content items that can be streamed to and/or played on the device. The system can determine a selected card element, or media options that are proximate to a selected point or region of the visual array, and play or crossfade media content as appropriate. In accordance with various embodiments, additional features can be provided that improve user interaction, for example the use of audible notifications, media caching, or touch menus, including support for force-sensitive touch input.

BRIEF DESCRIPTION OF THE FIGURES

FIGS. 22A-22B further illustrate a system which includes a touch menu, in accordance with an embodiment.

FIG. 41A-41C further illustrates the use of a touch menu including support for force-sensitive touch input, in accordance with an embodiment.

DETAILED DESCRIPTION

As described above, today's consumers of digital media enjoy the ability to access a tremendous amount of media content, such as music and videos, at any location or time of day, using a wide variety of computing systems, handheld entertainment devices, smartphones, or other types of media device. However, with the increase in the amount of media content available, there exists the challenge of how to best provide access to that content in a user-friendly and intuitive manner.

To address this, in accordance with an embodiment, described herein is a system and method for playback of media content, for example music, video, or other media content. A media device having a media playback application and including a touch-sensitive user interface can be adapted to display a visual array of media options, for example as a grid or list of card elements. Each media option can be associated with one or more media content items that can be streamed to and/or played on the device. The system can determine a selected card element, or media options that are proximate to a selected point or region of the visual array, and play or crossfade media content as appropriate.

In accordance with various embodiments, additional features can be provided that improve user interaction, for example the use of audible notifications, media caching, or touch menus, including support for force-sensitive touch input.

Figure 1:
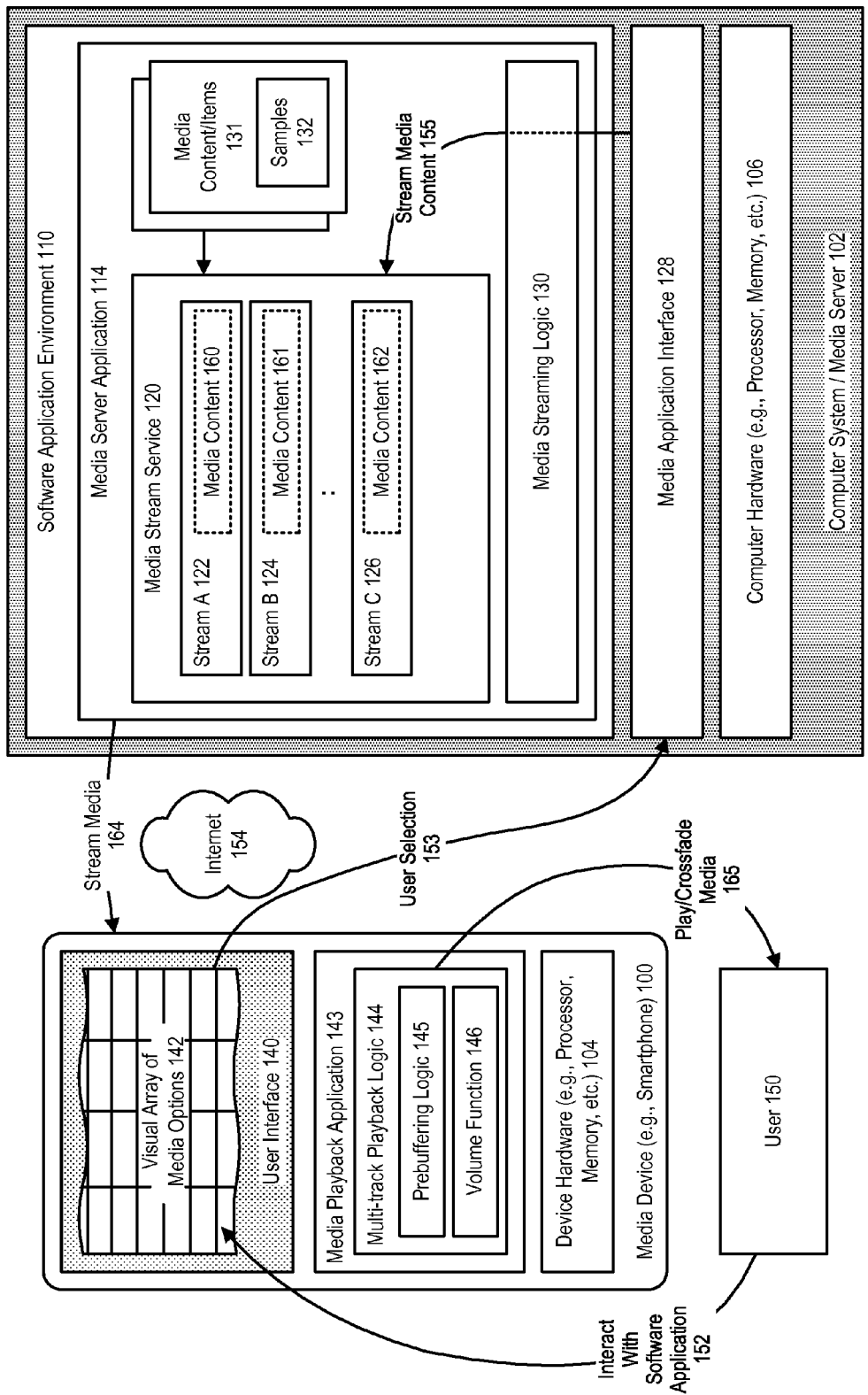
FIG. 1 illustrates a system for playback of media content, in accordance with an embodiment.

FIG. 1 illustrates a system for playback of media content, in accordance with an embodiment. As shown in FIG. 1, in accordance with an embodiment, a media device or player 100, for example a computing system, handheld entertainment device, smartphone, or other type of media device capable of playing media content, can be used to play media content that is provided by a computer system operating as a media server 102, or from another system or peer device.

Each of the media device and the computer system operating as the media server can include, respectively, one or more physical computer or hardware resources 104, 106, such as one or more processors (CPU), physical memory, network components, or other types of hardware resources.

In accordance with an embodiment, the media server can include an operating system or other processing environment which supports execution of a software application environment 110, including a media server application 114 which can be used, for example, to stream music, video, or other forms of media content. A media stream service 120 can be used to buffer media content, for streaming to one or more streams 122, 124, 126. A media application interface 128 can receive requests from media devices or other systems, to retrieve media content from the media server.

Media content or items 131 (generally referred to herein as media content items), and/or samples 132 associated with the media content items, can be provided, for example, within a database or repository, or can be received at the media server from another source.

In accordance with an embodiment, each media content item that can be provided by the media server can be associated with one or more samples. For example, in accordance with an embodiment, a particular media content item can be associated with a plurality of samples of different playing durations, each of which can be taken from different segments (for example, the beginning, or the middle) of the media content item. The samples can be similarly stored at, and thereafter provided by, the media server. The determination of which of the plurality of samples to use at a particular point in time depends on the particular implementation, and may also take into account realtime considerations such as balancing network bandwidth usage versus providing a smoother user experience.

In accordance with an embodiment, the samples can be snippets or fragments of an associated media content that are determined by a media content producer (e.g., a record label) to reflect that particular media content (e.g., a particular song track) created by that content producer. For example, a song snippet may be a particularly recognizable portion of a particular song. Similarly, a video content snippet may be a particularly recognizable portion of a particular video content. In accordance with various embodiments, other types of samples or snippets can be used to provide a preview of an associated media content.

For example, in accordance with an embodiment, the system can use 30, 60, or 90 second audio-preview snippets for every song track. Longer snippets can provide a sufficient audio impression for the user of tuning into a particular track and being able to hear it through to its the end, after which the player can continue playing whatever is next in that context, providing an "on-demand" experience.

In accordance with an embodiment, a media streaming logic 130 can be used to retrieve or otherwise access the media content items, and/or the samples associated with the media content items, in response to requests from media devices or other systems, and populate the media stream service with streams of corresponding media content data that can be returned to the requesting device.

As described above, in accordance with an embodiment, the media device can be a computing system, handheld entertainment device, smartphone, or other type of device that can playback media content. Although in FIG. 1 only a single media device and media server is shown, in accordance with an embodiment, the media server can support the simultaneous use of multiple media devices, and/or the media device can simultaneously access media content at multiple media servers.

In accordance with an embodiment, the media device can include a user interface 140, which is adapted to display or otherwise provide a visual array of media options 142, for example as a two-dimensional grid or list of card elements, or another visual array format, and determine a user input. Examples of various embodiments of visual arrays are described in further detail below.

Selecting a particular media option, e.g., a particular card element, within the visual array can be used as a request or instruction to the media server application to stream or otherwise return a corresponding particular item of media content.

For example, in accordance with various embodiments, the software application environment at the media server can be used to stream or otherwise communicate music, video, or other forms of media content to the media device, wherein the user interface at the media device is adapted to display a plurality of music or video titles that correspond to music or videos stored as media content items in a database or repository at the media server.

In accordance with an embodiment, the media device can include a media playback application 143, together with a multi-track playback logic 144, prebuffering logic 145, and playback volume function 146, which can be used to control the playback and crossfading of media content items and/or samples that are received from the media server application, for playback by the media device, as described in further detail below.

In accordance with an embodiment, the prebuffering logic is configured to load or pre-buffer a portion of each media content item, sample, or snippet, at the media device, as determined by the multi-track playback logic. While media options are being prepared for display, their related media content can be pre-buffered at the same time, allowing for a playback experience that, from the user's perception, seems immediate.

In accordance with an embodiment, a user 150 can interact 152 with the application user interface and issue requests, for example the playing of a selected music or video item on their media device.

In accordance with an embodiment, the user's selection of a particular media option can be communicated 153 to the media server application, via the media application interface. The media server application can then stream corresponding media content 155, including one or more streams of media content data 160, 161, 162, and subsequently stream 164 or otherwise communicate the, e.g., selected music, video, or other form of media content, to the user's media device. In accordance with an embodiment, pre-buffering requests from the media device can also be communicated to the media server application via the media application interface.

At the media device, in response to the user's interaction with the user interface, the media playback application, multi-track playback logic, and playback volume function can combine, crossfade, or otherwise play 165 the requested media content to the user, for example by playing back one or more music or videos on the media device, as described in further detail below.

Figure 2:
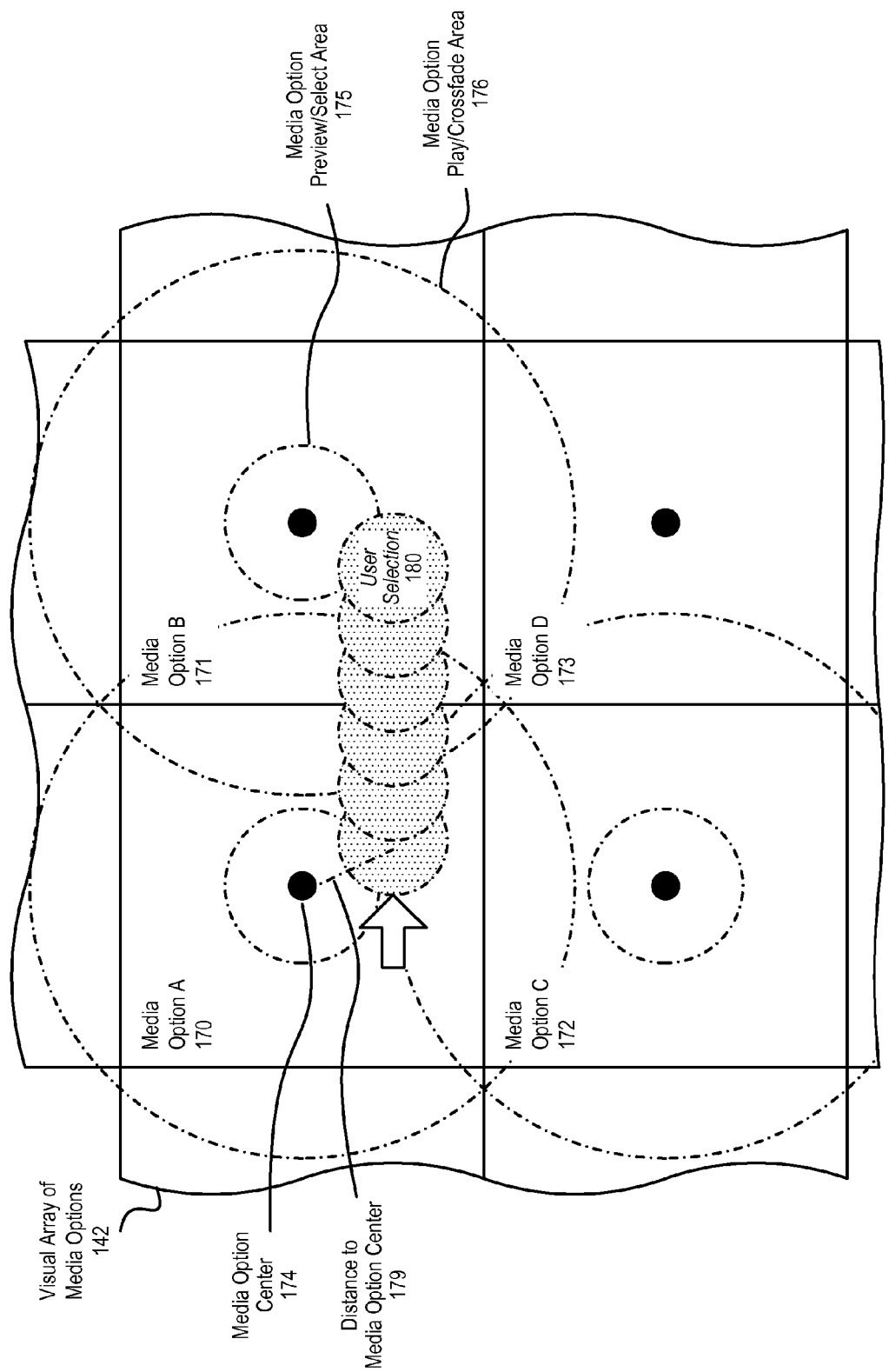
FIG. 2 illustrates playback of media content, in accordance with an embodiment.

FIG. 2 illustrates playback of media content, in accordance with an embodiment. In accordance with an embodiment, a user interface can display a visual array of media options arranged as a two-dimensional grid, with rows and columns of media options visualized as tile-like card elements, wherein each of the media options is associated with one or more media content items that can be played on the device. As shown in FIG. 2, in the example illustrated therein, four media options A (170), B (171), C (172), and D (173) are visualized as tile-like card elements, each of which has a media option center 174 (illustrated in the figure as a point), a relatively smaller media preview/select area 175 that is centered on the media option center, and a relatively larger media play/crossfade area 176 that generally covers the media option, and, depending on the particular implementation, can also extend to cover portions of other card elements or media options.

In accordance with an embodiment, a plurality of media options, for example a set of song tracks, a music playlist, or the contents of an album or a media library, can be represented on the user interface as an array of tiles, and wherein each tile can be associated with a particular visualization, for example a cover art identifying a represented song track.

In accordance with other embodiments, other forms of visualization can be used for the media options, for example texts, colors, images, or animations. While a selected point or region is moved within the grid of media options, the visualization or appearance of those media options that are proximate to the selected point or region can be modified, for example by varying their opacity, to reflect their status as proximate media options.

For example, in accordance with an embodiment, the opacity of a particular point or region, including the closest media option/tile and/or proximate media options/tiles, can be modified to render the closest or proximate media options to a selected point or region in a more visible manner than other (not selected, or not proximate) options/tiles.

In accordance with an embodiment, a user can provide input as a user selection of a point or region 180. In accordance with an embodiment, the user interface can be a touch-sensitive user interface, which recognizes input in the form of touch—for example the position of a user's finger or a stylus upon the user interface—to determine the selected point or region as it is being moved, in response to a user input, within the visual array of media options (referred to herein in some embodiments as "audio touch" or "audiotouch"). In the case of a mouse-based interface, the input can be provided by a mouse-down event.

In accordance with an embodiment, the system can, upon receiving the user input, initialize playback of those media options associated with the selected point or region. Selected media options (e.g., music or song tracks) can be played simultaneously according to a playback volume function, wherein playback parameters, such as the playback volume depends on the distance between the point of input and a specified point of the media option's (e.g., the song track's) array or tile visualization.

Figure 3:
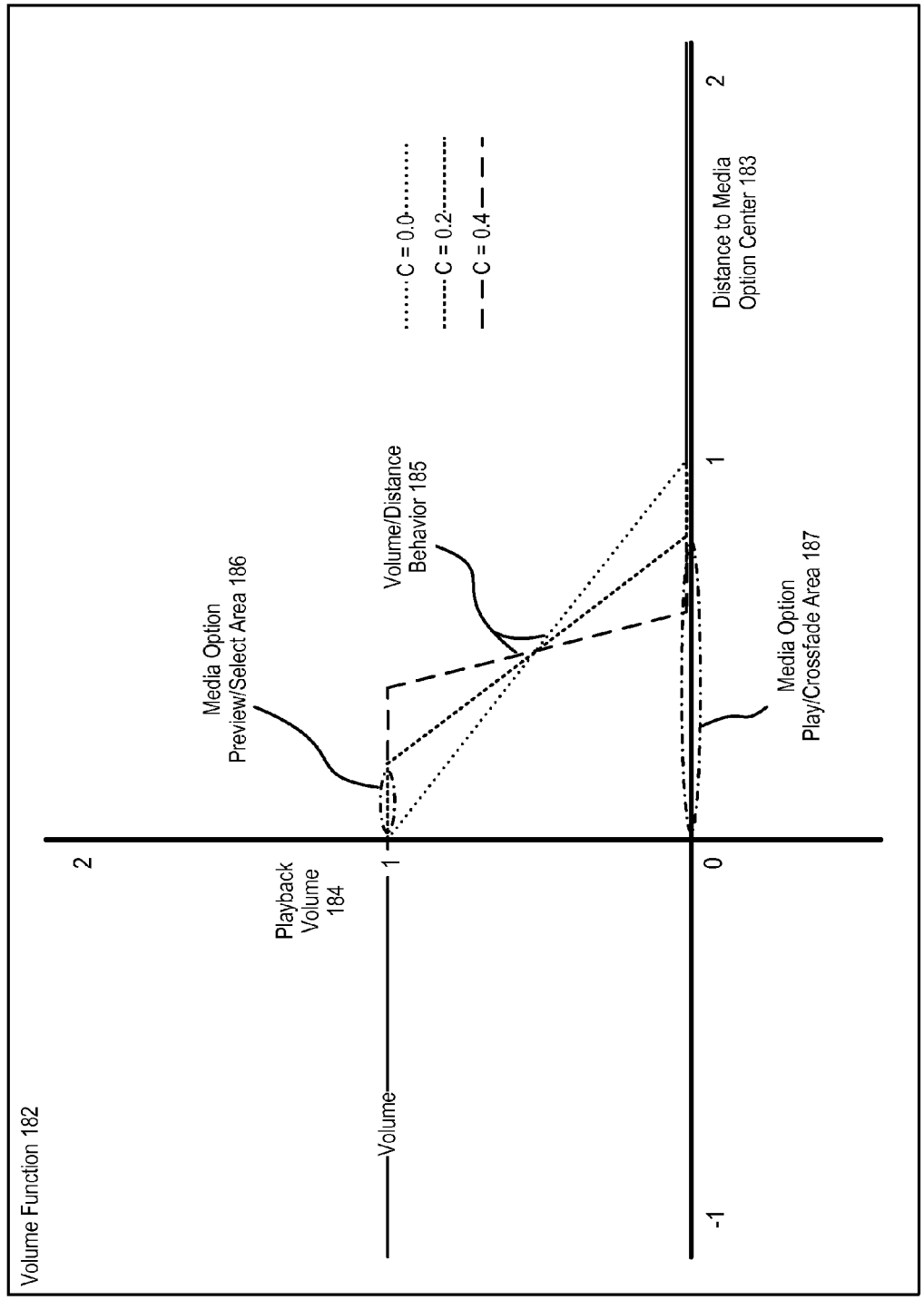
FIG. 3 illustrates an example of a playback volume function, in accordance with an embodiment.

FIG. 3 illustrates an example of a playback volume function 182, in accordance with an embodiment. In accordance with an embodiment, the playback volume of a media content item can be determined as a function of distance, for example:

$$y = \max(0, \min(1, ((x-0.5)/2(C-0.5))+0.5))$$

wherein
- x represents the distance 183 between the selected point or region and a particular media option element, such as its center (for example when x=0, the user's finger is considered directly on the center of the particular media option, whereas when x=1, the user's finger is on a media option that is adjacent to the particular media option);
- y represents a playback volume 184 (for example, 0 being silent, and 1 being a maximum or full playback volume); and
- C is a constant which reflects a distance from a particular media option's center that still results in full playback volume, such as the preview/select area described above.

As shown in FIG. 3, depending on the value used for C (examples of which for C=0.0, C=0.2, and C=0.4 are illustrated), different volume/distance behaviors 185 can be defined, which can be used to determine the size of the media preview/select area 175, the size of the media play/crossfade area 176, and the crossfading behavior, to address the needs of a particular implementation, or to suit a desired user experience.

The example illustrated in FIG. 3 is provided for purposes of illustration. In accordance with other embodiments, or to address the needs of other implementations, other types of playback volume functions, including the use of different functions, criteria, and constants, can be used.

In accordance with an embodiment, in the case of a visual array representation, such as a grid, that uses a plurality of tiles, the system can use the middle point of a tile as a point of calculating distance 179 from the selection point or region. In accordance with an embodiment, if the distance is zero, then the system considers that determination to be an actual selection by the user of that media option (e.g., that song track). In accordance with an embodiment, since it may be difficult for a user to precisely select the center of a tile, an area (e.g., 20-50%) of each tile, generally corresponding to the media preview/select area in FIG. 2, can be considered as centered on that particular option.

In accordance with an embodiment, if the selected point or region is more than one tile size away from a particular media option, then the playback volume of that particular media option is set to zero. In accordance with an embodiment, a two-dimensional grid can measure relative distance along both x and y axes. In the case of a one-dimensional array, for example a vertical list, then the system need only determine relative distance along one axis (e.g., the y axis), since it will not matter where the finger is along the x axis within a particular tile.

In accordance with an embodiment, media content items (e.g., song tracks), that are assigned a playback volume value of zero, are not being played. In accordance with an embodiment, while the triggering user input still lasts (for example, the user explores the available media options by keeping their finger touching the screen while moving, or the mouse button is held down), changing the input position (e.g., moving the finger, or moving the mouse cursor respectively), the system will recalculate the relative combination of the media content in the output, providing an audio crossfading effect that is controllable by the user.

In accordance with an embodiment, after ending the triggering input (e.g., the user releasing their finger, or releasing the mouse button respectively), then depending on the particular implementation, the media content item that is nearest the last movement input may either continue to play, or the playback can stop.

In accordance with an embodiment, while displaying a grid of tile-like card element, the media device can pre-buffer a specified number of bytes from the audio snippets, for example 1 to 5 seconds. This enables the system, upon receiving a user input, to play back the track immediately using the pre-buffered data, and continue fetching the rest of it. This allows for minimal latency of starting the playback, which results in a compelling user experience.

Listing 1 provides an exemplary pseudocode of a method for determining multi-track playback of media content, in accordance with an embodiment. The pseudocode shown therein is provided for purposes of illustration. In accordance with other embodiments, other methods of determining multi-track playback of media content can be used.

Listing 1

```
Number clamp(Number x)
{
    return max(0, min(1, x))
}
# Calculate the volume for a given media element and a selection
# position. The coordinate system is assumed to be normalized so
# that the distance between different media elements is 1.
Number calculateMediaPlaybackVolume(
    Vector mediaPosition,
    Vector selectionPosition)
{
    Number distance = |mediaPosition – selectionPosition|
    Number cappedDistance = 0.2
    return clamp((distance – 0.5) / 2(cappedDistance – 0.5) + 0.5)
}
```

In accordance with an embodiment, the system can determine if the distance between the user selection of a particular point or region, is less distant from the center of a media option than a defined distance. If it is, then the playback volume for that media option is set to a relative value of 1 (within a range of 0 to 1), which makes it easier for the user to select a media option preview point without media noise from nearby media options. The linear distance of the user selection can be determined to be 1 when the user selection is within the preview/select area, and taper off to 0 at a distance generally corresponding to the play/crossfade area.

Having calculated a clamped distance of the user selection with respect to each of a plurality of media options, the system can then determine relative playback volume based on that distance, with shorter distances having higher playback volume, and longer distances having lower playback volume.

For example, as shown in Listing 1:

Number distance=|mediaPosition−selectionPosition|

In accordance with an embodiment, if the distance from a selection to the media element's position is less than a cappedDistance, the volume will be 1, which makes it easier to hit the preview point without hearing noise from tracks nearby. In order for this to work properly, the volume must be zero when distance is more than 1-cappedDistance;

otherwise the media element could be playing when another element should be the only one being played back. In this example, the value for cappedDistance must be within (0, 0.5).

Listing 1 illustrates a clamped linear function that meets the following requirements:

- $0 \le f(x) \le 1$ (i.e., the volume is never less than silent, or more than full volume);
- $f(x)+f(1-x)=1$ (i.e., while the user continually moves the selection between the adjacent media elements, the sum of the volumes of those two media elements is full volume);
- f is monotonically decreasing (i.e., while the user moves the selection away from a media element the volume never increases); and
- f(cappedDistance)=1 (i.e., the volume at this distance is at max even when the selection isn't exactly at the very center of the media element).

In accordance with an embodiment, as a visualization feature, while the user moves the selected point or region, for example by moving their finger over the media options, the opacity of the tiles can also be modified using a distance-based function similar to the one used to calculate playback volume.

Figure 4B:
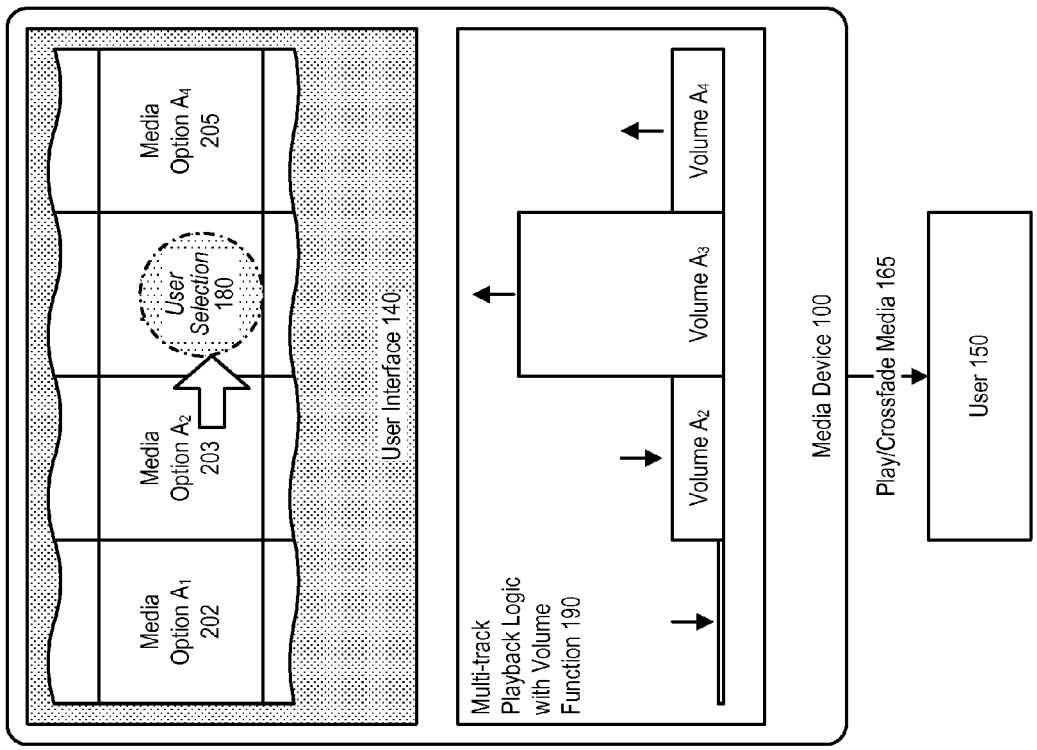
FIGS. 4A-4B further illustrate playback of media content, in accordance with an embodiment.
Figure 4A:
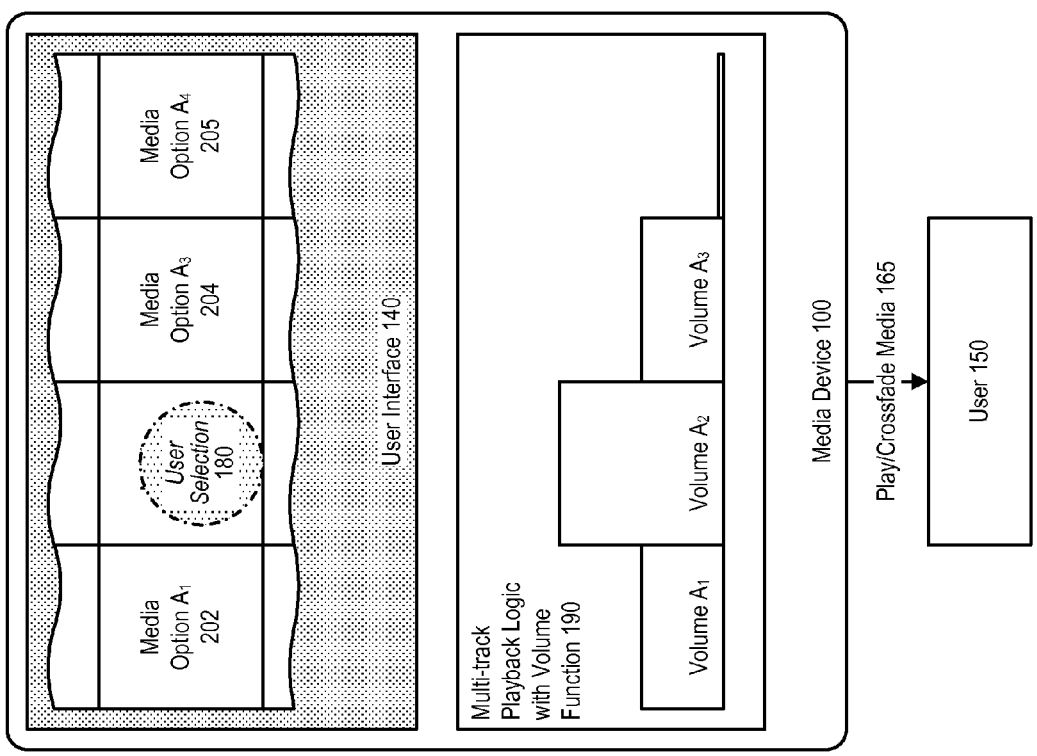

FIGS. 4A-4B further illustrate playback of media content, in accordance with an embodiment. As shown in FIG. 4A, in the example user interface illustrated therein, a visual array of media options $A_1$ through $A_4$ (202-205) are shown, each of which media options is associated with one or more media content items. A user can make a selection of a particular media option, for example by placing a mouse cursor or some other selector, at a point or region within the visual array.

As described above, in accordance with an embodiment, the user interface can be a touch-sensitive user interface, which recognizes input in the form of touch, for example the position of a user's finger or a stylus upon the user interface, to determine the selected point or region within the visual array grid of media options.

In response to receiving an input from the user interface, the multi-track playback logic can determine a set of one or more of the plurality of media options that are proximate to the selected point or region (in this example, media options $A_1$, $A_2$ and $A_3$), and, together with its playback volume function, adjust playback parameters, such as the playback volume 190 of the set of media content items associated with those media options, by crossfading or otherwise combining the playback of the set of media content items to reflect their relative distances from the selected point or region.

An output can then be provided as a played-back or crossfaded media, e.g., a set of crossfaded songs, to the user. In the example illustrated in FIG. 4A, the user may perceive $A_2$ as being dominantly played, with some crossfading from sources $A_1$ and $A_3$.

In accordance with an embodiment, as shown in FIG. 4B, while the user moves their, e.g., finger, stylus, mouse cursor or other selector, to change their selection, the system can determine a new point or region or selection, and a plurality of media options that are proximate to the new point or region (in this example, media options $A_2$, $A_3$ and $A_4$).

In response to receiving the input from the user interface, the multi-track playback logic, together with its playback volume function, can again adjust playback parameters, such as the playback volume of the set of media content items associated with those media options, by crossfading or otherwise combining the playback of the set of media content items to reflect their relative distances from the newly selected point or region. The output can then be provided as different played-back or crossfaded media to the user, e.g., as a different set of crossfaded songs.

For example, while the selected point or region is moved from that shown in FIG. 4A to that shown in FIG. 4B, the relative playback volume of media content item $A_1$ and $A_2$ are decreased (in this example the playback volume of $A_1$ is reduced almost to zero), while the relative playback volume of media content item $A_3$ and $A_4$ are increased, reflecting their relative distances from the selected point or region. Particularly, the relative playback volume of $A_3$ is increased almost to the exclusion of other media content items, reflecting the much shorter distance between $A_3$ and the user's selected point or region. In the example illustrated in FIG. 4B, the user may perceive as $A_3$ being dominantly played, with little or no contribution or crossfading from any other sources.

In accordance with an embodiment if, as shown in FIG. 4B, the user's finger is still held down and a sample associated with the media content for $A_3$ ends, then playback of that media content can be repeated from the beginning of the sample.

Visual Array Grid

Figure 5:
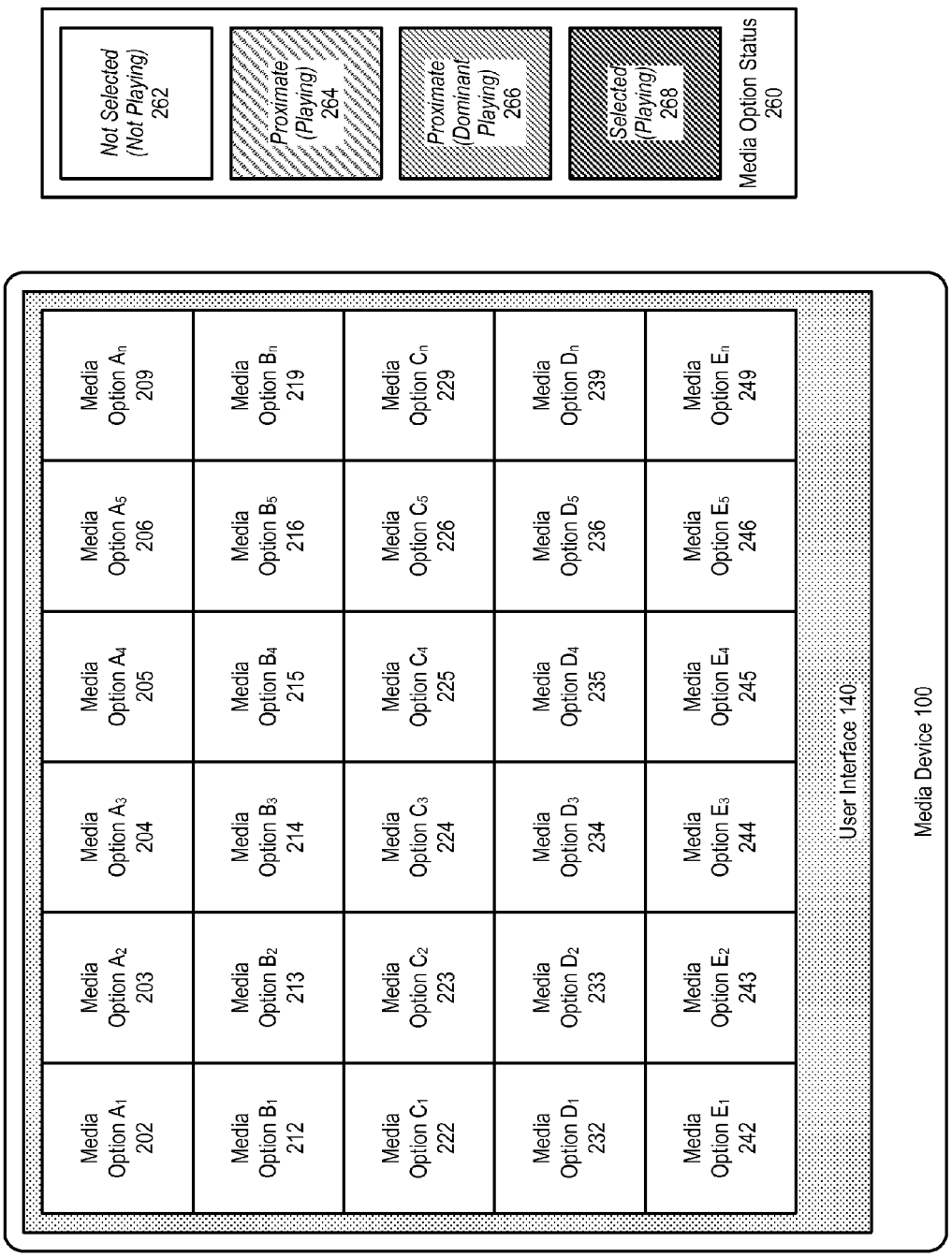
FIG. 5 illustrates a media device with an exemplary user interface which supports playback of media content, in accordance with an embodiment.

FIG. 5 illustrates a media device with an exemplary user interface which supports playback of media content, in accordance with an embodiment. As shown in FIG. 5, in accordance with an embodiment, a user interface can display, for example, on a media device, a visual array of media options arranged as a two-dimensional grid of card elements, with rows and columns of media options visualized as tiles, here illustrated as $A_1$-$A_n$ through $E_1$-$E_n$ (202-249). Each of the media options is associated with one or more media content items that can be played on the device.

For purposes of illustration, each of the media options can be associated with a status 260 that reflects, from the user's perspective, whether that particular option's associated media content item is playing or not, and, if its associated media content item is playing then whether other media content items are being played at the same time.

For example, in accordance with an embodiment, media content items can be either not selected and not playing 262; proximate to a selected point or region and playing simultaneously with other media content items 264 (i.e., from the perspective of the user, with some perceptible crossfading of other media content items); proximate to a selected point or region but playing dominantly (i.e., from the perspective of the user, with little or no contribution or crossfading of other media content items) 266; or selected and playing (i.e., by itself with no other media content items playing simultaneously) 268.

Figure 6:
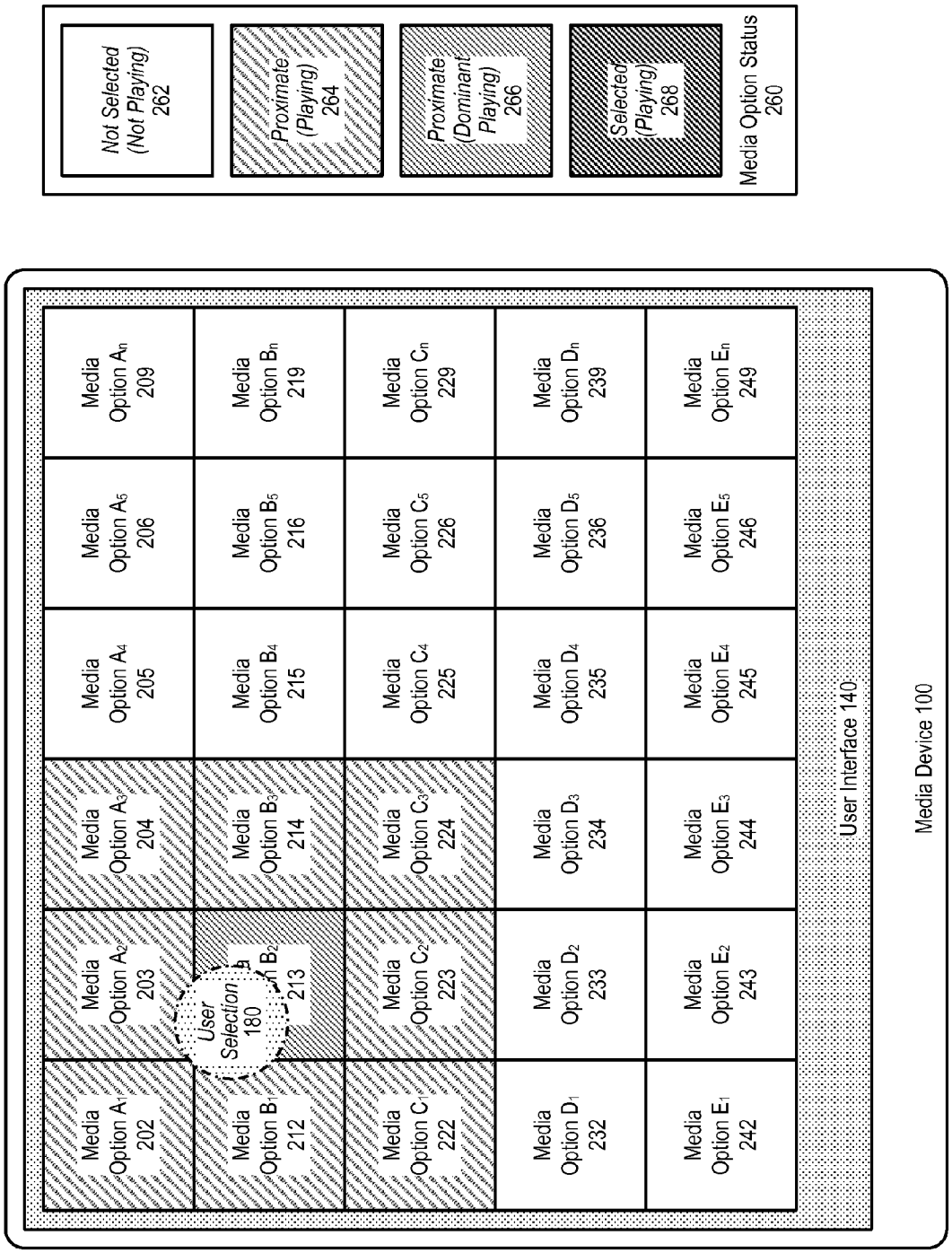
FIG. 6 further illustrates a user interface, in accordance with an embodiment.

FIG. 6 further illustrates a user interface, in accordance with an embodiment. As shown in FIG. 6, for example, a user may initially select a region (180) of the user interface generally located in the region of, but not precisely upon, media option $B_2$ (213), whose neighboring or proximate media options include $A_1$ (202), $A_2$ (203), $A_3$ (204), $B_1$ (212), $B_3$ (214), $C_1$ (222), $C_2$ (223) and $C_3$ (224).

In accordance with an embodiment, the multi-track playback logic can adjust the playback volume of media content items associated with each of these proximate media options, by crossfading or otherwise combining their playback, to reflect their relative distances from the selected point or region. The crossfaded or combined result can then be provided as a played-back media to the user.

In this example, the user may perceive an output from their media device in which media content $B_2$ is being dominantly played, with some perceptible combination of one or more of its neighboring or proximate media options as illustrated in FIG. 6.

Figure 7:
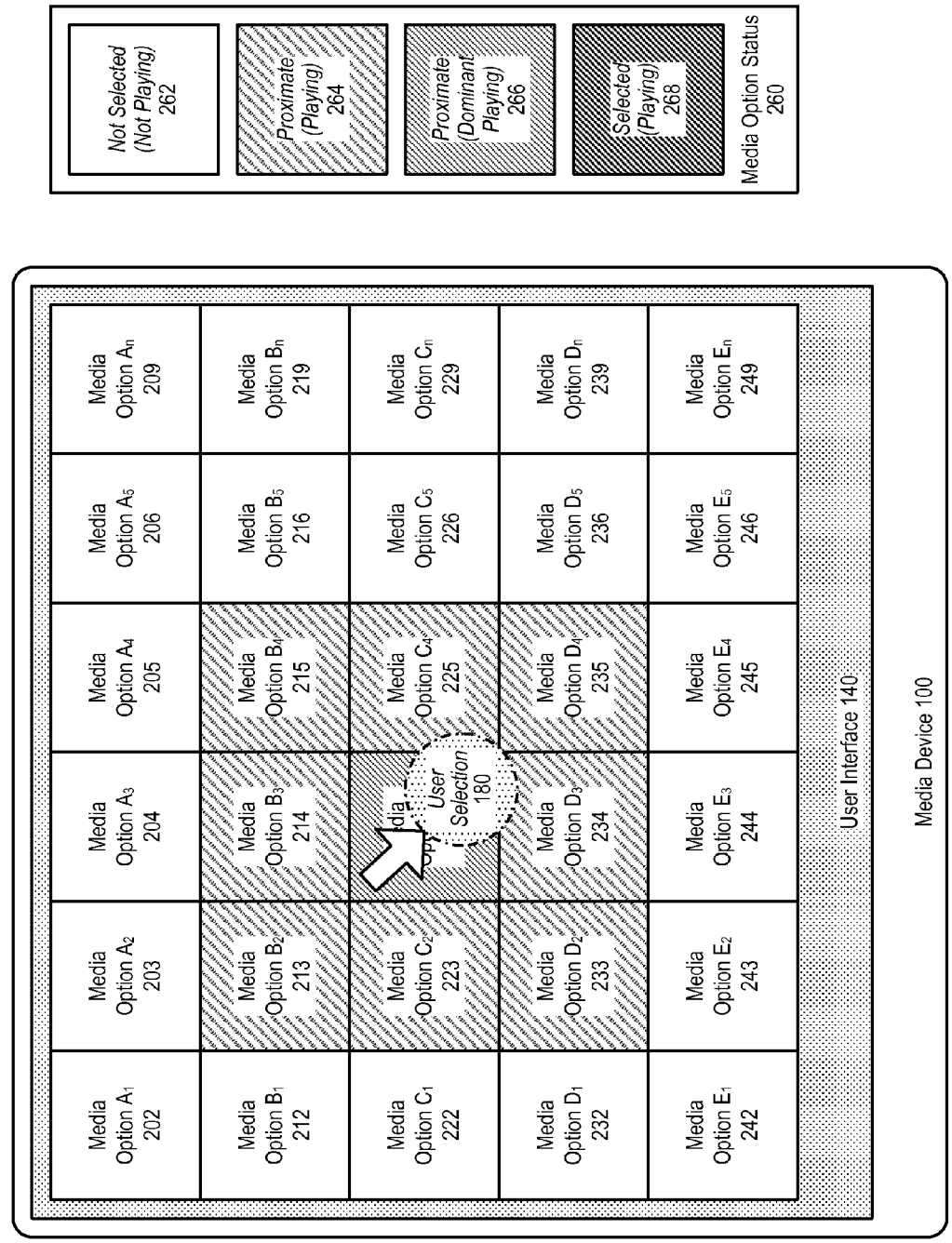
FIG. 7 further illustrates a user interface, in accordance with an embodiment.

FIG. 7 further illustrates a user interface, in accordance with an embodiment. As shown in FIG. 7, for example, a user may move their finger, mouse cursor, or other selector, to select or explore a new point or region of the user interface generally located in the region of media option $C_3$, but which is also proximate to media options $B_2$, $B_3$, $B_4$, $C_2$, $C_4$ (225), $D_2$ (233), $D_3$ (234) and $D_4$ (235). The multi-track playback logic can again adjust playback parameters, such as the playback volume of the set of media content items associated with these media options, by crossfading or otherwise combining their playback, to reflect their relative distances from the selected point or region.

In this example, the user may perceive an output from their media device in which media content $C_3$ is being dominantly played, with some perceptible combination of one or more of its neighboring or proximate media options as illustrated in FIG. 7.

Additionally, while the user moves their finger, mouse cursor, or other selector from the position shown in FIG. 6, to the position shown in FIG. 7, they may perceive a crossfading of media output as the multi-track playback logic gradually adjusts the playback volume of media content items from the initial output in which $B_2$ is being dominantly played, with some perceptible combination of one or more of its neighboring or proximate media options, to the subsequent output in which $C_3$ is being dominantly played, with some perceptible combination of one or more of its neighboring or proximate media options.

In accordance with an embodiment, a particular number of media options proximate to the selection point or region can be used, for example a window of nine (i.e., 3×3 tiles) proximate media options. However, in accordance with other embodiments, different numbers of media options proximate to the selection point or region can be used, and the chosen media options need not necessarily be in a square or other uniform pattern.

Figure 8:
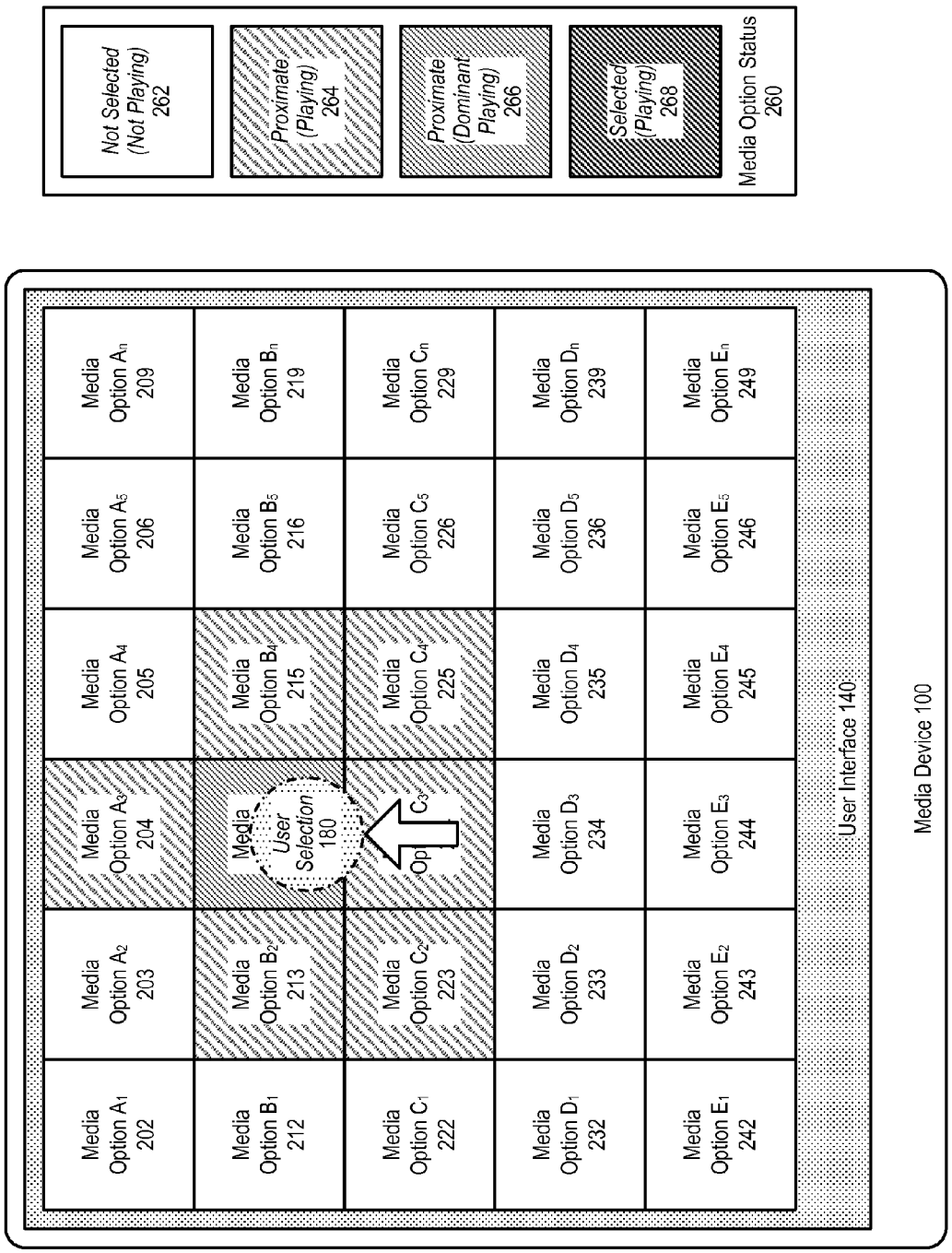
FIG. 8 further illustrates a user interface, in accordance with an embodiment.

FIG. 8 further illustrates a user interface, in accordance with an embodiment.

As shown in FIG. 8, for example, a user may again move their finger, mouse cursor, or other selector, to select or explore another new point or region of the user interface generally located at media option $B_3$, but which is also proximate to media options $A_3$ (204), $B_2$, $B_4$ (215), $C_2$, $C_3$ and $C_4$.

Again, the multi-track playback logic can adjust playback parameters, such as the playback volume of the set of media content items associated with these media options, by crossfading or otherwise combining their playback, to reflect their relative distances from the selected point or region, in this example using just seven media options.

Again also, the user may perceive a crossfading of media output as the multi-track playback logic gradually adjusts the playback volume of media content items from the original output in which $C_3$ is being dominantly played, to the subsequent output in which $B_3$ is being dominantly played.

Figure 9:
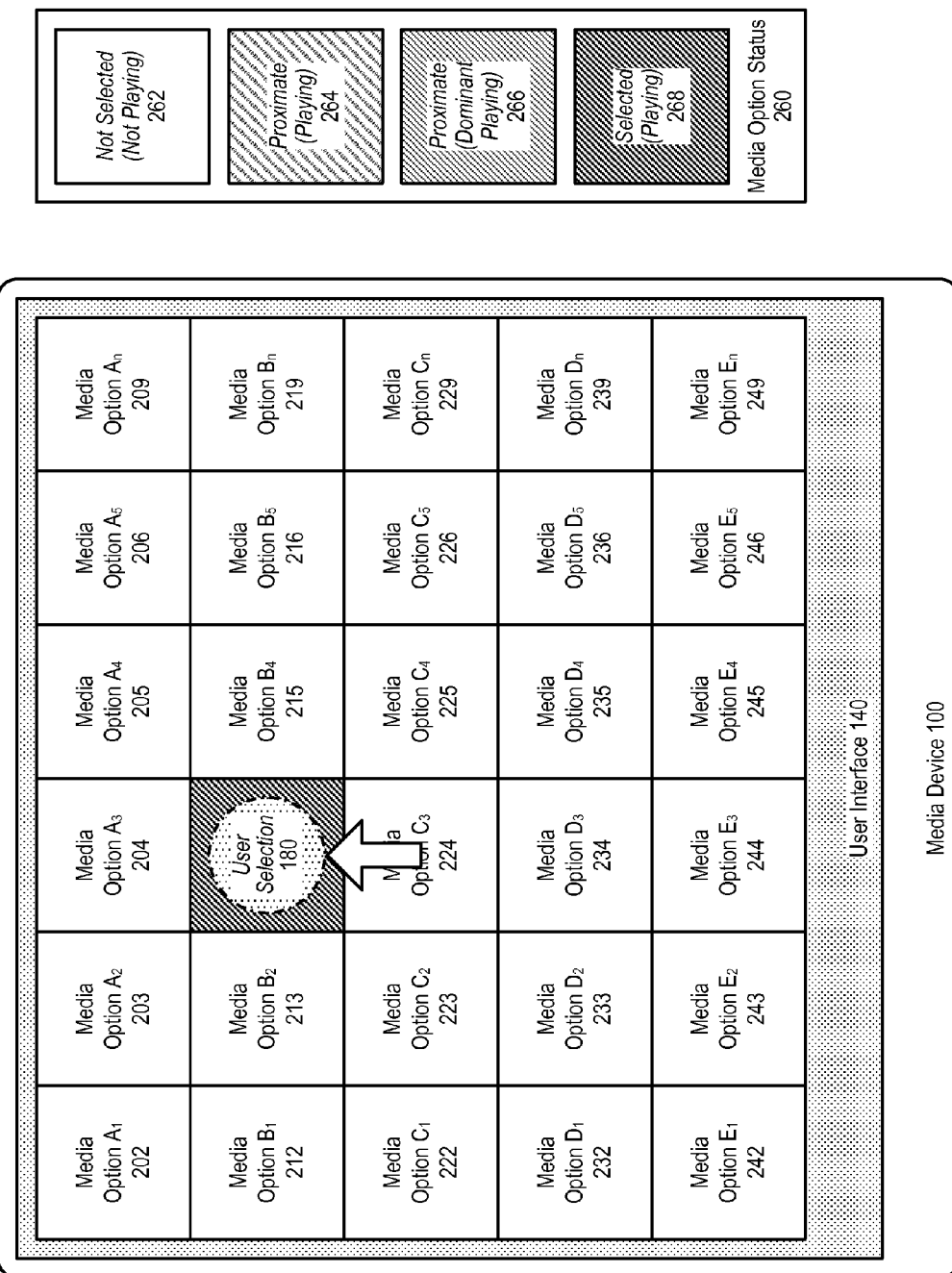
FIG. 9 further illustrates a user interface, in accordance with an embodiment.

FIG. 9 further illustrates a user interface, in accordance with an embodiment. As shown in FIG. 9, in accordance with an embodiment, if the user moves their finger, mouse cursor, or other selector, to select the center of a point or region of the user interface generally located at a media option, and leaves it there for a period of time, then in accordance with an embodiment, that media content item can be selected, and played by itself (i.e., from the perspective of the user, with no other media content items playing simultaneously).

Figure 10:
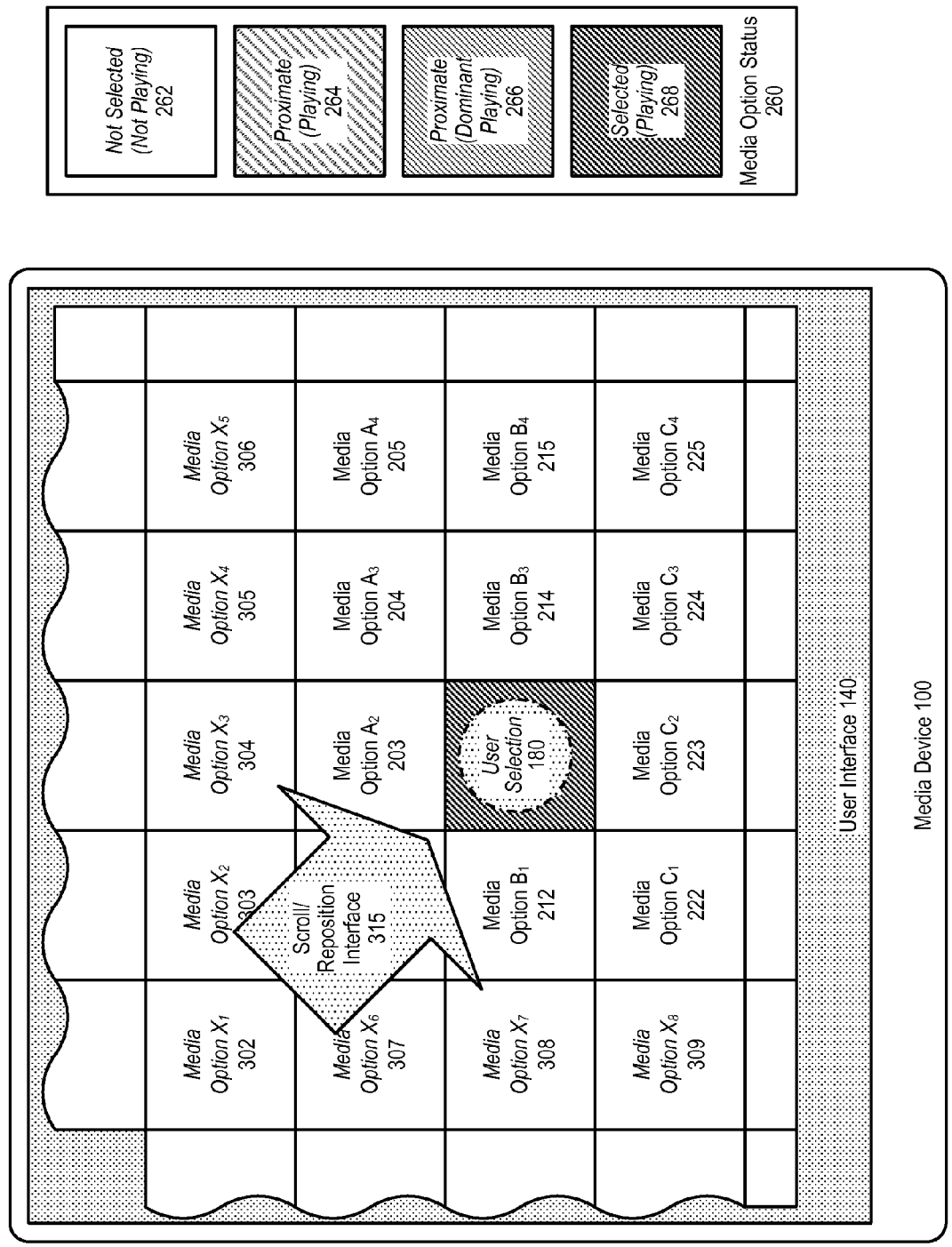
FIG. 10 further illustrates a user interface, in accordance with an embodiment.

FIG. 10 further illustrates a user interface, in accordance with an embodiment. As shown in FIG. 10, in accordance with an embodiment, while a media content item is selected and being played, the grid can be automatically scrolled or repositioned 315, both generally centering the currently selected point or region, and in this example displaying on the user interface new or additional media options $X_1$-$X_8$ (302-309), which can be subsequently selected by the user.

Figure 11:
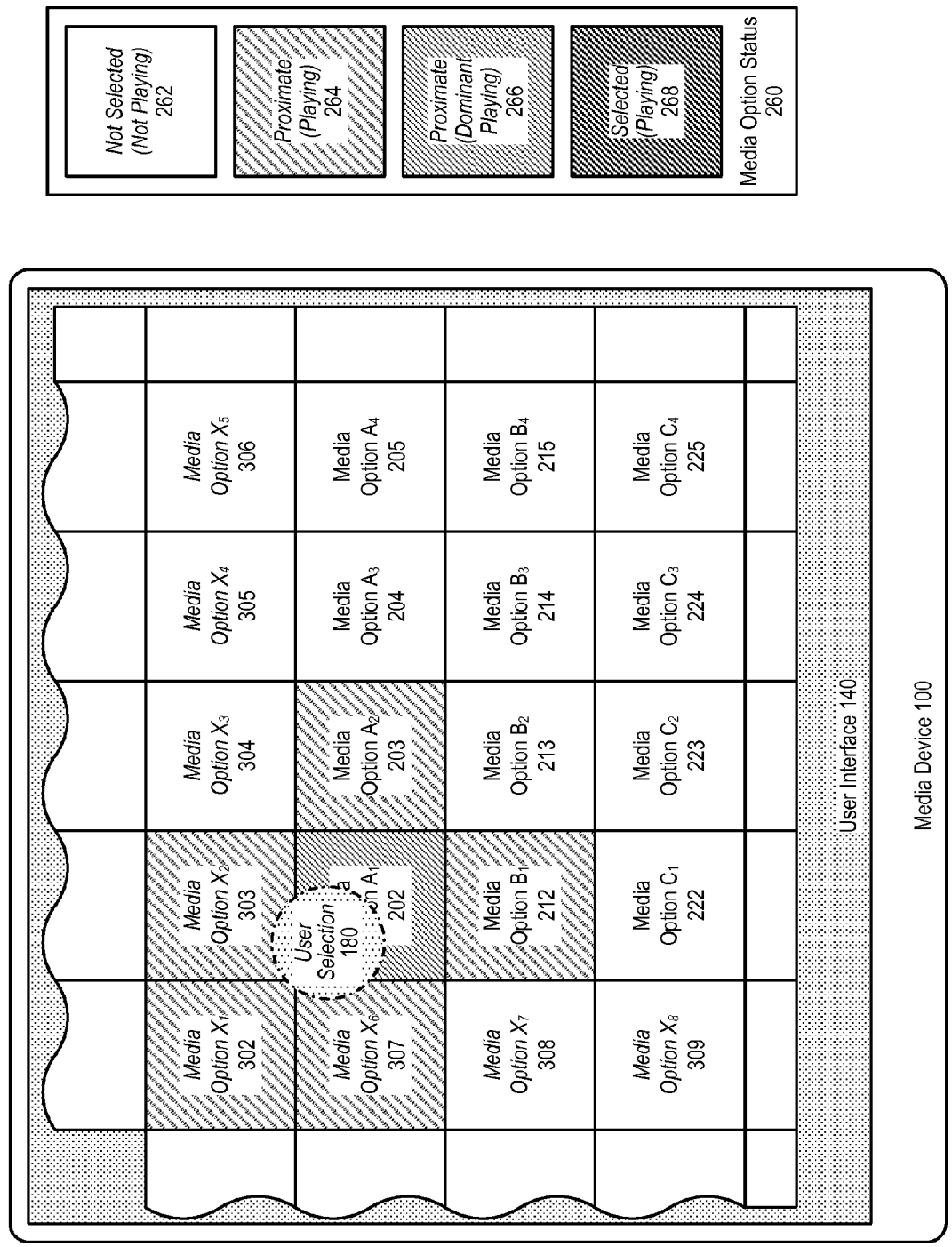
FIG. 11 further illustrates a user interface, in accordance with an embodiment.

FIG. 11 further illustrates a user interface, in accordance with an embodiment. As shown in FIG. 11, for example, a user may select a region of the user interface generally located at media options $A_1$ (202), with neighboring or proximate media options $A_2$, $B_1$, $X_1$ (302), $X_2$ (303) and $X_6$ (307).

The process can generally continue as described above, with the user continuing to move the selected point or region within the visual array, to further explore media options, and the playback of proximate media content items continually adjusted, by crossfading or otherwise combining their playback. For example, when the grid is automatically scrolled or repositioned, the new or additional media options can be explored by the user, or offered as suggestions to browse and experience new media content with which they had not previously been familiar.

In accordance with an embodiment, the system can be configured so that, if it determines a media content has been selected, for example by detecting that the user's finger is lifted from the user interface while playing a sample or snippet, the system can, for example, play the remainder of that media content item to its end, by transitioning or otherwise appending the media content, at an appropriate point within its stored content, to the previously-played sample or snippet. Playback flows from the end of the previously-played sample or snippet into the remainder of the media content item.

Figure 12:
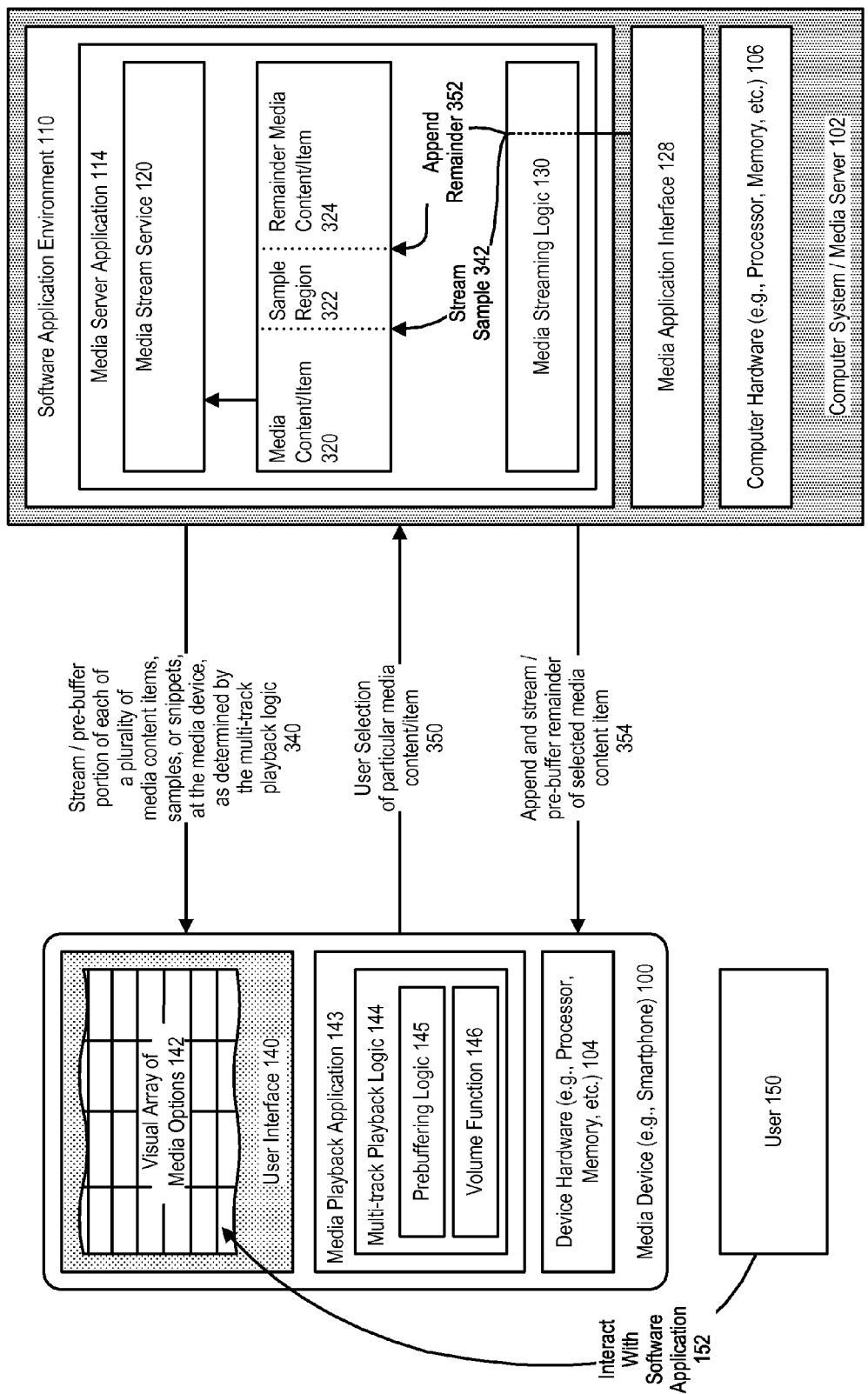
FIG. 12 illustrates use of the system to append playback of media content, in accordance with an embodiment.

FIG. 12 illustrates use of the system to append playback of media content, in accordance with an embodiment. As shown in FIG. 12, in accordance with an embodiment, a media content item 320 can be associated with a sample that generally comprises a region 322 of the media content, for example a snippet of a song. The media content item also includes a remainder 324 of the media content that follows the sample. During use, the system can stream/pre-buffer a portion of each of a plurality of media content items, samples, or snippets, at the media device, as determined by the multi-track playback logic 340.

For example, the media streaming logic can stream or pre-buffer a sample by beginning streaming at the beginning 342 of the sample region. Subsequently, a user can make a selection of a particular media content/item 350. When the sample has completed playback, the media streaming logic can immediately continue streaming at the beginning 352 of the remainder region, to append and stream or pre-buffer the remainder of the selected media content item 354.

From the user's perspective, playback continues or flows seamlessly from the end of the previously-played sample or snippet, into the remainder of the media content item. Depending on the particular implementation, if the sample is a relatively long (e.g., 90 seconds) sample, and is located near the end of the song, the device can simply play the sample to its end; at which point a next song can be chosen according to one or more shuffle rules, a playlist, or other means.

In accordance with an embodiment, when the system appends media content to a previously-played sample or snippet, the system can first begin playback of pre-buffered content associated with that media content item, and, upon determining a selected point or region remaining within a particular region of the visual array for a period of time, subsequently begin playback of associated media content items.

In accordance with another embodiment, if the user's finger is lifted from the user interface, the sample or snippet can stop playing, and an original, e.g. song, return to being played. If the user immediately taps the same location, the device can play the last-selected media content from its beginning.

The examples provided above of various user interaction techniques are provided for purposes of illustration. In accordance with other embodiments, or to address the needs of other implementations, other types of user interaction techniques can be supported.

Audible Notifications (Audio Spinner)

In accordance with an embodiment, additional features can be provided that improve user interaction, for example the use of audible notifications (referred to herein in some embodiments as an audio spinner).

As illustrated above, in accordance with an embodiment, a media device having a media playback application and including a touch-sensitive user interface can be adapted to display a visual array of media options, for example as a grid or list of card elements. Each media option can be associated with one or more media content items that can be streamed to and/or played on the device. The system can determine a selected card element, or media options that are proximate to a selected point or region of the visual array, and play or crossfade media content as appropriate.

As further illustrated above, in accordance with an embodiment, a prebuffering logic can enable a portion of each media content item, sample, or snippet, to be pre-buffered at the media device, as determined by a multi-track playback logic, so that, while media options are being prepared for display, their related media content can be pre-buffered at the same time, allowing for a playback experience that, from the user's perception, seems immediate.

When such an interface is used, there may be a short period of delay before the portion of each media content item, sample, or snippet, which is needed to populate the visual array, is actually received and loaded at the media device and the touch preview can begin. The overall period of delay may be affected by factors such as the network or cellular bandwidth available for data transfer to the device; the type of media content being transferred (for example, music versus high-definition video); and the complexity of the visual array (for example, a large two-dimensional grid of card elements as displayed on a tablet-type device may include many more options than a short list of card elements as displayed on a smartphone-type device, and correspondingly require much more data to be transferred to prebuffer and prepare the interface for use).

Additionally, since the controlled playback and crossfading techniques described above also lend themselves to use cases in which the user might not be watching the interface—for example they may be casually perusing a list of song media options while listening to the crossfaded output, to determine a song they might like to hear—some feedback to the user that reflects something is happening (for example, that media content is currently being transferred to their device to populate the visual array) is useful. Even a short period of delay or hesitation in playing a particular media content can be irritating to some users, or lead them to believe their device or application is not operating correctly.

In accordance with an embodiment, the system can be adapted so that, when the period of delay exceeds a maximum (acceptable) delay time (for example, 500 ms), then an audible notification, such as a small generic sound (e.g., bibodibeep . . . ) can be played for a period of time (for example, 700 ms), and subsequently crossfaded with (into) the actual portion of media content, sample, or snippet, using the controlled playback and crossfading techniques described above. The use of such audible notification can provide reassurance that something is happening, and an overall more enjoyable user experience, particularly when combined with the crossfading techniques described above.

Figure 13:
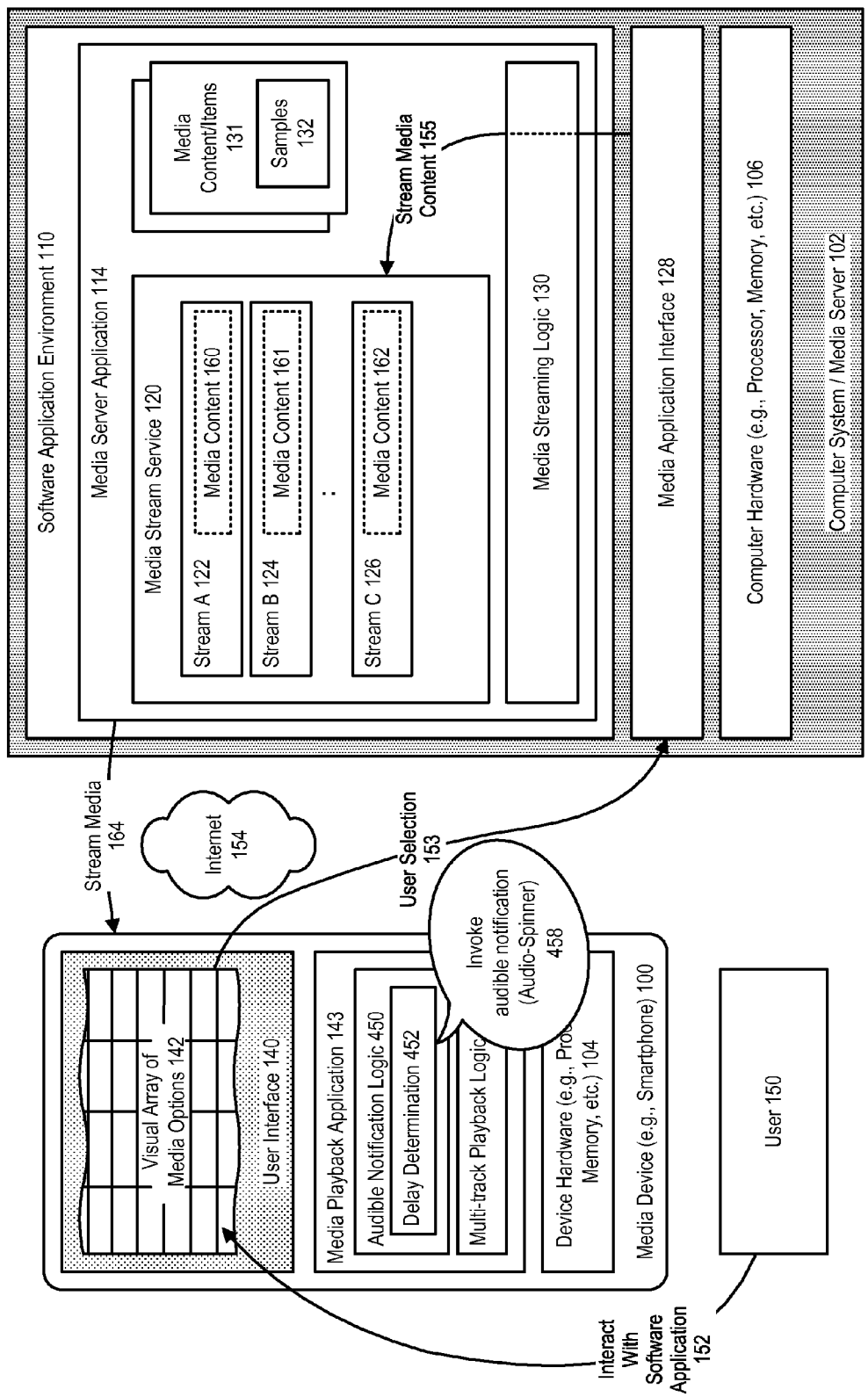
FIG. 13 illustrates a system which includes support for audible notifications, in accordance with an embodiment.

FIG. 13 illustrates a system which includes support for audible notifications, in accordance with an embodiment. As shown in FIG. 13, and as described above, in accordance with an embodiment, a media device or player, for example a computing system, handheld entertainment device, smartphone, or other type of media device capable of playing media content, can be provided for use in playing media content provided by a media server, or another system or peer device. A media stream service can be used to buffer media content, for streaming to one or more streams; while a media streaming logic can be used to retrieve or otherwise access media content items, and/or samples associated with the media content items, in response to requests from media devices or other systems, and populate the media stream service with streams of corresponding media content data that can be returned to the requesting device.

As further described above, in accordance with an embodiment, the media device can have a media playback application and include a touch-sensitive user interface adapted to display a visual array of media options. A prebuffering logic can enable a portion of each media content item, sample, or snippet, to be pre-buffered at the media device, as determined by a multi-track playback logic, so that, while media options are being prepared for display, their related media content can be pre-buffered at the same time, allowing for a playback experience that, from the user's perception, seems immediate. Selecting a particular media option within the visual array can be used as a request or instruction to the media server application to stream or otherwise return a corresponding particular item of media content.

In accordance with an embodiment, the media playback application can include an audible notification logic 450, which is adapted to provide audible notifications. In accordance with an embodiment, the audible notification logic can perform a delay determination 452 that is reflective of an actual or anticipated delay prior to playback of the associated media content item or sample. If the actual or anticipated delay prior to playback of an associated media content item or sample is determined to be greater than a maximum (acceptable) delay time, then an audible notification functionality is invoked, to play an audible notification (audio spinner) 458, while prebuffering associated media content items or samples. Otherwise the process can continue to prebuffer and play the associated media content items, without playing the audible notification.

By way of example, in accordance with an embodiment, the maximum (acceptable) delay time can be configured to be 500 ms, and the playing duration of the audible notification can be configured to be 700 ms. However, in accordance with other embodiments, other values can be used to address the needs of a particular implementation or use case.

Depending on the particular embodiment or implementation, the system can be configured to wait before determining that the actual or anticipated delay prior to playback of the associated media content item or sample is greater than the maximum (acceptable) delay time, and then invoking its audible notification functionality.

Alternatively, in accordance with an embodiment, the system can be configured to presume that the actual or anticipated delay prior to playback of an associated media content item or sample may be greater than the maximum (acceptable) delay time, and invoke its audible notification functionality regardless, in which case the audible notification may be initiated, and then cross-faded almost immediately and imperceptibly with the associated media content item or sample.

Figure 14:
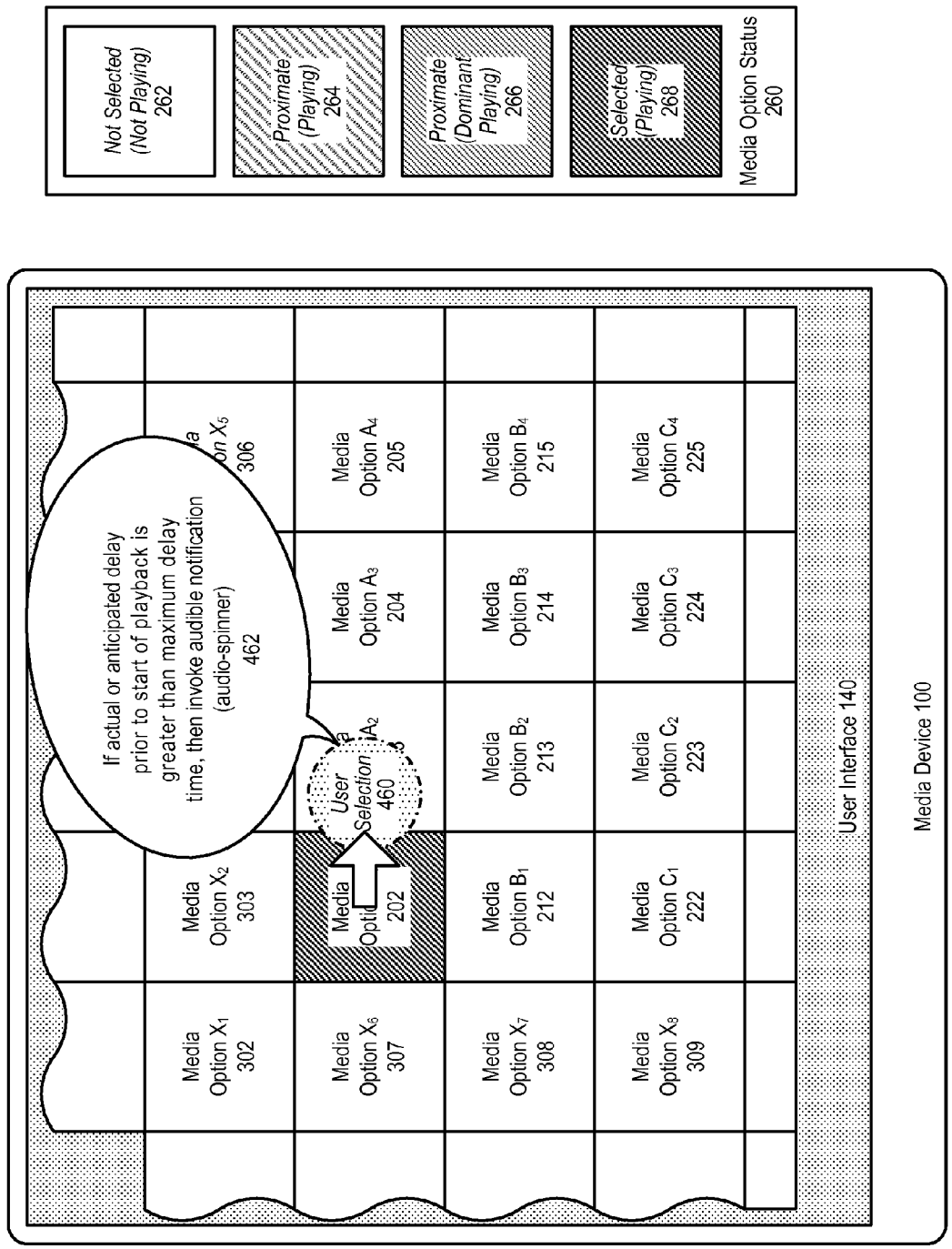
FIG. 14 illustrates the use of audible notifications, in accordance with an embodiment.

FIG. 14 illustrates the use of audible notifications, in accordance with an embodiment. As shown in FIG. 14, in accordance with an embodiment, a user interface can display a visual array of media options arranged as a two-dimensional grid, with rows and columns of media options visualized as tile-like card elements, wherein each of the media options is associated with one or more media content items that can be played on the device.

The example illustrated in FIG. 14 includes an array of media options similar to that previously illustrated in FIGS. 10-11. As described above, for purposes of illustration, each of the media options can also be associated with a status that reflects, from the user's perspective, whether that particular option's associated media content item is playing or not, and, if its associated media content item is playing then whether other media content items are being cross-faded or played at the same time.

In accordance with an embodiment, a user can select a particular point or region 460. If the system determines that the actual or anticipated delay prior to playback of an associated media content item or sample is greater than a maximum (acceptable) delay time, then an audible notification functionality is invoked, to play an audible notification (audio spinner) 462, while prebuffering associated media content items or samples.

For example, as shown in FIG. 14, when the user moves the selected point or region from media option $A_1$ (202) to media option $A_2$ (203), the system can determine whether the actual or anticipated delay prior to playback of media option $A_2$ is greater than a maximum (acceptable) delay time.

Figure 15:
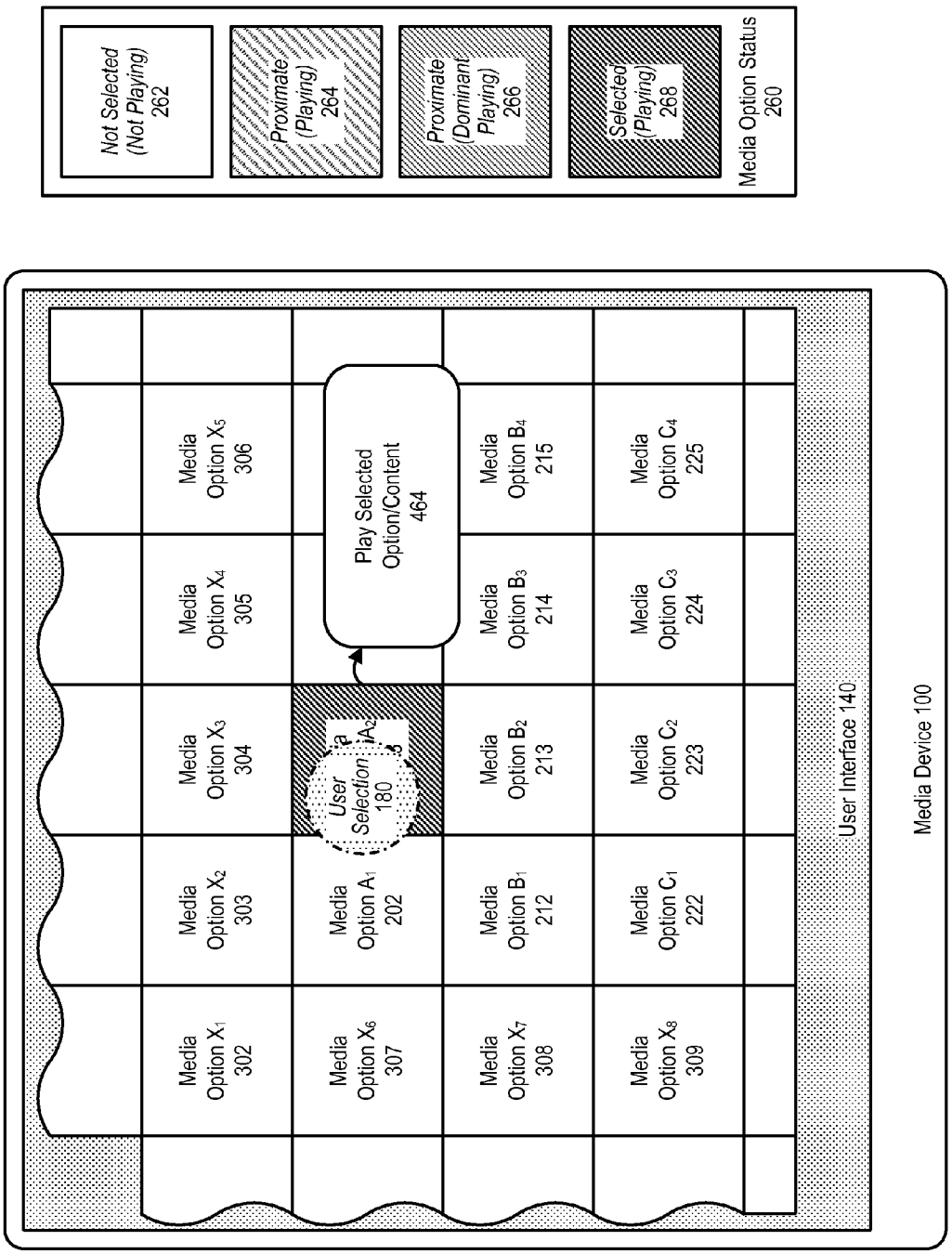
FIG. 15 further illustrates the use of audible notifications, in accordance with an embodiment.

FIG. 15 further illustrates the use of audible notifications, in accordance with an embodiment. As shown in FIG. 15, if the actual or anticipated delay prior to playback of media option $A_2$, or a sample associated therewith, is determined to be greater than the maximum (acceptable) delay time (for example, 500 ms), then the audible notification can be played for a period of time (for example, 700 ms), and subsequently crossfaded with (into) the playing of media option $A_2$, or a sample associated with media option $A_2$, using the controlled playback and crossfading techniques described above.

In accordance with an embodiment, once the audible notification has completed, then the media content (in this example media option $A_2$, or some combination of media option $A_2$ with one or more other media options as appropriate) can be played 464. Alternatively, playing of the audible notification can be terminated earlier if the media option is ready for play. If there is no delay in preparing the media content for play, then it can begin playing almost immediately (or be cross-faded almost immediately) from the perspective of the user.

Figure 16:
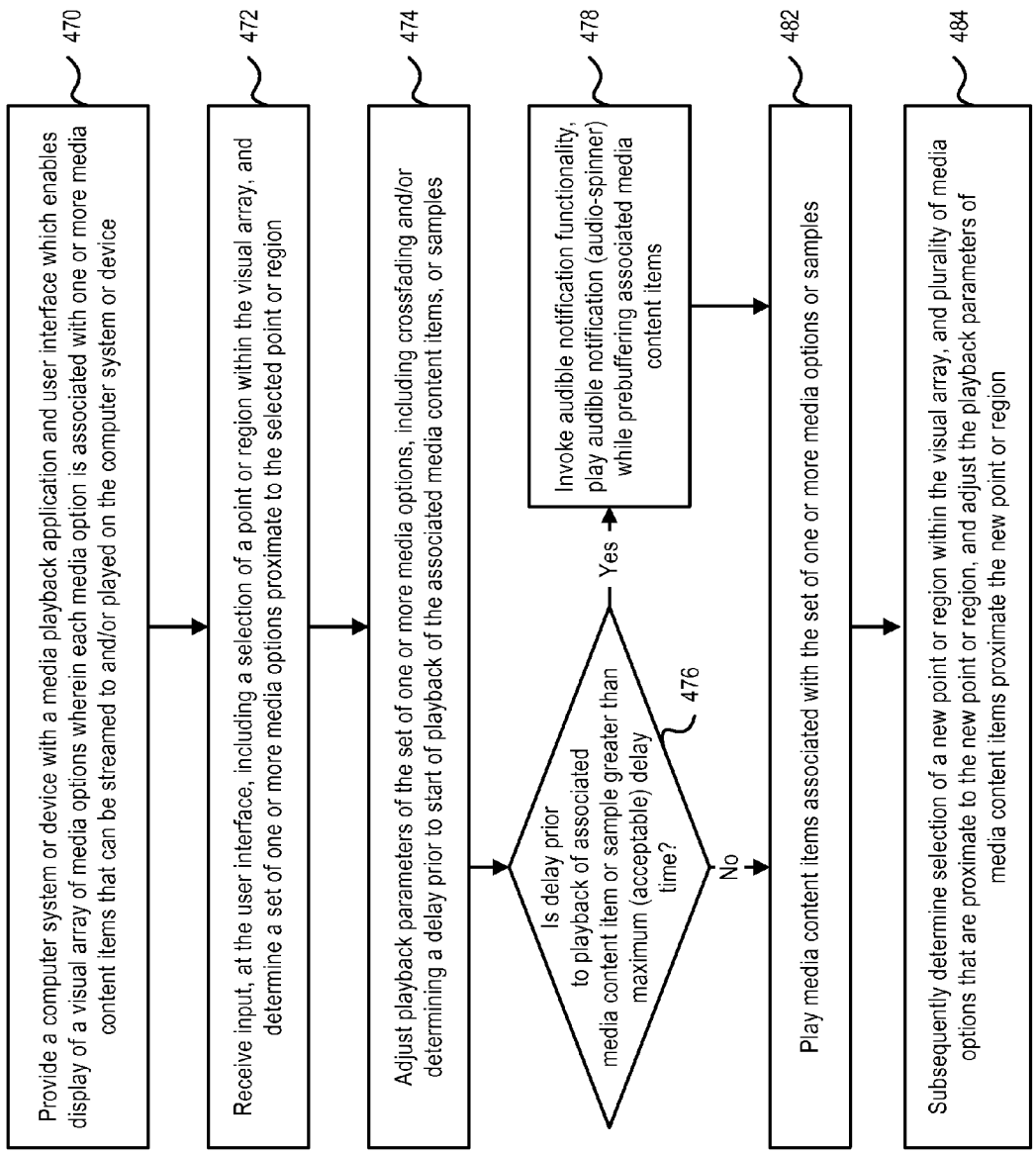
FIG. 16 is a flowchart of a method for providing audible notifications, in accordance with an embodiment.

FIG. 16 is a flowchart of a method for providing audible notifications, in accordance with an embodiment.

As shown in FIG. 16, at step 470, a computer system or device is provided with a media playback application and user interface which enables display of a visual array of media options, wherein each media option is associated with one or more media content items that can be streamed to and/or played on the computer system or device.

At step 472, an input is received, at the user interface, including a selection of a point or region within the visual array, which the system uses to determine a set of one or more media options proximate to the selected point or region.

At step 474, playback parameters of the set of one or more media options are adjusted, including crossfading and/or determining a delay prior to start of playback of the associated media content items, or samples thereof.

If, at step 476, an actual or anticipated delay prior to playback of an associated media content item or sample is determined to be greater than a maximum (acceptable) delay time, then, at step 478, an audible notification functionality is invoked, to play an audible notification while prebuffering associated media content items or samples. Otherwise the process can continue to prebuffer and play the associated media content items or samples, without playing the audible notification.

As described above, depending on the particular embodiment or implementation, the system can be configured to wait before determining that the actual or anticipated delay prior to playback of the associated media content item or sample will be greater than the maximum (acceptable) delay time; or alternatively presume that the actual or anticipated delay prior to playback of an associated media content item or sample may be greater than the maximum (acceptable) delay time, and invoke its audible notification functionality regardless, in which case the audible notification may be initiated, and then cross-faded almost immediately and imperceptibly with the associated media content item or sample.

At step 482, the media content items or samples associated with the set of one or more media options are played.

At step 484, the system can subsequently determine selection of a new point or region within the visual array, and plurality of media options that are proximate to the new point or region, and adjust the playback parameters of media content items proximate the new point or region.

Media Caching (Audio Touch Caching)

In accordance with an embodiment, additional features can be provided that improve user interaction, for example the use of media caching (referred to herein in some embodiments as audio touch caching).

As illustrated above, in accordance with an embodiment, a media device having a media playback application and including a touch-sensitive user interface can be adapted to display a visual array of media options, for example as a grid or list of card elements. Each media option can be associated with one or more media content items that can be streamed to and/or played on the device. The system can determine a selected card element, or media options that are proximate to a selected point or region of the visual array, and play or crossfade media content as appropriate.

As further illustrated above, in accordance with an embodiment, a prebuffering logic can enable a portion of each media content item, sample, or snippet, to be pre-buffered at the media device, as determined by a multi-track playback logic, so that, while media options are being prepared for display, their related media content can be pre-buffered at the same time, allowing for a playback experience that, from the user's perception, seems immediate.

The display of such visual array of media options necessarily requires the transfer of considerable amounts of data to the device, which as described above depends on factors such as the type of media content being transferred (for example, music versus high-definition video); and the complexity of the visual array (for example, a large two-dimensional grid as displayed on a tablet-type device may include many more options than a short list as displayed on a smartphone-type device, and correspondingly require much more data to be transferred to prebuffer and prepare the interface for use).

However, such transfer of data can be negatively affected if the device is associated with a limited network or cellular data plan, or must otherwise adhere to restrictions that limit the network or cellular bandwidth available to the device for transfer of media content, or the total amount of data that can be transferred to the device within a particular temporal interval (for example, within a monthly billing cycle). To address this, some manner of intelligently utilizing the available network or cellular bandwidth, or data allowance, associated with a device can provide a more enjoyable user experience.

In accordance with an embodiment, the system can take into account behavioral characteristics and other settings which imply a user's data plan preferences, and use such information to determine a caching policy by which the data necessary for prebuffering and preparing the interface will be cached at the media device. Examples of caching policies can include cache-all, cache-aggressively, cache-casually, and/or don't-cache policies, each of which can have their own features as described in further detail below. In this manner, the caching policy can be used to optimize the user experience without requiring backend changes, say at the media server, and while respecting the user's data plan.

Figure 17:
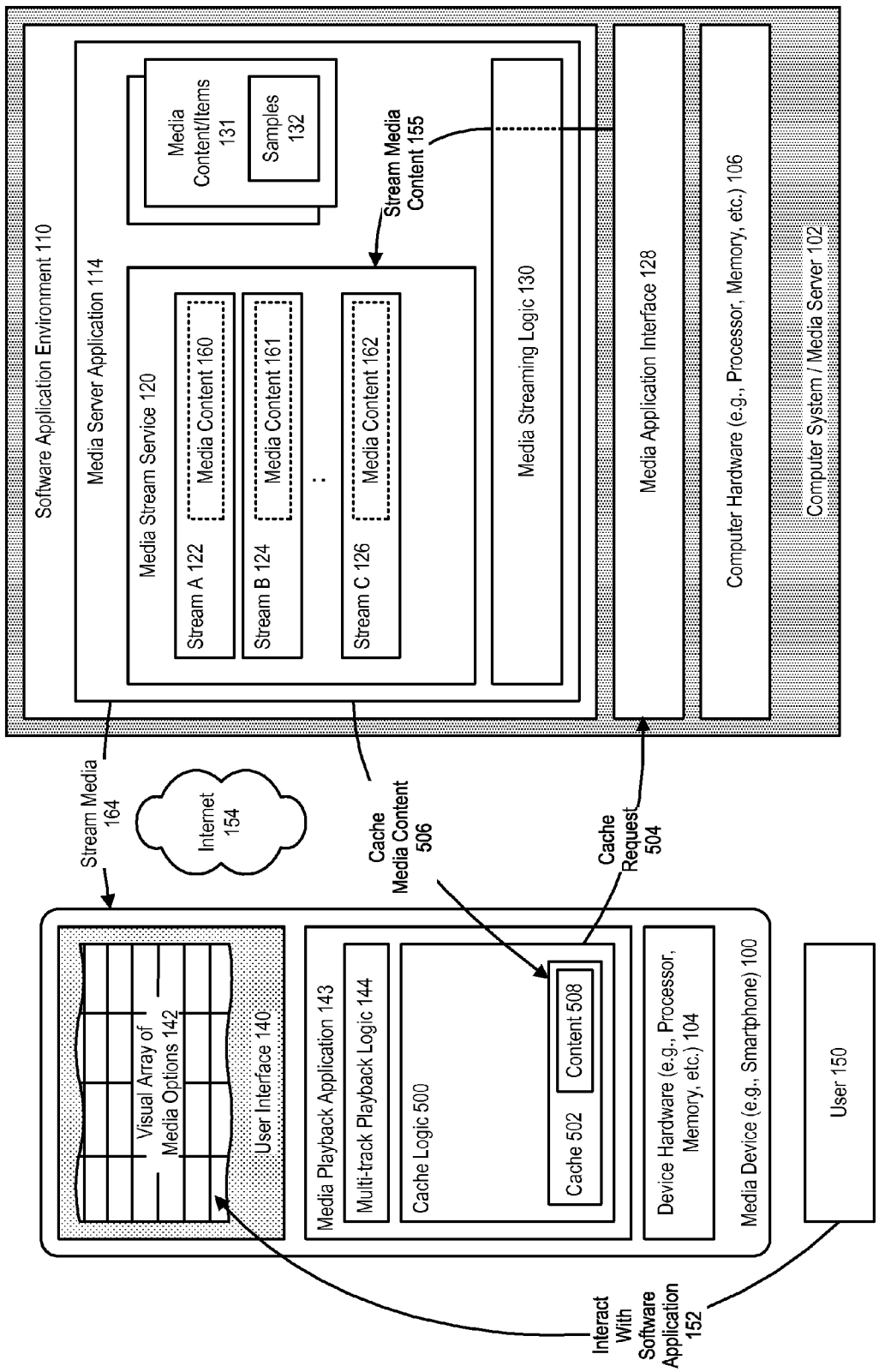
FIG. 17 illustrates a system which includes media caching, in accordance with an embodiment.

FIG. 17 illustrates a system which includes media caching, in accordance with an embodiment. As shown in FIG. 17, and as described above, in accordance with an embodiment, a media device or player, for example a computing system, handheld entertainment device, smartphone, or other type of media device capable of playing media content, can be provided for use in playing media content provided by a media server, or another system or peer device. A media stream service can be used to buffer media content, for streaming to one or more streams; while a media streaming logic can be used to retrieve or otherwise access media content items, and/or samples associated with the media content items, in response to requests from media devices or other systems, and populate the media stream service with streams of corresponding media content data that can be returned to the requesting device.

As further described above, in accordance with an embodiment, the media device can have a media playback application and include a touch-sensitive user interface adapted to display a visual array of media options. A prebuffering logic can enable a portion of each media content item, sample, or snippet, to be pre-buffered at the media device, as determined by a multi-track playback logic, so that, while media options are being prepared for display, their related media content can be pre-buffered at the same time, allowing for a playback experience that, from the user's perception, seems immediate. Selecting a particular media option within the visual array can be used as a request or instruction to the media server application to stream or otherwise return a corresponding particular item of media content.

In accordance with an embodiment, a cache logic 500 maintains a cache 502 or repository of media content. The cache logic is adapted to make cache requests 504 to the media server application, to cache media content 506 within the cache, as content 508, which can then be used to support the operation of the visual array or other functionalities as described above, including prebuffering and preparing the interface for use.

For example, the cache logic can determine, based on behavioral characteristics and other settings, whether the user is likely to be using a lower-bandwidth or lower-allowance data plan, versus a higher-bandwidth or higher-allowance data plan, and operate accordingly.

Figure 18:
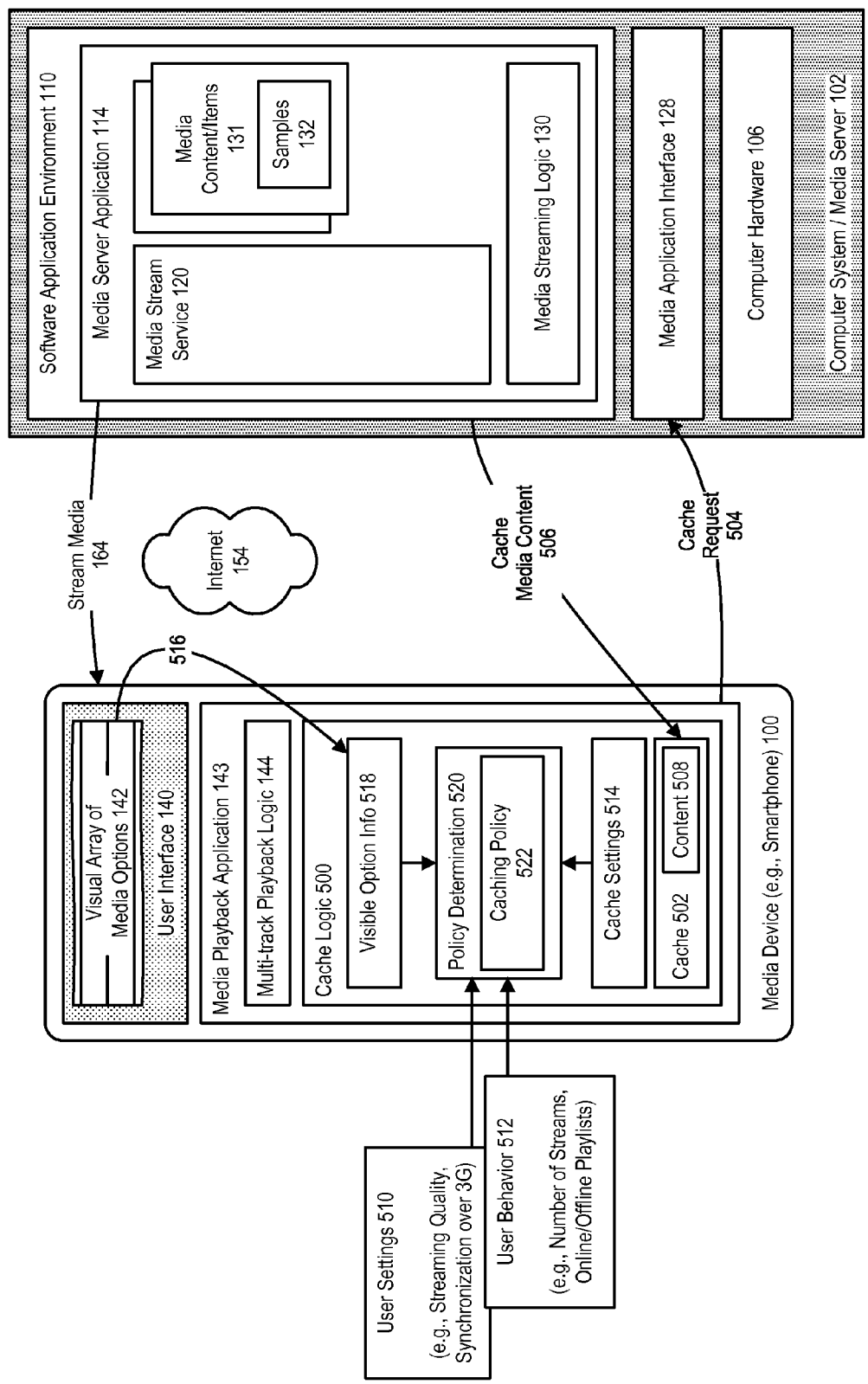
FIG. 18 further illustrates a system which includes media caching, in accordance with an embodiment.

FIG. 18 further illustrates a system which includes media caching, in accordance with an embodiment. As shown in FIG. 18, the system can take into account user settings 510, user behavior 512, and cache settings 514, and can additionally receive 516 visible option information 518 describing the currently visible options on the visual array. Based on this information, a policy determination component 520 can determine an appropriate caching policy 522 to be used in making cache request to the media server.

For example, in accordance with an embodiment one or more user settings such as a user-specified streaming quality, or synchronization over a 3G network; user behaviors such as use of a number of streams, or online/offline playlists; or cache settings can be used to determine that the user is likely to be using a lower-bandwidth or lower-allowance data plan, or alternatively a higher-bandwidth or higher-allowance data plan.

Figure 19:
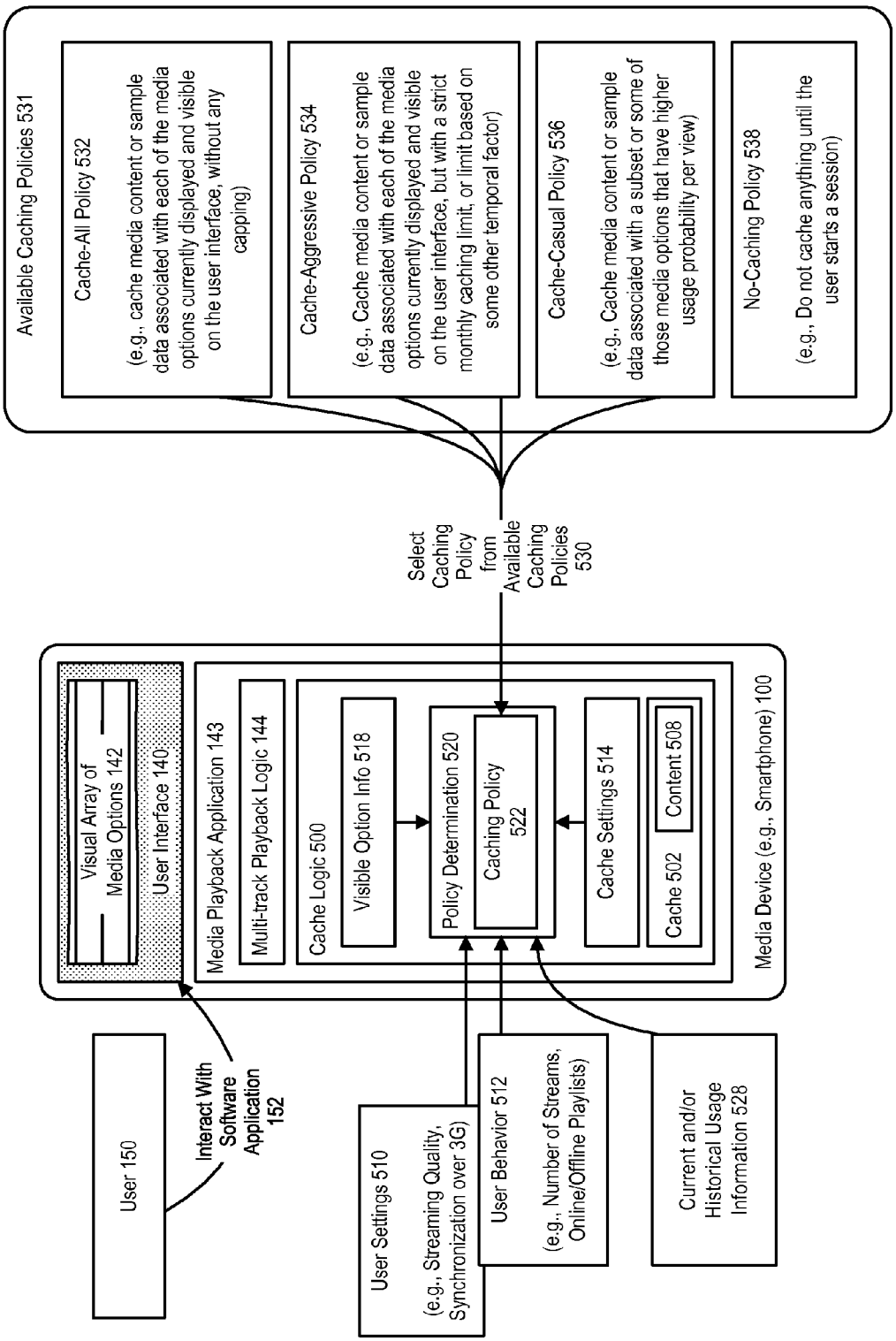
FIG. 19 further illustrates a system which includes media caching, in accordance with an embodiment.

FIG. 19 further illustrates a system which includes media caching, in accordance with an embodiment. As shown in FIG. 19, while the user interacts with the software application, current and/or historical usage information 528, such as the total amount of data transferred to the device within a current or previous temporal interval (for example, within a current or previous monthly billing cycle) can be determined.

In accordance with an embodiment, the cache logic, including its policy determination component can select 530 from available caching policies 531, examples of which can include a cache-all policy 532, a cache-aggressive policy 534, a cache-casual policy 536, or a no-caching policy 538, some features of which are described below. However, it will be evident that the policy descriptions are provided by way of example to illustrate various embodiments, and that in accordance with other embodiments or other implementations other types of caching policies can be used.

Cache-All Policy

In accordance with an embodiment, when a cache-all policy is used, the device and/or media application is adapted to cache media content or sample data which is associated with each of the media options currently displayed and visible on the user interface, without any data capping.

For example, in accordance with an embodiment, the system can determine to use a cache-all policy when the user settings, user behavior and/or cache settings indicate that Wi-Fi is turned on, and for personalized (e.g., "Your Music") views during a touch session. Since personalized views have relatively slow data dynamics, caching of media options within such views should occur seldom compared with other views.

Cache-Aggressively Policy

In accordance with an embodiment, when a cache-aggressively policy is used, the device and/or media application is adapted to caching media content or sample data which is associated with each of the media options currently displayed and visible on the user interface, but with a strict, e.g., monthly, caching limit, or a caching limit based on some other temporal factor.

For example, in accordance with an embodiment, the system can determine to use a cache-aggressively policy when current and/or historical usage information indicates that the user has not cached much data during the current month (for example, less than 10-50 Mb), and/or the user settings suggest that the user does not care that much about data plans (for example, setting a high streaming extreme quality, or synchronization over 3G), and/or the user behavior detected similarly suggests that the user does not care that much about data plans (for example, a lot of streams versus offline mode, or a larger number of bytes streamed monthly).

Cache-Casually Policy

In accordance with an embodiment, when a cache-casually policy is used, the device and/or media application is adapted to not cache media content or sample data associated with all of the media options currently displayed and visible on the user interface, but instead a subset of those media options that have higher usage probability per view. For example, in a track list view, users may tend to start previewing the first two tracks in a list, and so these media options have a higher usage probability than others further down the list.

For example, in accordance with an embodiment, the system can determine to use a cache-casually policy in those situations in which the user has already cached much data during the month, and/or the user settings detected that suggest that the user does care about their data plan (for example, setting a low streaming quality, or not to allow synchronization over 3G), and/or the user behavior detected similarly suggests that the user does care about their data plan (for example, a lot of streams from offline playlists compared to streaming).

Don't-Cache Policy

In accordance with an embodiment, when a don't cache policy is used the device and/or media application is adapted to not cache anything at all until the user starts a touch session.

For example, in accordance with an embodiment, the system can determine to use a don't-cache policy when the user has already cached a particular amount of data within a particular temporal interval, for example within a monthly billing cycle.

The above are provided by way of example to illustrate various caching policies. It will be evident that in various embodiments different caching policies can be used, in addition to different rules for determining, based on user settings, user behavior, and cache settings and/or visible option information, which particular caching policy may best suit a particular situation or session.

Figure 20:
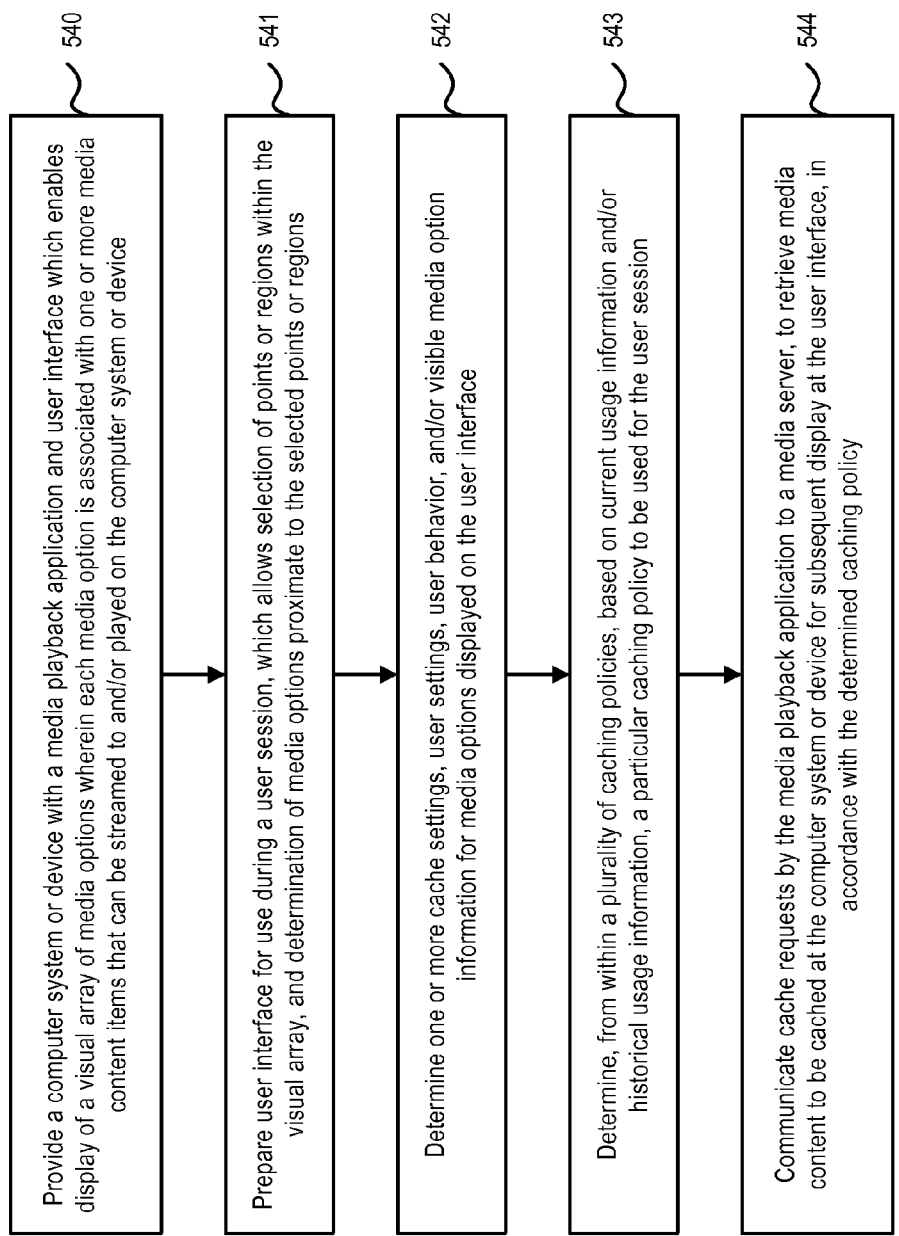
FIG. 20 is a flowchart of a method for providing media caching, in accordance with an embodiment.

FIG. 20 is a flowchart of a method for providing media caching, in accordance with an embodiment.

As shown in FIG. 20, at step 540, a computer system or device is provided with a media playback application and user interface which enables display of a visual array of media options, wherein each media option is associated with one or more media content items that can be streamed to and/or played on the computer system or device.

At step 541, the user interface is prepared for use during a user session, which allows selection of points or regions within the visual array, and determination of media options proximate to the selected points or regions.

At step 542, one or more cache settings, user settings, user behavior, and/or visible media option information for media options displayed on the user interface, are determined.

At step 543, the system can determine, from within a plurality of caching policies, based on current usage information and/or historical usage information, a particular caching policy to be used for the user session.

At step 544, cache requests can then be communicated by the media playback application to a media server, to retrieve media content to be cached at the computer system or device for subsequent display at the user interface, in accordance with the determined caching policy.

Touch Menus (Audio Touch Menu)

In accordance with an embodiment, additional features can be provided that improve user interaction, for example the use of touch menus (referred to herein in some embodiments as audio touch menus). Embodiments of the system can be used to support a "What can I preview?" environment, in which media content items can be previewable from different presentation formats, so that a user can easily browse and move between, for example, a music album and a playlist, and then on to an individual song, or to a radio station, or other source of media content or presentation format thereof.

As illustrated above, in accordance with an embodiment, a media device having a media playback application and including a touch-sensitive user interface can be adapted to display a visual array of media options, for example as a grid or list of card elements. Each media option can be associated with one or more media content items that can be streamed to and/or played on the device. The system can determine a selected card element, or media options that are proximate to a selected point or region of the visual array, and play or crossfade media content as appropriate.

As further illustrated above, in accordance with an embodiment, a prebuffering logic can enable a portion of each media content item, sample, or snippet, to be pre-buffered at the media device, as determined by a multi-track playback logic, so that, while media options are being prepared for display, their related media content can be pre-buffered at the same time, allowing for a playback experience that, from the user's perception, seems immediate.

However, such environment is not restricted to displaying a static set of media content, or one purely determined by, e.g., the media server. For example, a user may want to select various media content items (e.g., songs) and add them to a playlist and/or to a collection in different ways.

In accordance with an embodiment, a touch logic allows a user to define and/or select both client-side playlists and server-side playlists, so that a selected playlist can be associated with and viewed or played using a touch menu. For example, upon selection of a playlist media content item, a list of media options within that playlist can be displayed. The user can continue to select media options from the playlist, including the use of cross-fading, audible notification (audio spinner), or other features as described above.

Figure 21:
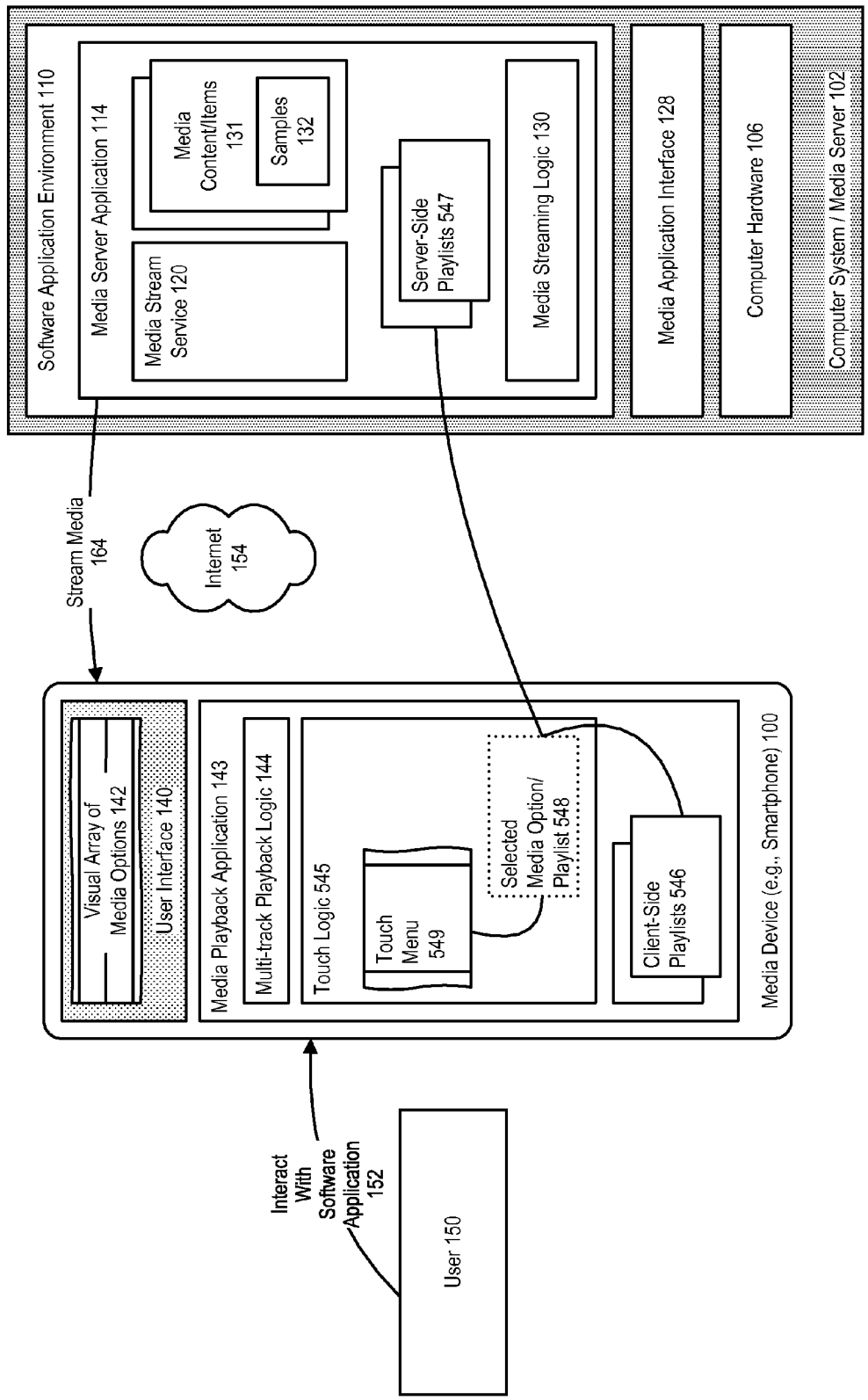
FIG. 21 illustrates a system which includes touch menus, in accordance with an embodiment.

FIG. 21 illustrates a system which includes touch menus, in accordance with an embodiment. As shown in FIG. 21, and as described above, in accordance with an embodiment, a media device or player, for example a computing system, handheld entertainment device, smartphone, or other type of media device capable of playing media content, can be provided for use in playing media content provided by a media server, or another system or peer device. A media stream service can be used to buffer media content, for streaming to one or more streams; while a media streaming logic can be used to retrieve or otherwise access media content items, and/or samples associated with the media content items, in response to requests from media devices or other systems, and populate the media stream service with streams of corresponding media content data that can be returned to the requesting device.

As further described above, in accordance with an embodiment, the media device can include a media playback application and touch-sensitive user interface adapted to display a visual array of media options. A prebuffering logic can enable a portion of each media content item, sample, or snippet, to be pre-buffered at the media device, as determined by a multi-track playback logic, so that, while media options are being prepared for display, their related media content can be pre-buffered at the same time, allowing for a playback experience that, from the user's perception, seems immediate. Selecting a particular media option within the visual array can be used as a request or instruction to the media server application to stream or otherwise return a corresponding particular item of media content.

In accordance with an embodiment, a touch logic 545 allows a user to define and/or select both client-side playlists 546 and server-side playlists 547. The touch logic enables a selected playlist 548 to be associated with and viewed or played using a touch menu 549, as described in further detail below.

FIGS. 22A-22B further illustrate a system which includes a touch menu, in accordance with an embodiment. As shown in FIG. 22A, in accordance with an embodiment, the device can display a first screen mode 550 in which a visual array of media options is arranged as a two-dimensional grid, with rows and columns of media options visualized as tile-like card elements, wherein each of the media options is associated with one or more media content items that can be played on the device.

As described above, in accordance with an embodiment, the multi-track playback logic can adjust the playback volume of media content items associated with proximate media options, by crossfading or otherwise combining their playback, to reflect their relative distances from a selected point or region.

As further shown in FIG. 22B, in accordance with an embodiment, when a user makes a selection 551 of a particular media content item, the interface can change to show subcontent or component media content items for the particular media content item, in this example subcontents A-F (553-558 respectively). For example, a user can make a selection of a song album, which causes the system to display as subcontent the songs within that album. As another example, a user can make a selection of a song playlist, which causes the system to display as subcontent the songs within that playlist.

Figures 23A, 23B:
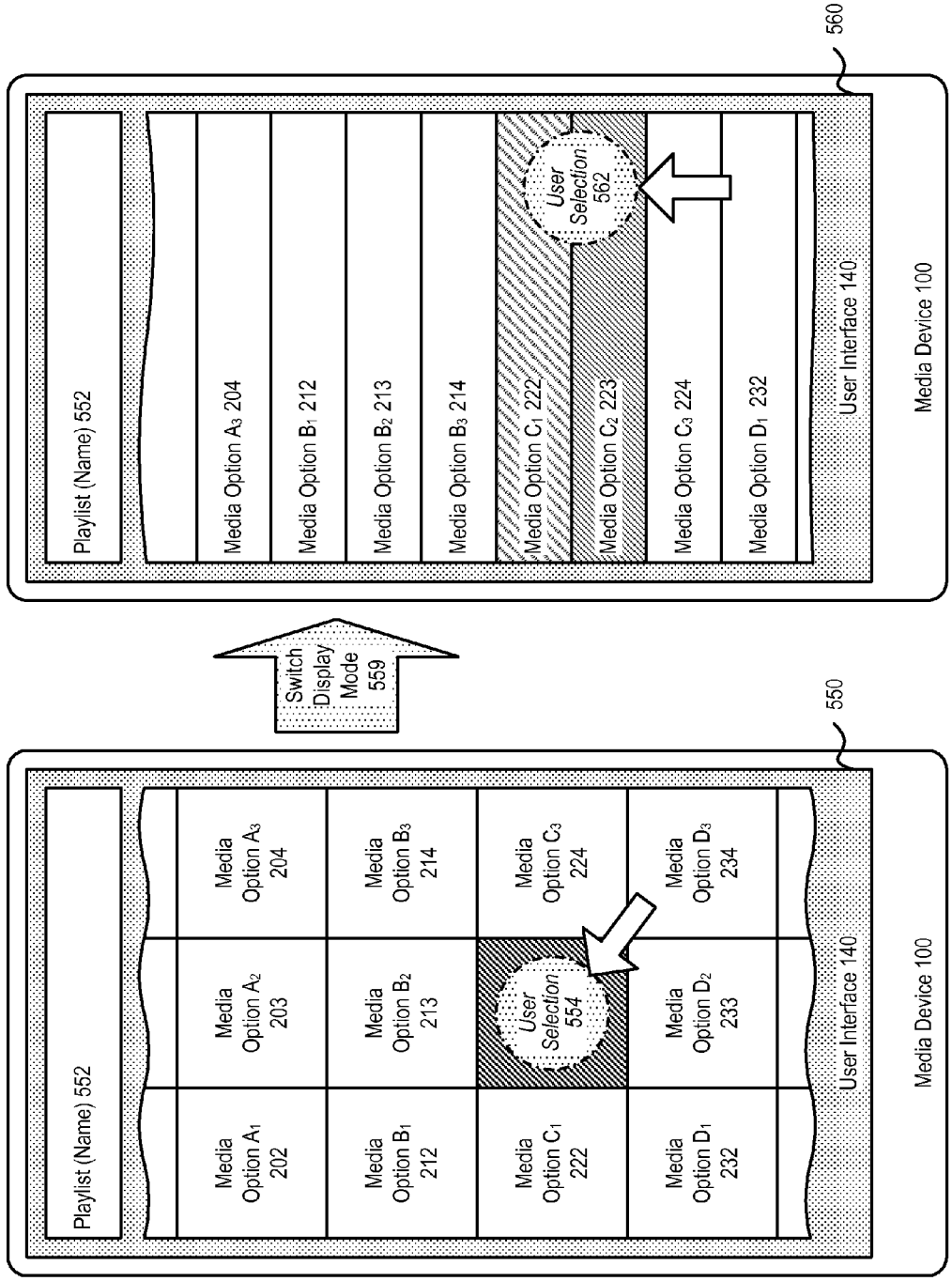
FIGS. 23A-23B further illustrate a system which includes a touch menu, in accordance with an embodiment.

FIGS. 23A-23B further illustrate a system which includes a touch menu, in accordance with an embodiment.

In accordance with an embodiment, the media options can be associated with playlists. For example, a user can browse a named playlist 552, and make a selection 554. As shown in FIG. 23B, upon selecting a media option, the touch logic can cause the display 559 of the media options to switch as shown, from a first screen mode as described above to a list screen mode 560. In accordance with an embodiment, the user can continue to select 562 songs from the playlist, including discretely selecting songs, or incorporating the use of crossfade features as described above.

Figure 24:
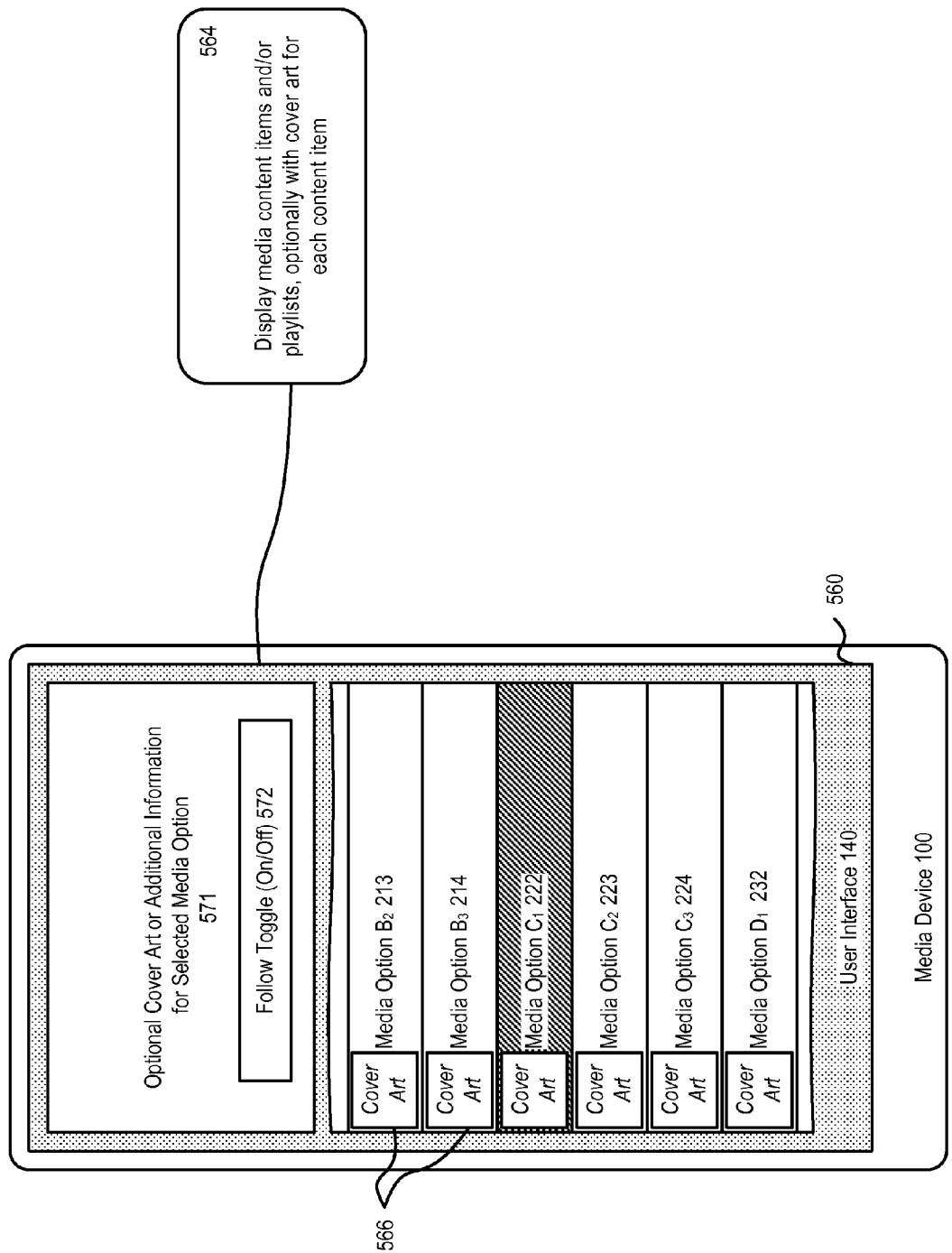
FIG. 24 further illustrates the use of a touch menu, in accordance with an embodiment.

FIG. 24 further illustrates the use of a touch menu, in accordance with an embodiment. As shown in FIG. 24, in accordance with an embodiment an interface can be displayed 564, including media content items and/or playlists, optionally with cover art 566 for each media content item.

Figure 25:
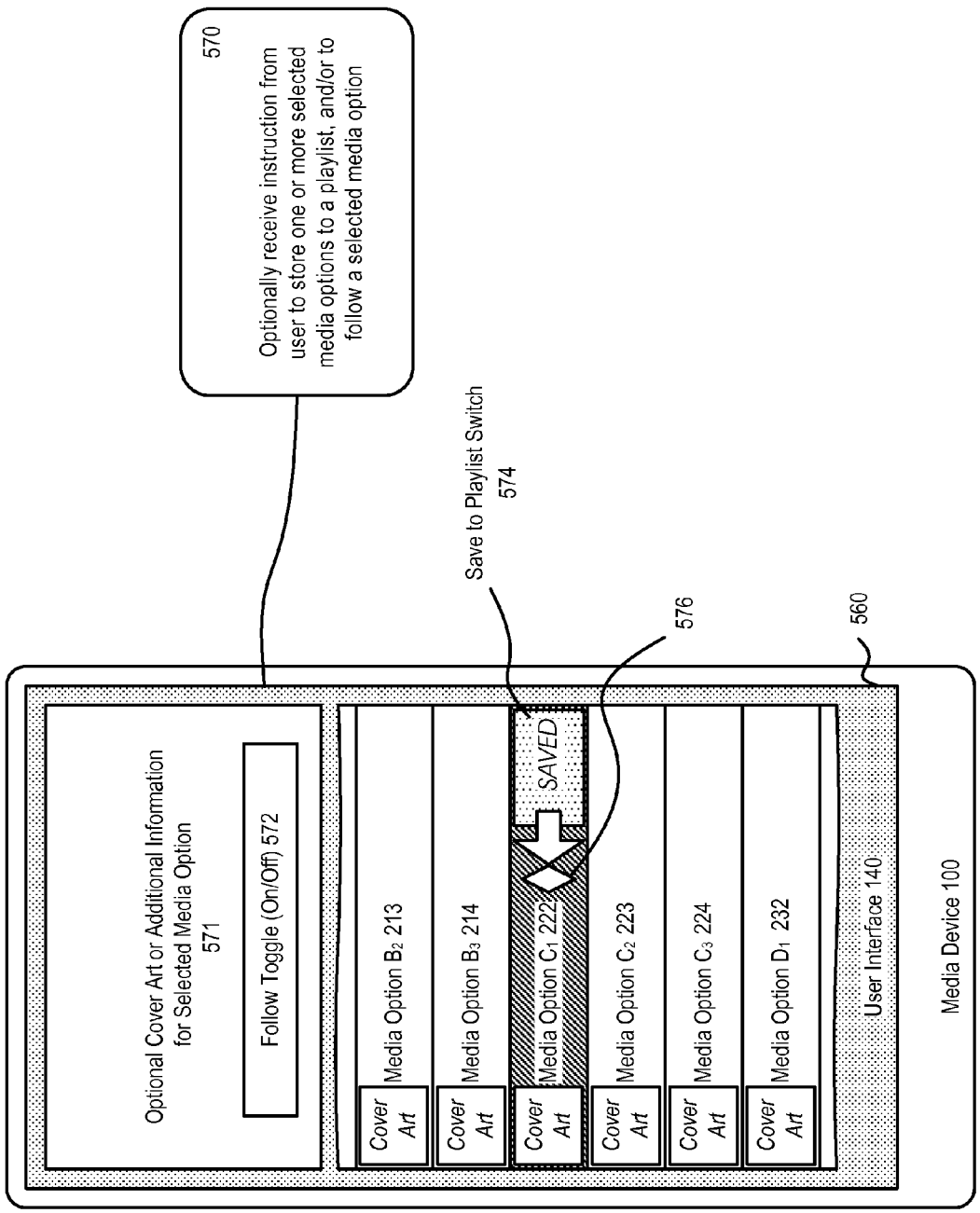
FIG. 25 further illustrates the use of a touch menu, in accordance with an embodiment.

FIG. 25 further illustrates the use of a touch menu, in accordance with an embodiment. As shown in FIG. 25, optionally an instruction can be received 570 from a user to store one or more selected media options to a playlist, and/or to follow a selected media option. Selected songs can optionally be displayed with additional information for the selected media option 571. For example, the user can toggle on/off a follow button 572, or can swipe 574 a media option to save it to a playlist, in which case the media option can be identified by a suitable indicator 576.

Figure 26:
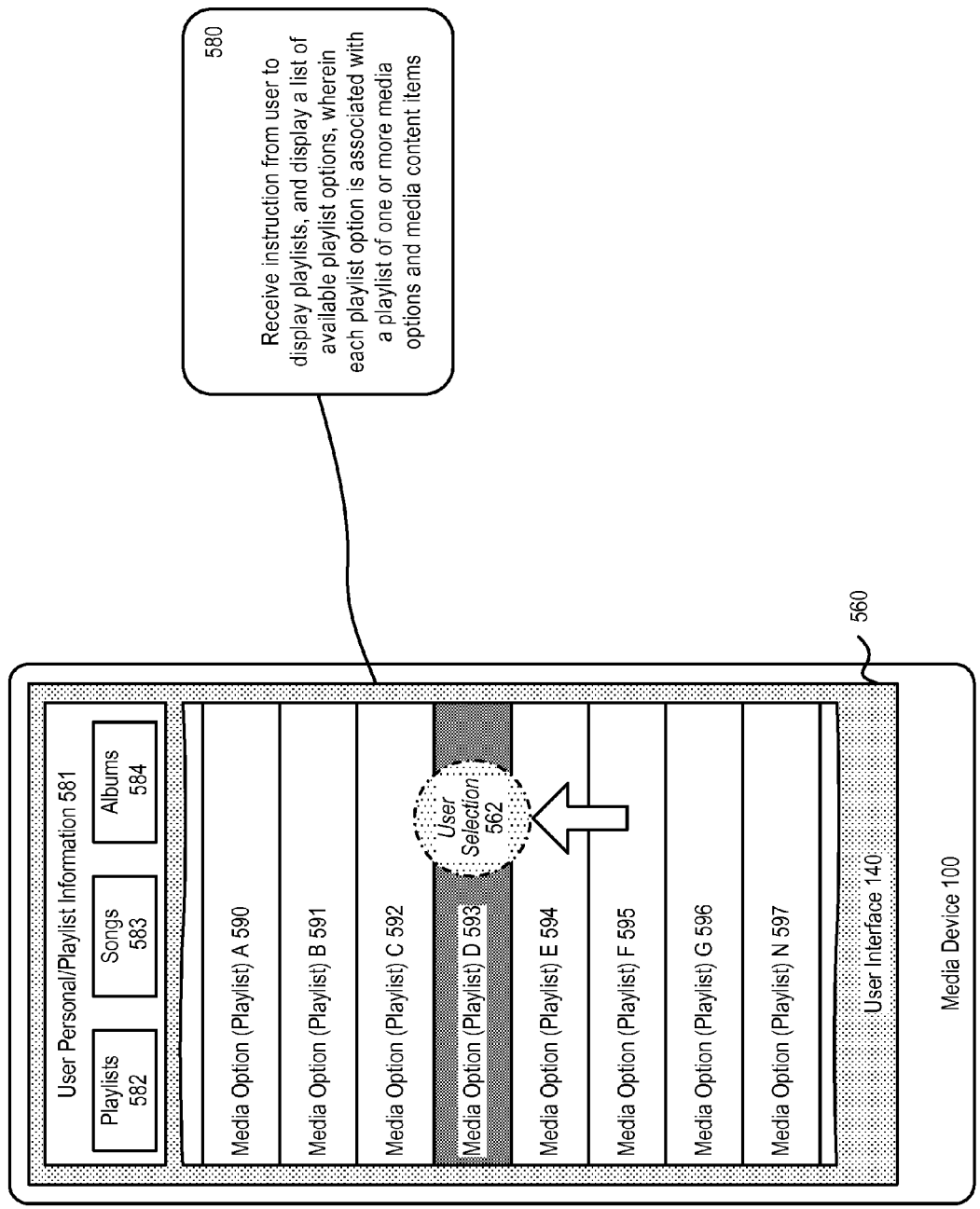
FIG. 26 further illustrates the use of a touch menu, in accordance with an embodiment.

FIG. 26 further illustrates the use of a touch menu, in accordance with an embodiment. As shown in FIG. 26, an instruction can be received 580 from a user to display playlists, and display of a list of available playlist options, wherein each playlist option is associated with a playlist of one or more media options and media content items. In accordance with an embodiment, the device can display user personal/playlist information 581, optionally with buttons to select playlists 582, songs 583, or albums 584. Upon request from a user, the device can display a plurality of playlists, including in this example a playlist A (590), playlist B (591), playlist C (592), playlist D (593), playlist E (594), playlist F (595), playlist G (596) through playlist N (597), for selection thereof. In the example illustrated in FIG. 25, the user has selected playlist D.

Figure 27:
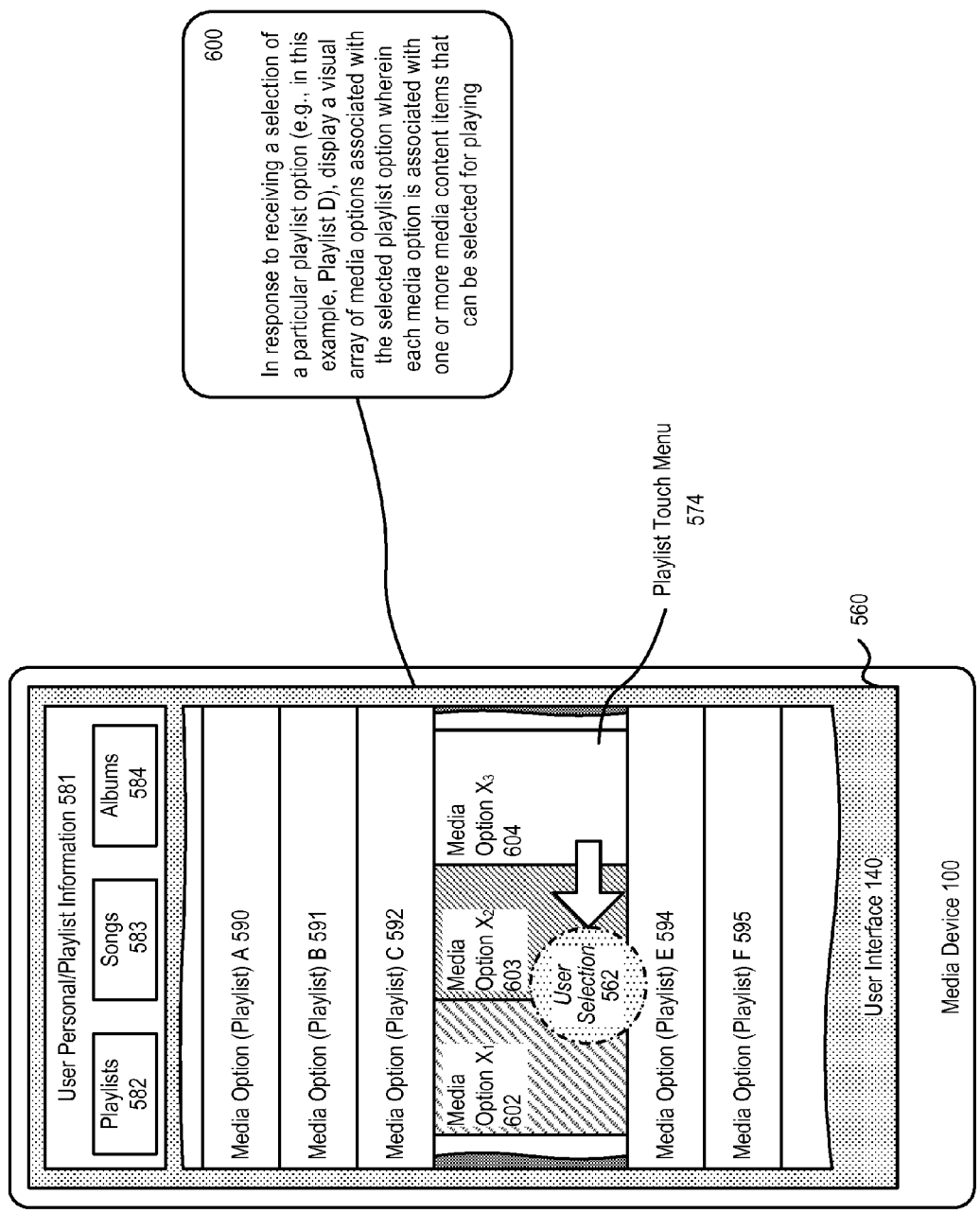
FIG. 27 further illustrates the use of a touch menu, in accordance with an embodiment.

FIG. 27 further illustrates the use of a touch menu, in accordance with an embodiment. As shown in FIG. 27, continuing the example from above, the user has selected playlist D. In accordance with an embodiment, in response to receiving a selection 600 of a particular playlist option, the system can display a visual array of media options associated with the selected playlist option, wherein each media option is associated with one or more media content items that can be selected for playing.

As illustrated above, in accordance with an embodiment, a card element displayed within the visual array can contain other card elements, with subcontent or component media content items associated therewith. For example, in accordance with an embodiment, when the system determines that a user has selected a card element within the visual array which includes other card elements, it causes the resultant grid to zoom in, with the effect of bringing the user closer and further immersed in the content, while revealing a selection of what is inside that card element. The user can interact with the contents of the card using the techniques described above, for example by sliding their finger or a cursor over the visual array, changing the audio output and visible representation in a preview like manner. While the content is zoomed closer to the user, a cover art can be blurred while it scales to fill the entire card element. The grid can then be formed, building up from the position of the user's finger and then outwardly. Grid items can scale and fade in as they appear. While cover art is being pre-fetched the system can display the custom song placeholder image, and then fade in the cover art when it becomes available.

In the example illustrated in FIG. 27, the user's selected playlist D is associated with media options $X_1$-$X_3$ (602-604), and with potentially other media options not currently displayed. Since a visual array of media options associated with the selected playlist option is displayed, the visual array can be scrolled or repositioned as described above, to allow new or additional media options associated with the selected playlist option, to be explored by the user.

In accordance with an embodiment, a cell can include cover art to its left when long pressing a cell that represents content, the cover art to the left can scale up and blur to fill the entire cell or a portion of the screen. At the same time a representative section of what's inside can be revealed within a horizontal visual array or grid, within which the user can then further interact.

Figure 28:
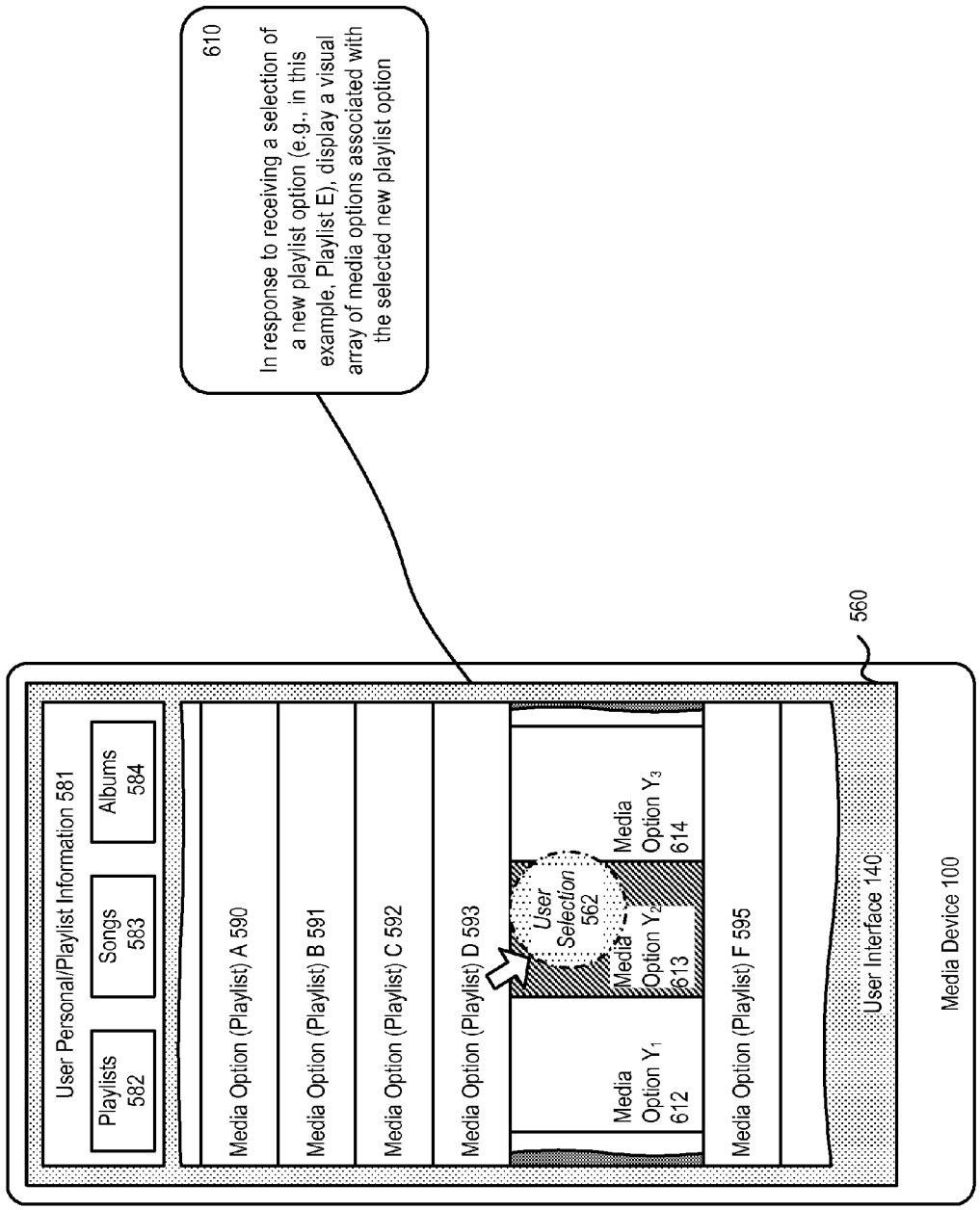
FIG. 28 further illustrates the use of a touch menu, in accordance with an embodiment.

FIG. 28 further illustrates the use of a touch menu, in accordance with an embodiment. As shown in FIG. 28, continuing the example from above, the user has now moved the selected point or region downwards and has selected playlist E. In response to receiving a selection of a new playlist option 610, the system can display a visual array of media options associated with the selected new playlist option. Additionally, a crossfaded or combined result of the playlists or media options therein can be provided as a played-back media content to the user, using the above techniques and based on the position of the selected point or region.

In the example illustrated in FIG. 28, the user's selected new playlist E is associated with media options $Y_1$-$Y_3$ (612-614), and with potentially other media options not currently displayed. Again, the visual array can be scrolled or repositioned, to allow new or additional media options associated with the selected playlist option, to be explored by the user.

Figure 29:
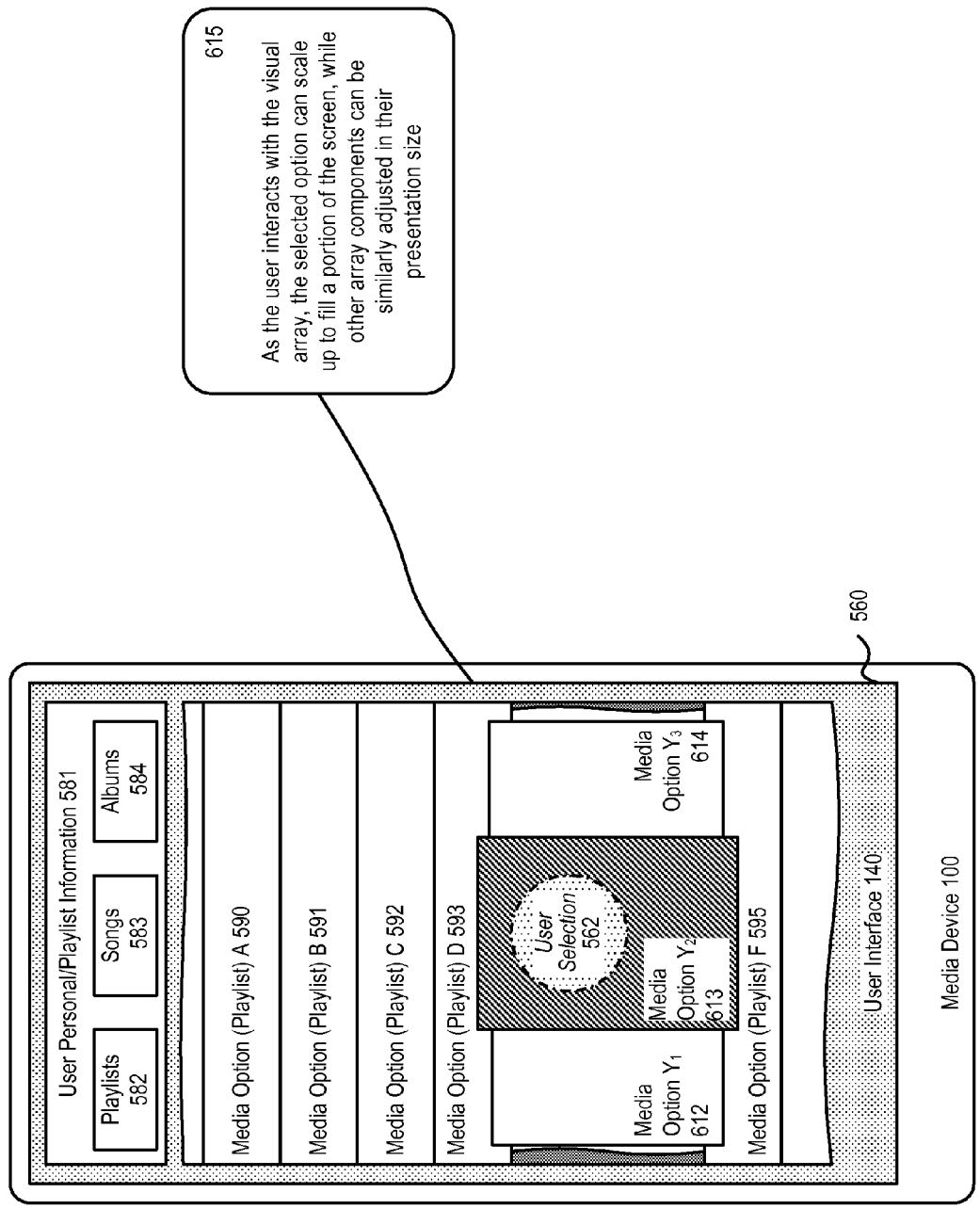
FIG. 29 further illustrates the use of a touch menu, in accordance with an embodiment.
Figure 30:
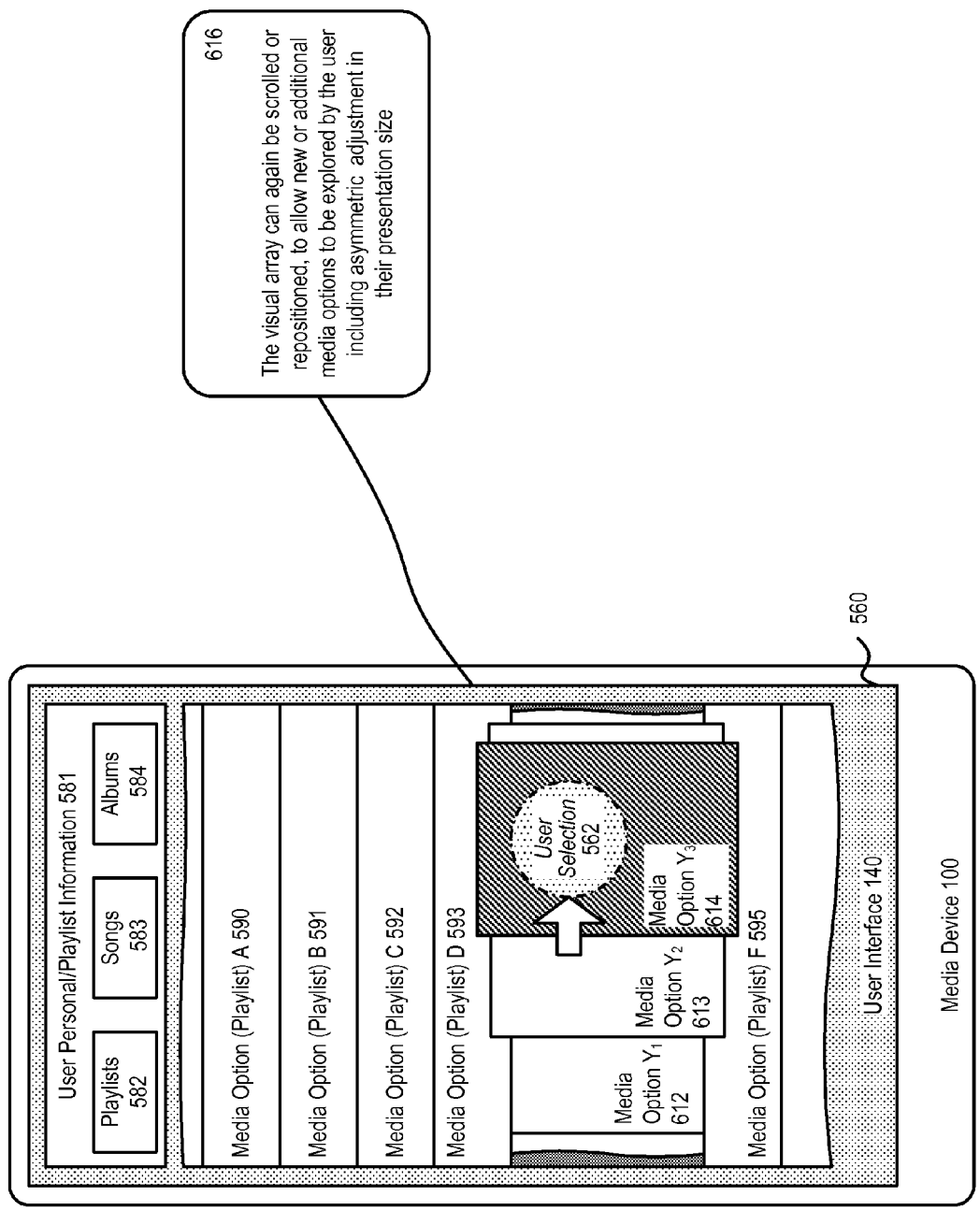
FIG. 30 further illustrates the use of a touch menu, in accordance with an embodiment.

FIGS. 29-30 further illustrate the use of a touch menu, in accordance with an embodiment. As shown in FIG. 29, in accordance with an embodiment, while the user interacts with the visual array, the selected option can scale up 615 to fill a portion of the screen, while other array components can be similarly adjusted in their presentation size. As shown in FIG. 30, the visual array can again be scrolled or repositioned, to allow new or additional media options to be explored by the user, including asymmetric adjustment in their presentation size 616 to better reflect the position of the user's finger and guide them in their previewing.

Figure 31:
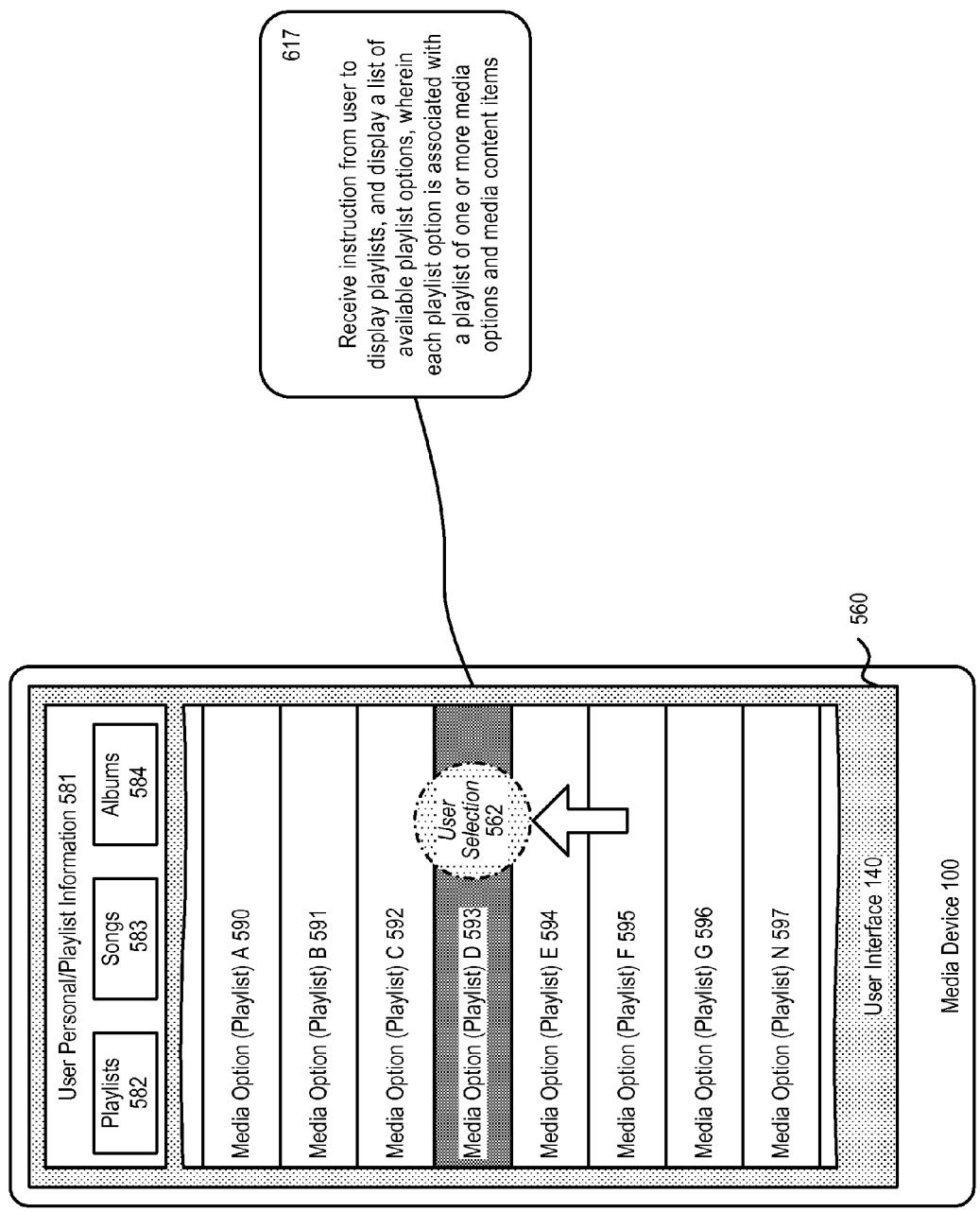
FIG. 31 further illustrates the use of a touch menu, in accordance with an embodiment.
Figure 32:
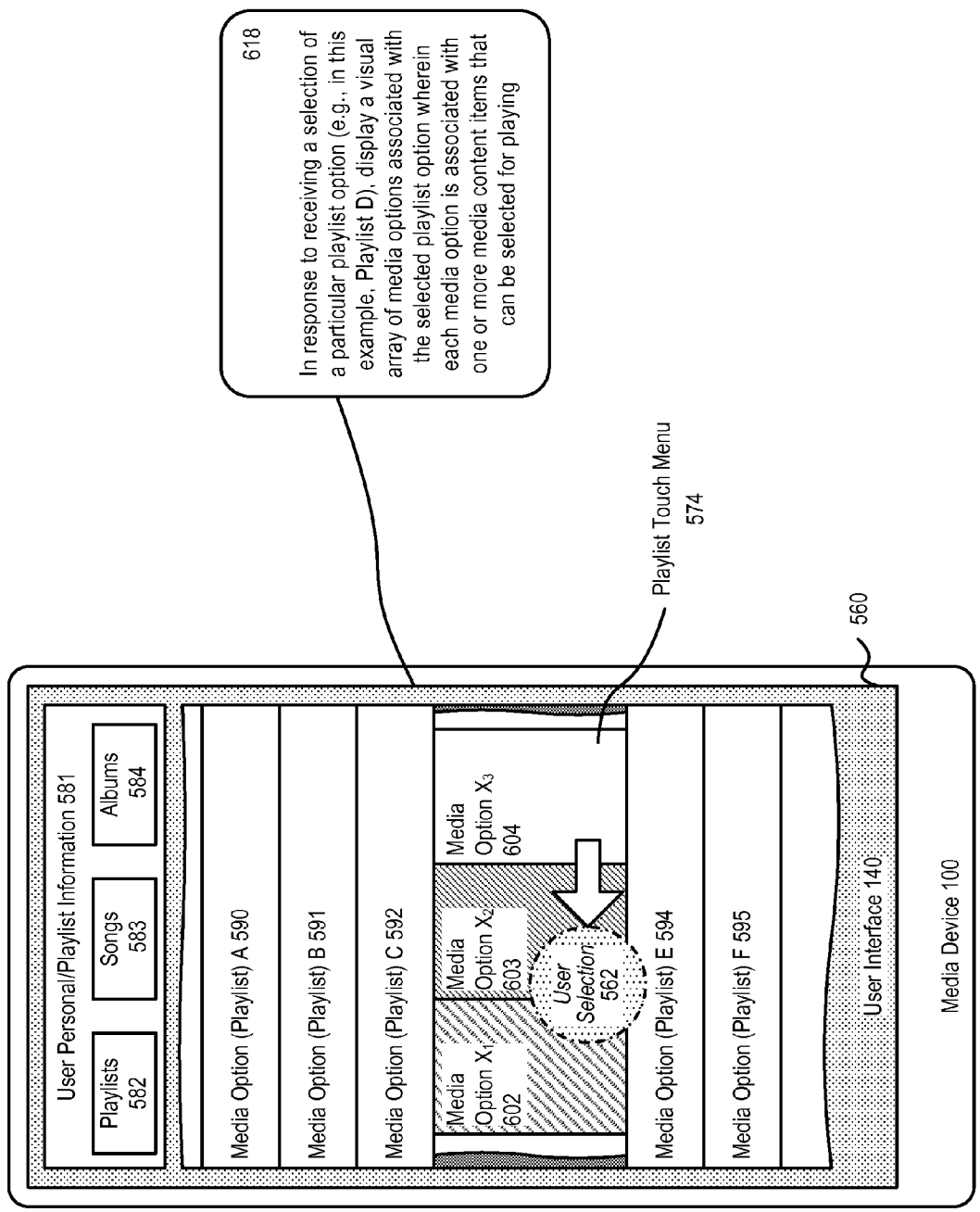
FIG. 32 further illustrates the use of a touch menu, in accordance with an embodiment.
Figure 33:
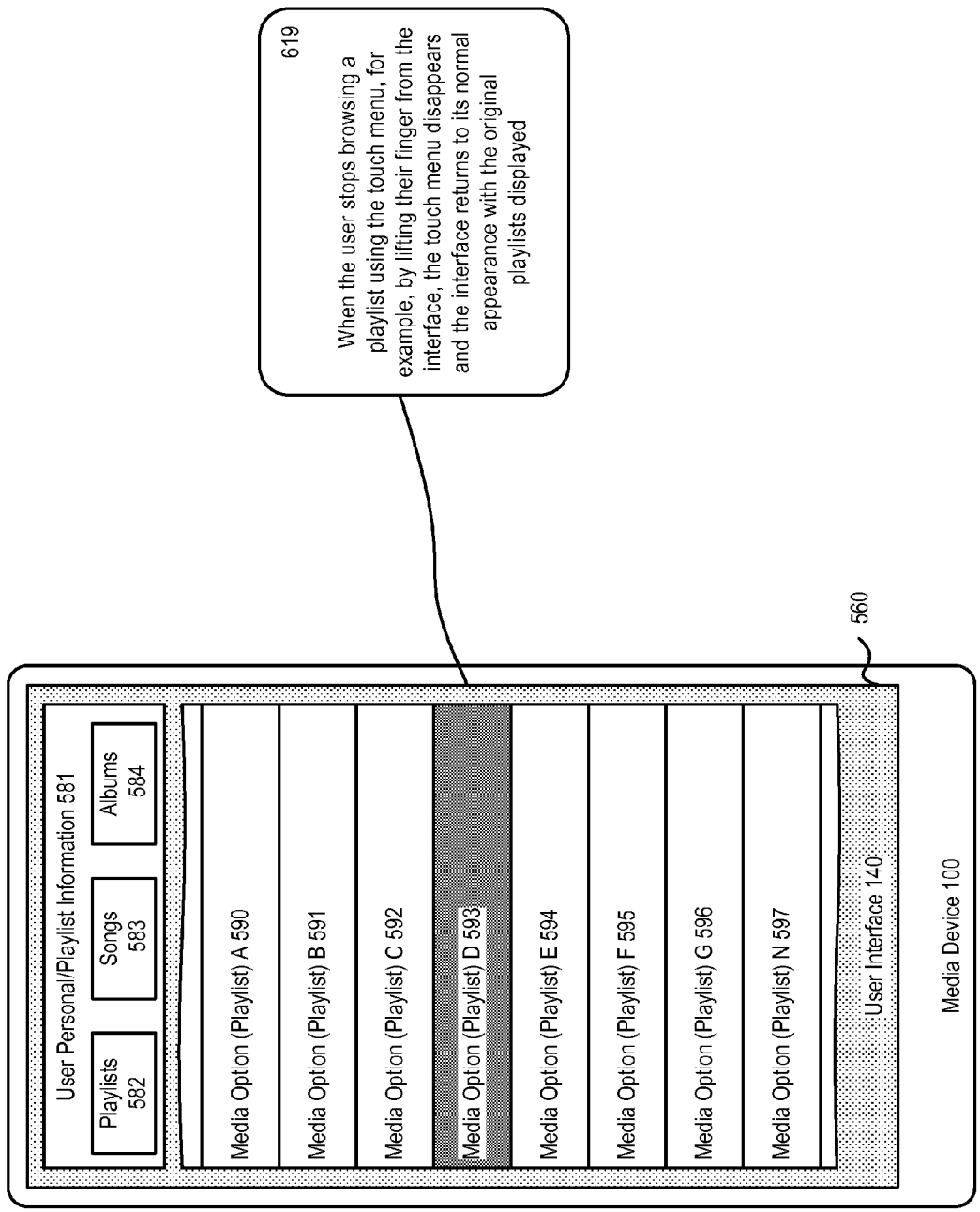
FIG. 33 further illustrates the use of a touch menu, in accordance with an embodiment.

FIGS. 31-33 further illustrates the use of a touch menu, in accordance with an embodiment. As shown in FIG. 31, in accordance with an embodiment, an instruction can be received 617 from a user to display playlists, and display of a list of available playlist options, wherein each playlist option is associated with a playlist of one or more media options and media content items. As shown in FIG. 32, in accordance with an embodiment, in response to receiving a selection 618 of a particular playlist option, the system can display a visual array of media options associated with the selected playlist option, wherein each media option is associated with one or more media content items that can be selected for playing. As shown in FIG. 33, in accordance with an embodiment, when the user stops browsing a playlist using the touch menu 619, for example by lifting their finger from the interface, the touch menu disappears and the interface returns to its normal appearance with the original playlists displayed. Such an embodiment is useful for environments in which the user is not allowed to select the next song, but instead is allowed to choose only the playlist they have just sampled.

Figure 34:
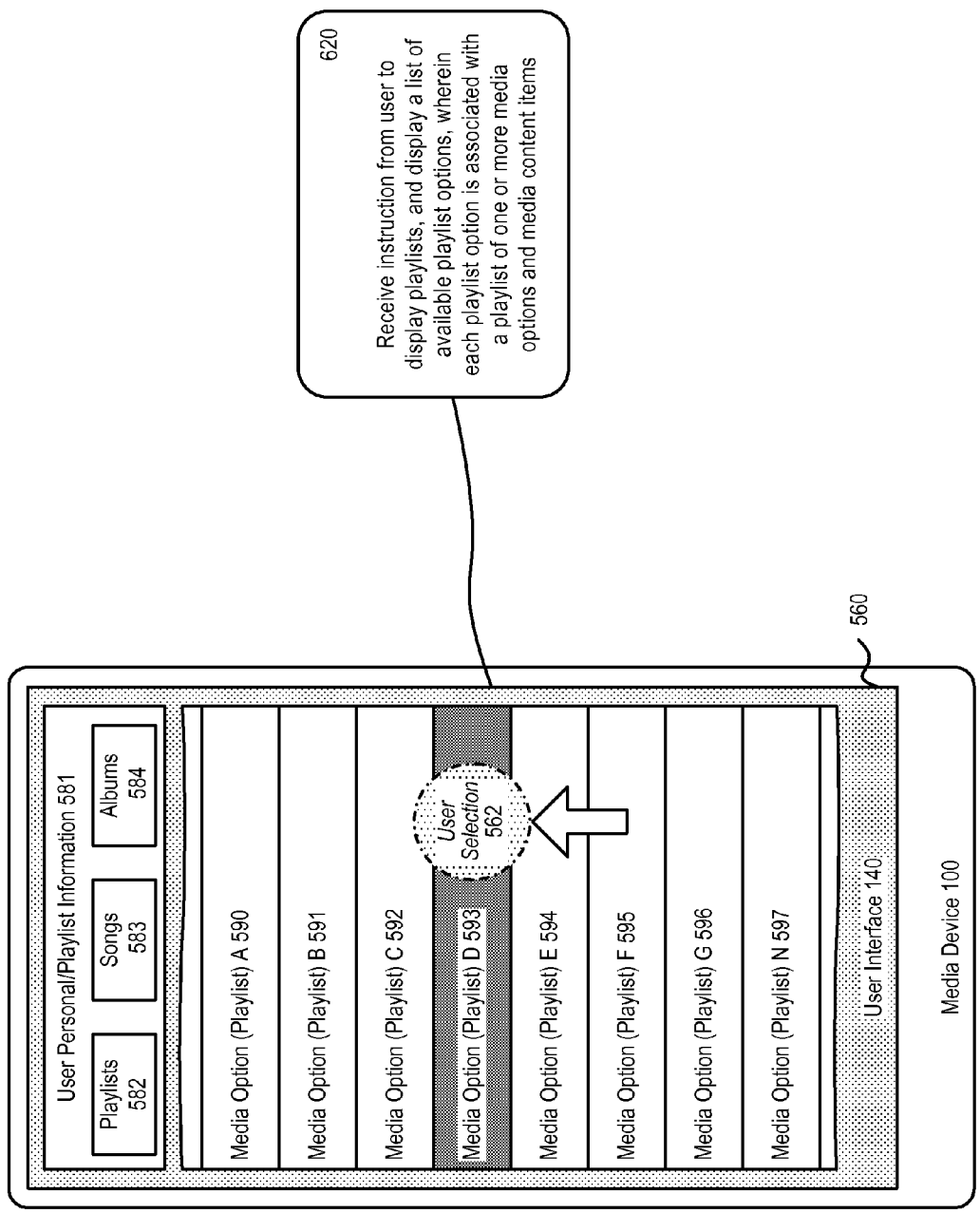
FIG. 34 further illustrates the use of a touch menu, in accordance with an embodiment.
Figure 35:
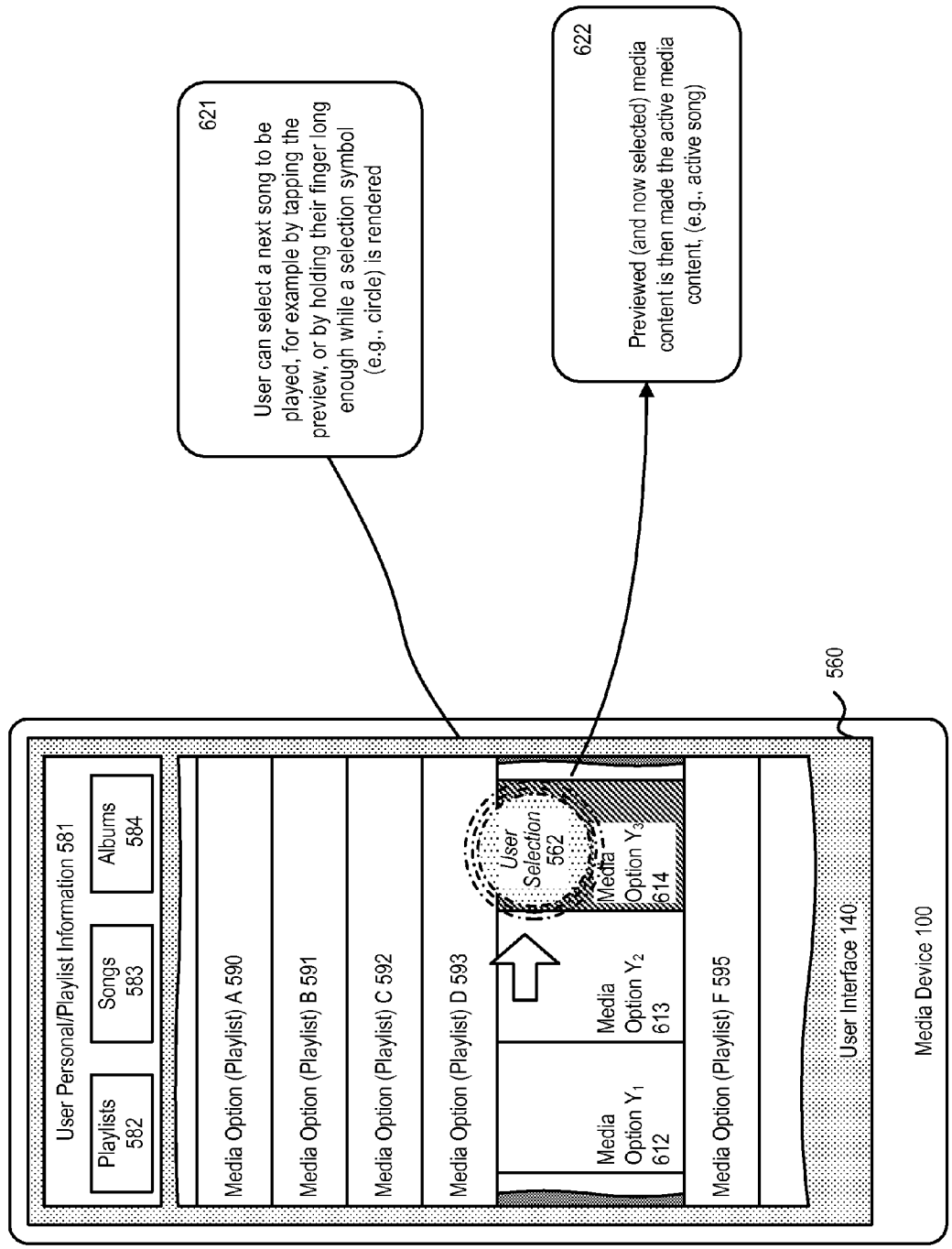
FIG. 35 further illustrates the use of a touch menu, in accordance with an embodiment.

FIGS. 34-35 further illustrates the use of a touch menu, in accordance with an embodiment. As shown in FIG. 34, in accordance with an embodiment, an instruction can be received 620 from a user to display playlists, and a list of available playlist options, wherein each playlist option is associated with a playlist of one or more media options and media content items. As shown in FIG. 35, in accordance with an embodiment, a user can select a next song to be played 621, for example by tapping the preview, or by holding their finger on a media option until a selection symbol (e.g., circle) is rendered. The previewed (and now selected) media content can then be made the active media content, (e.g., active song) 622. Alternatively, the user can tap off the preview, i.e., quickly lift and tap on the same spot, to trigger the preview as the current song. Such an embodiment is useful for environments in which the user is allowed to select the next song.

Figure 36:
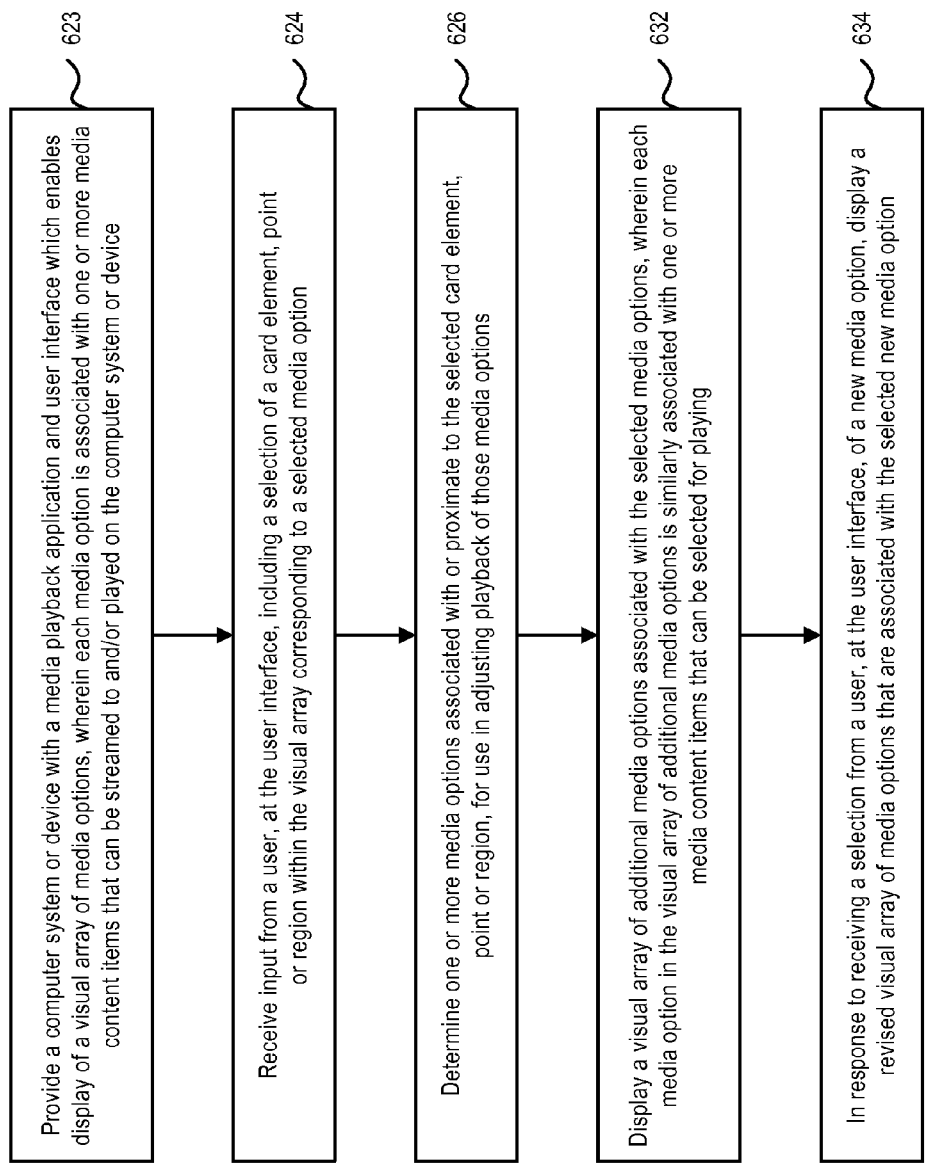
FIG. 36 is a flowchart of a method for providing a touch menu, in accordance with an embodiment.

FIG. 36 is a flowchart of a method for providing a touch menu, in accordance with an embodiment.

As shown in FIG. 36, at step 623, a computer system or device is provided with a media playback application and user interface which enables display of a visual array of media options, wherein each media option is associated with one or more media content items that can be streamed to and/or played on the computer system or device.

At step 624, an input is received from a user, at the user interface, including a selection of a card element, point or region within the visual array corresponding to a selected media option.

At step 626, the system can determine one or more media options associated with or proximate to the selected card element, point or region, for use in adjusting playback of those media options.

At step 632, the system can display a visual array of additional media options associated with the selected media options, wherein each media option in the visual array of additional media options is similarly associated with one or more media content items that can be selected for playing.

At step 634, in response to receiving a selection from a user, at the user interface, of a new media option, display a revised visual array of media options that are associated with the selected new media option.

Figure 37:
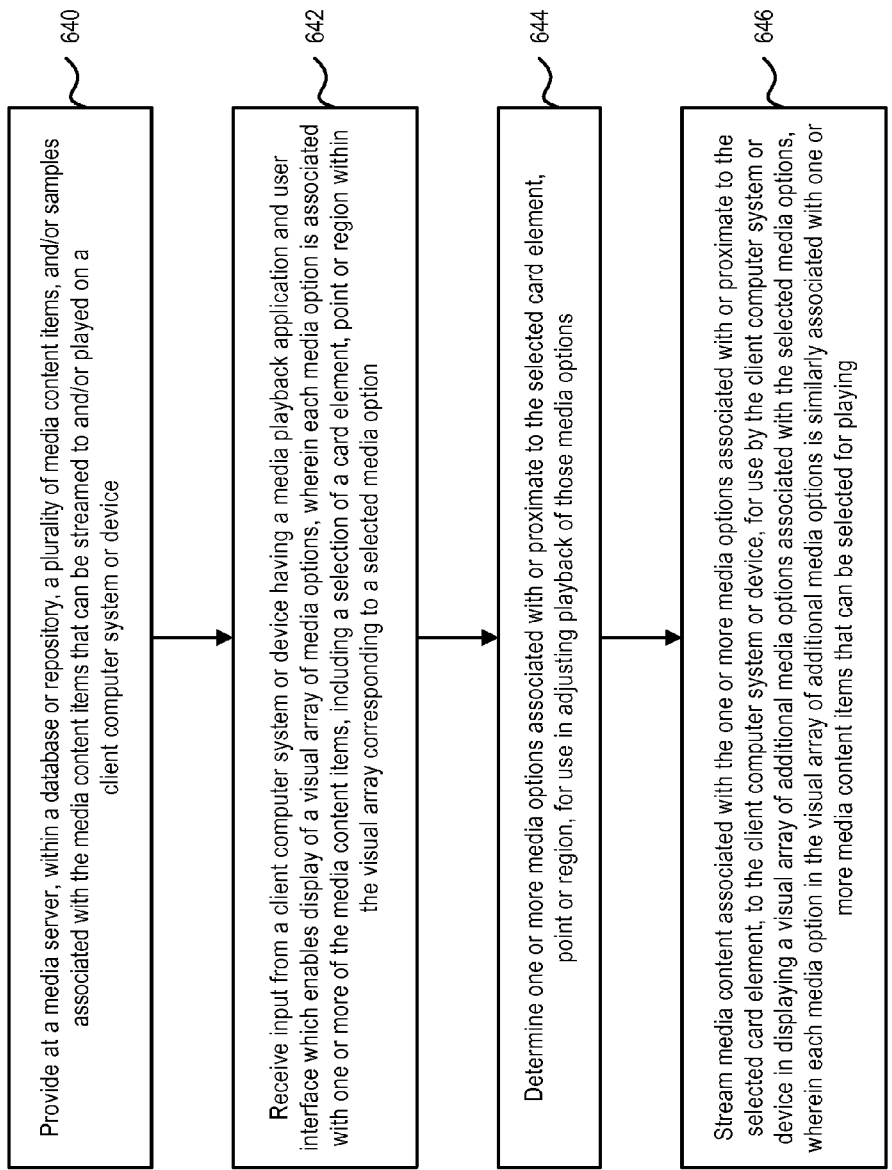
FIG. 37 is a flowchart of a method for use by a server in providing a touch menu, in accordance with an embodiment.

FIG. 37 is a flowchart of a method for use by a server in providing a touch menu, in accordance with an embodiment.

As shown in FIG. 37, at step 640, a plurality of media content items, and/or samples associated with the media content items that can be streamed to and/or played on a client computer system or device are provided at a media server, within a database or repository.

At step 642, input is received from a client computer system or device having a media playback application and user interface which enables display of a visual array of media options, wherein each media option is associated with one or more of the media content items, including a selection of a card element, point or region within the visual array corresponding to a selected media option At step 644, one or more media options associated with or proximate to the selected card element, point or region, are determined, for use in adjusting playback of those media options.

At step 646, media content associated with the one or more media options associated with or proximate to the selected card element, is streamed to the client computer system or device, for use by the client computer system or device in displaying a visual array of additional media options associated with the selected media options, wherein each media option in the visual array of additional media options is similarly associated with one or more media content items that can be selected for playing.

Figure 38:
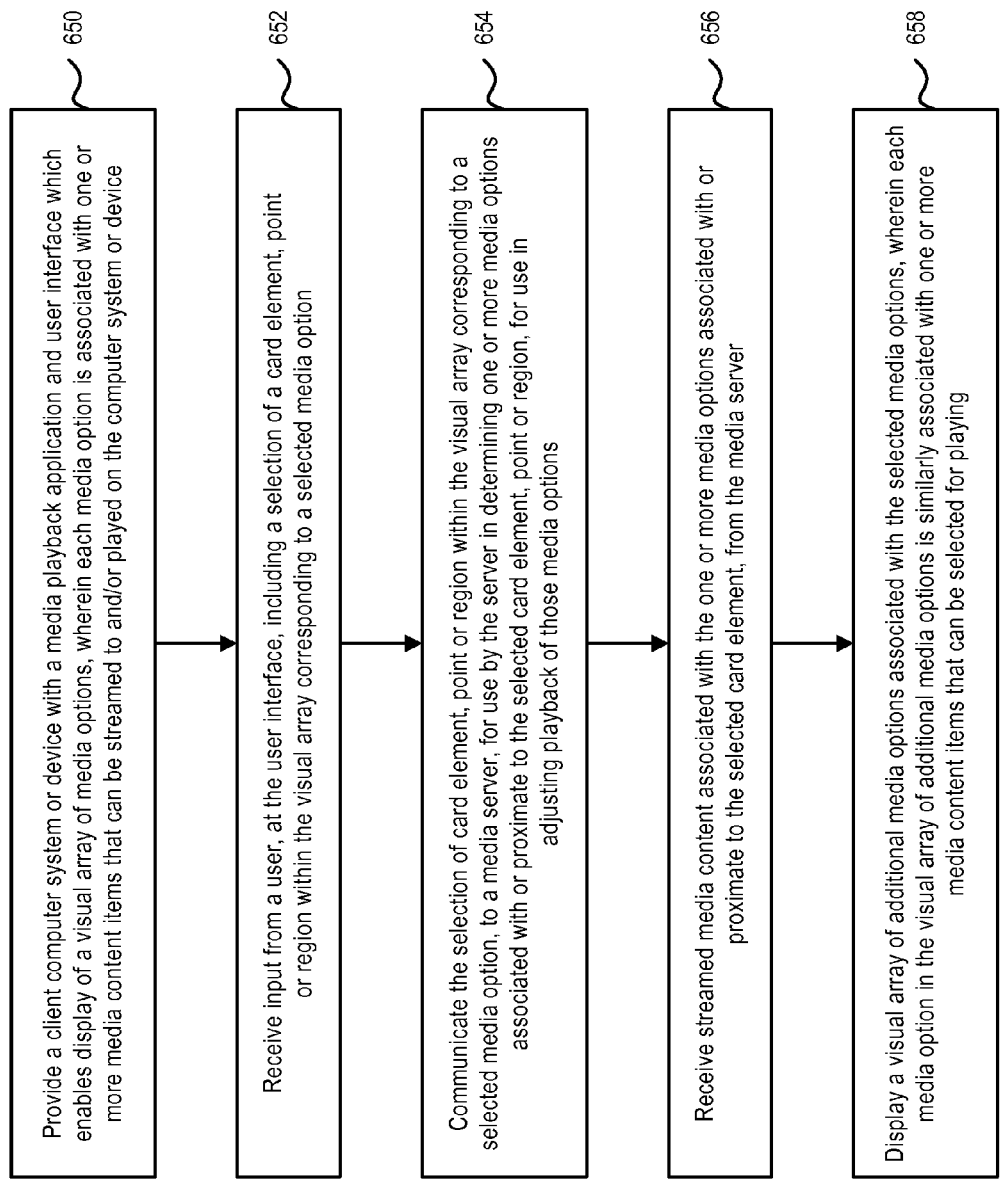
FIG. 38 is a flowchart of a method for use by a client device in providing a touch menu, in accordance with an embodiment.

FIG. 38 is a flowchart of a method for use by a client device in providing a touch menu, in accordance with an embodiment.

As shown in FIG. 38, at step 650, a client computer system or device is provided with a media playback application and user interface which enables display of a visual array of media options, wherein each media option is associated with one or more media content items that can be streamed to and/or played on the computer system or device.

At step 652, input is received from a user, at the user interface, including a selection of a card element, point or region within the visual array corresponding to a selected media option.

At step 654, the selection of card element, point or region within the visual array corresponding to a selected media option, is communicated to a media server, for use by the server in determining one or more media options associated with or proximate to the selected card element, point or region, for use in adjusting playback of those media options.

At step 656, streamed media content associated with the one or more media options associated with or proximate to the selected card element, is received from the media server.

At step 658, a visual array of additional media options associated with the selected media options is displayed, wherein each media option in the visual array of additional media options is similarly associated with one or more media content items that can be selected for playing.

Support for Force-Sensitive Touch Input

In accordance with an embodiment, the system can include support for force-sensitive touch input in selection, playback, or other interaction with media options. A media device can include an interface that responds differently to variations in input pressure exerted by a user, wherein the device is configured so that an amount of pressure applied by the user in touch-selecting a particular media option or other input region can be used to affect the operation of the device, interface or menu options; or the selection, playback, or other interaction with an associated media content item.

For example, in accordance with an embodiment, a less-forceful or light touch by the user upon a particular media option can be used to cause the system to provide an audio preview of an associated song; while a more-forceful, hard, or firm touch by the user can cause the system to switch to playing that song.

Figures 39A, 39B, 39C:
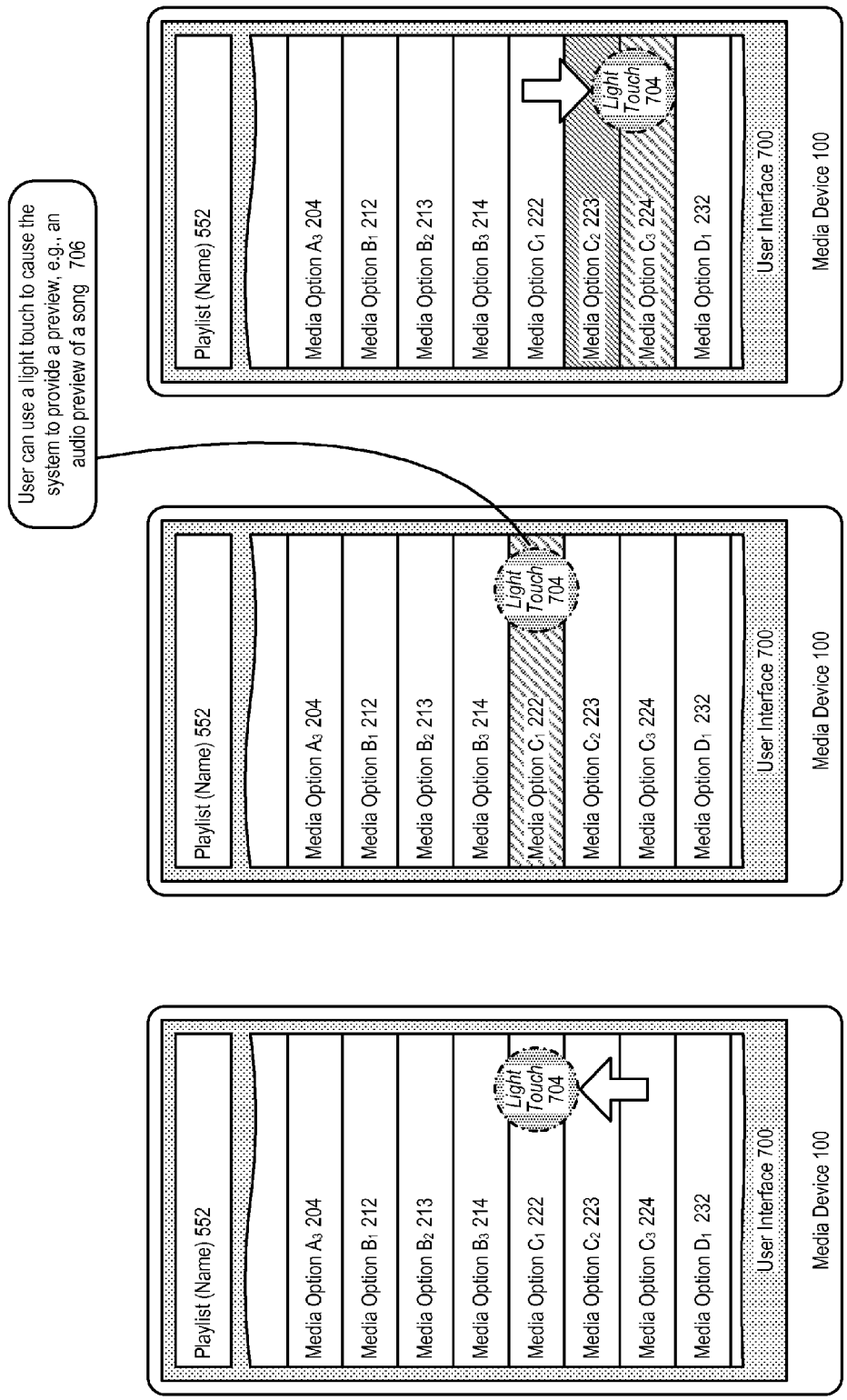
FIG. 39A-39C illustrates the use of a touch menu including support for force-sensitive touch input, in accordance with an embodiment.

FIG. 39A-39C illustrates the use of a touch menu including support for force-sensitive touch input, in accordance with an embodiment.

As described above, in accordance with various embodiments, the system can be configured so that, if it determines a media content has been selected during preview, the system can, for example, play the remainder of that media content item to its end, or otherwise allow the previewed media content to be made the active media content, (e.g., active song).

As shown in FIG. 39A-39C, in accordance with an embodiment, with support for force-sensitive touch input, a user interface 700 can display media options, and can respond to variations in the amount of pressure applied by the user in touch-selecting a particular media option or other input region, such that a user can use a light touch 704 on a media option to cause the system to provide a preview, e.g., an audio preview of a song 706. If the user continues to use a light touch, they can similarly continue to preview other media options.

Figure 40C:
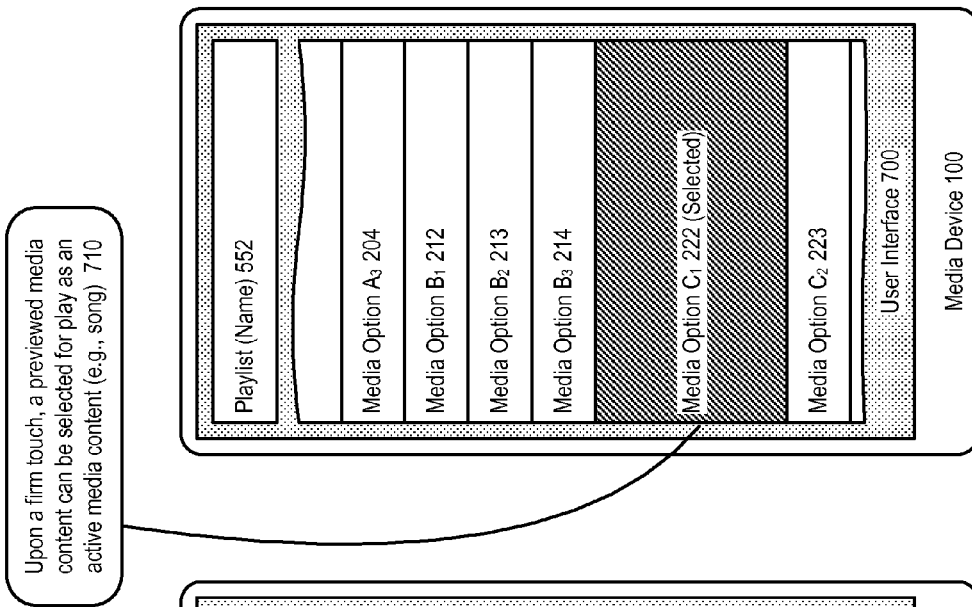
FIG. 40A-40C further illustrates the use of a touch menu including support for force-sensitive touch input, in accordance with an embodiment.
Figure 40B:
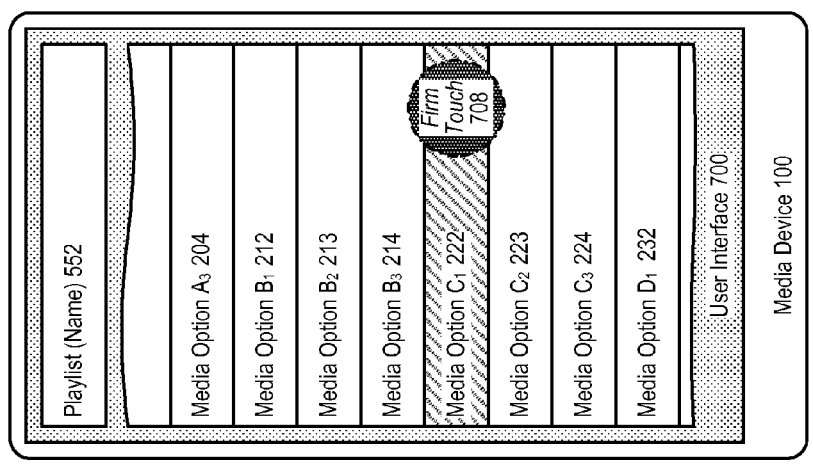
Figure 40A:
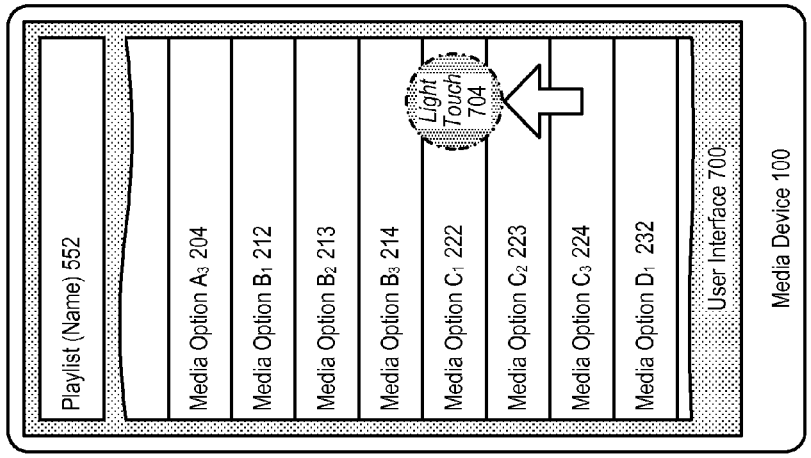

FIG. 40A-40C further illustrates the use of a touch menu including support for force-sensitive touch input, in accordance with an embodiment. As shown in FIG. 40A-40C, if upon previewing a song, the user instead uses a firm touch 708, then upon the system detecting the firm touch, the previewed media content can be selected for play as an active media content (e.g., song) 710. Optionally, the user interface can be updated to indicate the selection.

FIG. 41A-41C further illustrates the use of a touch menu including support for force-sensitive touch input, in accordance with an embodiment. As shown in FIG. 41A-41C, alternatively, upon the system detecting a firm touch, a menu or information can be displayed for the previewed or selected media content 712, for example as a menu 714 of options to add the selected media content to a playlist or queue, or to provide other information or options.

Embodiments of the present invention can be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, although the above examples generally describe the providing of music media content, such as songs, and the use of song cover art as a visualization to be used with the media options, the systems, methods and techniques described herein can be used with other forms of media content, including but not limited to video media content.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for playback of media content, including the use of media caching, comprising:

a media device, including a processor, wherein the media device is adapted to play media content provided by a computer system operating as a media server;

a user interface, provided at the media device, wherein the user interface is adapted to display a visual array of media options, and wherein each media option is associated with one or more media content items that can be provided by the media server and streamed to the media device, to be played at the media device;

a prebuffering logic that enables portions of the media content items to be pre-buffered at the media device, including that, while the media options are being prepared for display, portions of their associated one or more media content items can be pre-buffered at the same time as determined by a caching policy;
a playback logic, provided at the media device, which is adapted to play media content items associated with one or more media options that are proximate to a selected point or region within the visual array; and
a cache logic, provided at the media device, which is adapted to
determine one or more cache settings, user settings, user behavior, or visible media option information for those media options displayed on the user interface, for use in determining whether the media device is associated with a restriction on an amount of data to be transferred to the media device, and
determine, from within a plurality of caching policies, a particular caching policy by which the data for prebuffering the one or more media content items will be cached at the media device.

2. The system of claim 1, wherein the cache settings or user settings can be adjusted to control which of the plurality of caching policies is to be used.

3. The system of claim 1, wherein the determination of the particular policy to be used is at least partially based on one or more current usage information or historical usage information, including the amount of media content data communicated to the media device within a previous temporal interval.

4. The system of claim 1, wherein a current session information including information describing those media options currently displayed on the user interface, and a probability associated with selection of media options, is used in determining the particular policy to be used.

5. The system of claim 1, wherein the system includes support for force-sensitive touch input in selection, playback, or other interaction with media options.

6. A method for playback of media content, including the use of media caching, comprising:
displaying, at a media device adapted to play media content provided by a computer system operating as a media server, and having a user interface, a visual array of media options, wherein each media option is associated with one or more media content items that can be provided by the media server and streamed to the media device, to be played at the media device;
pre-buffering portions of the media content items at the media device, including that, while the media options are being prepared for display, portions of their associated one or more media content items can be pre-buffered at the same time as determined by a caching policy;
while a selected point or region is moved within the visual array in response to user input, determining media content items associated with one or more media options proximate to the selected point or region, to be played;
determine one or more cache settings, user settings, user behavior, or visible media option information for those media options displayed on the user interface, for use in determining whether the media device is associated with a restriction on an amount of data to be transferred to the media device; and
determine, from within a plurality of caching policies, a particular caching policy by which the data for pre-buffering the one or more media content items will be cached at the media device.

7. The method of claim 6, wherein the cache settings or user settings can be adjusted to control which of the plurality of caching policies is to be used.

8. The method of claim 6, wherein the determination of the particular policy to be used is at least partially based on one or more current usage information or historical usage information, including the amount of media content data communicated to the media device within a previous temporal interval.

9. The method of claim 6, wherein a current session information including information describing those media options currently displayed on the user interface, and a probability associated with selection of media options, is used in determining the particular policy to be used.

10. The method of claim 6, further including providing support for force-sensitive touch input in selection, playback, or other interaction with media options.

11. A non-transitory computer readable storage medium, including instructions stored thereon which when read and executed by a computer or media device causes the computer or media device to perform the steps comprising:
displaying, at a user interface, a visual array of media options, wherein each media option is associated with one or more media content items that can be provided by a media server and streamed to the computer or media device, to be played at the computer or media device;
pre-buffering portions of the media content items at the computer or media device, including that, while the media options are being prepared for display, portions of their associated one or more media content items can be pre-buffered at the same time as determined by a caching policy;
determining, while a selected point or region is moved within the visual array in response to user input, media content items associated with one or more media options proximate to the selected point or region, to be played;
determine one or more cache settings, user settings, user behavior, or visible media option information for those media options displayed on the user interface, for use in determining whether the computer or media device is associated with a restriction on an amount of data to be transferred to the computer or media device; and
determine, from within a plurality of caching policies, a particular caching policy by which the data for pre-buffering the one or more media content items will be cached at the computer or media device.

12. The non-transitory computer readable storage medium of claim 11, wherein the cache settings or user settings can be adjusted to control which of the plurality of caching policies is to be used.

13. The non-transitory computer readable storage medium of claim 11, wherein the determination of the particular policy to be used is at least partially based on one or more current usage information or historical usage information, including the amount of media content data communicated to the computer or media device within a previous temporal interval.

14. The non-transitory computer readable storage medium of claim 11, wherein a current session information including information describing those media options currently displayed on the user interface, and a probability associated with selection of media options, is used in determining the particular policy to be used.

15. The non-transitory computer readable storage medium of claim 11, further including providing support for force-sensitive touch input in selection, playback, or other interaction with media options.

\* \* \* \* \*